United States Patent [19]

Fischer

[11] Patent Number: 4,881,197

[45] Date of Patent: Nov. 14, 1989

[54] DOCUMENT COMPOSITION SYSTEM USING NAMED FORMATS AND NAMED FONTS

[76] Inventor: Addison Fischer, P.O. Box 9107, Naples, Fla. 33942

[21] Appl. No.: 14,853

[22] Filed: Feb. 13, 1987

[51] Int. Cl.$^4$ ............................ G06F 3/12; G06F 3/14
[52] U.S. Cl. ................................. 364/900; 364/943; 364/943.43; 364/943.44
[58] Field of Search ... 364/200 MS File, 900 MS File

[56] References Cited

U.S. PATENT DOCUMENTS

| | | | |
|---|---|---|---|
| 4,539,653 | 9/1985 | Bartlett et al. | 364/900 |
| 4,633,430 | 12/1986 | Cooper | 364/900 |
| 4,675,844 | 6/1987 | Yasuda et al. | 364/900 |

OTHER PUBLICATIONS

Using Microsoft Word, 1986, pp. 51-70, 293-318.
Reference to Microsoft Word, 1986, pp. 176-177.

*Primary Examiner*—Emanuel S. Kemeny
*Assistant Examiner*—Michael A. Jaffe
*Attorney, Agent, or Firm*—Nixon & Vanderhye

[57] ABSTRACT

An interactive data processing implemented method and apparatus for composing and editing a document in which a user is afforded great flexibility in defining the document geometry and in changing the data presentation characteristics associated with non-continguous portions of the document. According to the present invention, each of the distinct line formats in the document is assigned an abstract format name (i.e., a Named Format) and each line in the document is associated with a distinct format. A Names Format is associated with each fragment of the text in the document. Likewise, an abstract means, referred to as a Named Font, is associated with a wide range of specificable data presentation characteristics which operate over a range of the document defined by the user. The same Named Format and Names Font is used to simultaneously specify different data presentation characteristics for the output device of the system. By a single change in the specification for a Named Format or Named Font, all the underlying data throughout the text which is associated with a Named Format or Font is automatically changed to reflect the modified characteristic specification.

88 Claims, 14 Drawing Sheets

FIG. 3

DETAIL SPECIFICATIONS FOR FORMAT A

| FIELD | FONT ID | CHAR. | BASIC CRT | EXT CRT | LINE PRINTER | PAGE PRINTER |
|---|---|---|---|---|---|---|
| 1 | GEORGE | L,R,H,W | 1 TO 69 | 1 TO 120 | 1 TO 132 | .5 IN TO 8.0 IN |
|   |   | Sp. |   |   |   |   |
|   |   |   |   |   |   |   |
| 2 |   |   | ☐ TO ☐ | ☐ TO ☐ | ☐ TO ☐ | ☐ TO ☐ |
|   |   |   |   |   |   |   |
|   |   |   |   |   |   |   |
|   |   |   | ☐ TO ☐ | ☐ TO ☐ | ☐ TO ☐ | ☐ TO ☐ |
|   |   |   |   |   |   |   |
|   |   |   |   |   |   |   |
|   |   |   | ☐ TO ☐ | ☐ TO ☐ | ☐ TO ☐ | ☐ TO ☐ |
|   |   |   |   |   |   |   |
|   |   |   |   |   |   |   |

DETAILED SPECIFICATIONS FOR FONT ID = BEN

| BASIC CRT | EXTENDED CRT | LINE PRT | PAGE PRT |
|---|---|---|---|
| INTENSITY:<br>— UNSPEC<br>— NORMAL<br>— BRIGHT | COLOR<br>— UNSPEC<br>— NORMAL<br>— BLUE<br>— RED<br>— PINK<br>— GREEN<br>— TURQ<br>— YELLOW<br>— WHITE<br><br>CHAR-SET: _____<br><br>ITALICS:<br>— UNSPEC<br>— YES<br>— OFF | INTENSITY:<br>— UNSPEC<br>— NORMAL<br>— BRIGHT<br><br>HIGHLIGHT:<br>— UNSPEC<br>— NORMAL<br>— BLINK<br>— REVVID<br>— UNDLINE<br><br>BOLDFACE:<br>— UNSPEC<br>— YES<br>— OFF | DENSITY:<br>— UNSPEC<br>— NORMAL<br>— DARK<br><br>UNDERLINE:<br>— UNSPEC<br>— OFF<br>— SINGLE<br>— DARK<br>— =TEXT<br><br>CHAR-SET _____ | TYPE STYLE: _____<br><br>POINT-SIZE: _____<br><br>ITALICS:<br>— UNSPEC<br>— YES<br>— OFF<br><br>BOLDFACE:<br>— UNSPEC<br>— YES<br>— OFF |

FIG. 4

SELECTING A FONT RANGE FROM THE BEGINNING

SPECIFYING A FONT RANGE STARTING WITH THE END OF THE RANGE

DOCUMENT COMPOSITION SYSTEM USING NAMED FORMATS AND NAMED FONTS

FIELD OF THE INVENTION

This invention relates to an interactive data processing implemented method and apparatus for composing and editing a document, especially in an office or business environment. More particularly, this invention relates to a word processing system in which the user is afforded great flexibility in defining the document geometry and in changing the data presentation characteristics associated with non-contiguous portions of the document.

BACKGROUND OF THE INVENTION

There are available word processors, such as the MacIntosh, which allow the user to define a "ruler" in which document geometry characteristics such as a left margin, right margin and indentation point may be defined. The "rulers" in such prior art word processing systems have heretofore been associated only with contiguous groups of lines. There is no easy way to change "rulers" throughout the entire document. This is particularly a problem when composing a lengthy document in which it is necessary to switch back and forth many times between interleaved rulers.

The IBM Script document composition facility allows margins and columns to be changed throughout a document. However, in order to even permit the possibility of changes throughout a document, the Script system requires the tedious and labor intensive process of embedding commands throughout the document. The need to embed commands throughout a document in the IBM Script system, makes document composition extremely tedious and very error prone, often requiring many iterations to debug the errors in the embedded commands.

Additionally, the IBM Script system precludes the user from seeing, in a form approaching final form, the document as it is being created because of the clutter due to embedded commands. The original document typically becomes very difficult to follow due to the embedded, cryptic commands which break up the actual textual material.

In prior art word processing systems, changing a ruler does not retroactively change the lines which were entered under the ruler. In many prior art word processing systems, only by changing the ruler can a differently formatted line be entered at all. Typically, once a line is entered any reformatting requires attention to the individual line.

In prior art word processing editors, the document being produced on disparate output devices has to be individually formatted for each device, if such capability is present at all. No prior art technique exists for automatically formatting of a document in parallel on different document processing output devices without requiring, at a minimum, the use of formatting commands which usually appear embedded within the document during its composition. In prior art document composition facilities, any capability for automatically formatting a document, in parallel, for different output devices has required the insertion of instructions throughout the document during its composition—which renders composition slow, tedious, painstaking and prone to errors.

OBJECTS OF THE INVENTION

An object of the present invention is to provide a document composition word processing system which has highly flexible document revision capabilities and which has with the maximum degree of user friendliness.

A further object of the invention is to create documents that look very close to final form as they are being created (i.e., without being cluttered by embedded commands) and which are immediately transposable into final formatted form for each of the system's document producing output devices.

A still further object of the present invention is to provide a document composition system in which non-contiguous portions of a document may be readily reformatted or otherwise modified, by merely changing a single data presentation characteristic specification. The present invention requires no laborious process of embedding commands or other coded specifications throughout the document in order to make changes throughout the document (as does IBM Script Document Composition Facility). Moreover, the present invention allows the user to see the document as it is being created in a form approaching final form, (i.e., not cluttered with embedded commands).

A still further object of the present invention is to simultaneously define distinct formats and data presentation characteristics for disparate document producing output devices. The present invention readily permits the automatic reformatting of a document on these different output devices including the output device used during the process of composition.

Other advantages and objects of this invention will be more fully appreciated from the description of the invention which follows.

SUMMARY OF THE INVENTION

The present invention evolved in part from the recognition that in a given business document there is a need for a number of distinct line formats. Each format defines one of an essentially infinite number of geometric and/or topological arrangements of alphanumeric textual data which a user might find desirable for some portion of the document. For example, the main body of text in a document may have one main format having predetermined left and right margins, paragraph indentations and tabs. However, in addition the document may include several sections having auxiliary materials, such as embedded quotes, as well as sections where there are one or more columns of numeric data. Such text portions may be interleaved.

In the present invention, each of these distinct formats in the text is assigned an abstract format name and each line (or paragraph or any other fragment of text) in the document is associated with the Format Name. The lines which are not associated with a particular format by the user are automatically assigned a "default" format by the system. Thus, an abstract format name is associated with each fragment of text in the document. Throughout this text, the abstract format name will be referred to as a Named format.

Once a name has been associated with each line of text, that name can simultaneously define a parallel set of definitions for each of a predetermined number of output devices of the system. For example, a Named Format could simultaneously specify a display window width spanning 76 characters for a particular interactive display device and a 133 character width line for a particular line printer. With respect to a laser printer, the same Named Format may have yet another line specifying connotation, perhaps indicating dimensions in inches, millimeters or any other convenient scale.

In the present invention, a Named Format may be changed by the user to, for example, change the specifications for the left and right margins of a single field format, or changing the widths of columns in a multi-field format. Once such changes have been made, the data associated with the respective formats will be automatically reformatted to correspond with the assigned Named Format. Thus, all data associated with a given Named Format which is interleaved with other formats throughout the document may be reformatted after changing only a single format specification.

A Named Format field can also specify other attributes and checks for the data such as: spell checking, numeric field validation and other data checking functions by passing control to various system editing routines. In addition, each field or fields in a Named Format is tied to or associated with an additional set of data presentation characteristics, by a mechanism hereinafter referred to as a Named Font.

The use of a Named Font is not, however, limited to defining characteristics of a Format field. For the purposes of this text, it must be emphasized that the term "Named Font" is used in a much broader sense than the common use of the term (i.e., to merely define a type style). As used hereinafter, the term "Font" broadly refers to data presentation characteristics. For example, each Named Font will specify data presentation characteristics including one or more of display intensity, flashing, displayed underscore, reverse video, color, character set, type style (e.g., Roman Times, Serif, etc.), type modifier (e.g., italics, boldface, etc.), point size, etc. In addition, a Named Font may be used to define the particular parts of a document to be delivered in audio even indicating the volume, gender, accent or any other available selectable data presentation characteristic for an audio device.

Each Named Format field, or a group of Named Format fields may be associated with a Named Font. Alternatively, Named Fonts may be defined independently throughout the text of a document where the Named Font range is variable and user specified. Named Fonts may also be used to indicate fragments of text to be treated as footnotes, index or table of contents material or the like.

Like a Named Format, a single Named Font may take on different data presentations meanings for each of the output devices in the system. For example, a Font named "Apple" may specify a display in red on an extended function CRT, a printout in italics on a page printer, and an underlined printout on a line printer. If such a Named Font were to be associated with the first field of a Named Format "Y", then everywhere in the text in which format "Y" appears, the first field would take on the above-mentioned characteristics (unless some or all of the characteristics are subsequently respecified by the user and a final document would be produced having red, italics, and underlined presentations on an extended function CRT, page printer and a line printer, respectively.

It is important to note that the Named Format and Fonts are associated with the data implicitly, rather than being explicitly indicated by embedded specifications or control characters which would be visible during composition.

One of the many advantages of the present is that it provides the user with a flexible and efficient mechanism for simultaneously utilizing the highlighting features distinctive to each particular device on which the document is displayed or produced. This includes the CRTs on which the document is composed (where highlighting capabilities include' foreground color, background color, reverse video, flashing, underscoring, outlining, intensity). The highlighting features of such non-interactive output devices as line printers (where highlighting characteristics may include: darkness, underscoring and other overstriking) page printers (where highlighting characteristics often include: type style, print size, italics, boldface, underscoring, outlining, etc.), and other devices, including, but not limited to, audio devices (where highlighting characteristics might include: decibel level, voice accent, voice guarder, and speed of speech) are also advantageously utilized.

BRIEF DESCRIPTION OF THE DRAWINGS

FIG. 3 is an exemplary display screen from which a user may view and specify details for the Named Format A of FIG. 2.

FIG. 4 is an exemplary display screen from which a user may detail specifications for a Named Font.

DETAILED DESCRIPTION

The present invention may be implemented in a wide range of different data processing systems. It is emphasized that the data processing components described with respect to FIG. 1 are mentioned by way of example only and should not be construed as limiting the practice of the present invention in any way.

The CRT 2 may, for example, be an IBM 3270 monochrome display terminal, or a color 3279 display, or an IBM personal computer display. The extended function CRT 4 may, for example, be the IBM 3279 terminal which supports color graphics. Each of these CRT terminals is associated with a keyboard for entering data and commands. It should be recognized that when the term "CRT" is used herein, any functionally equivalent interactive display device which can be interfaced with a data processing system could be substituted therefor. Such equivalent devices include the general class of so-called computer "display" devices. For example, plasma-screen devices as well as teletype-type devices fall into this category.

The data processor 10, which is coupled to CRT 2 and CRT 4, is generally shown with its main memory and may be any of a number of general purpose digital computers. For example, the data processor 10 may be an IBM 370-equivalent type processor such as the IBM 4341, model 2 with its associated operating system. Alternatively, the processor may be a PC or any other general purpose processor that supports display screens. As will be discussed in detail below, processor 10 processes entered document data and commands received from either of the CRT keyboards. In addition, data processor 10 executes the programs resident in its memory so as to control the operation of the document processing system of the present invention.

Figure 1:
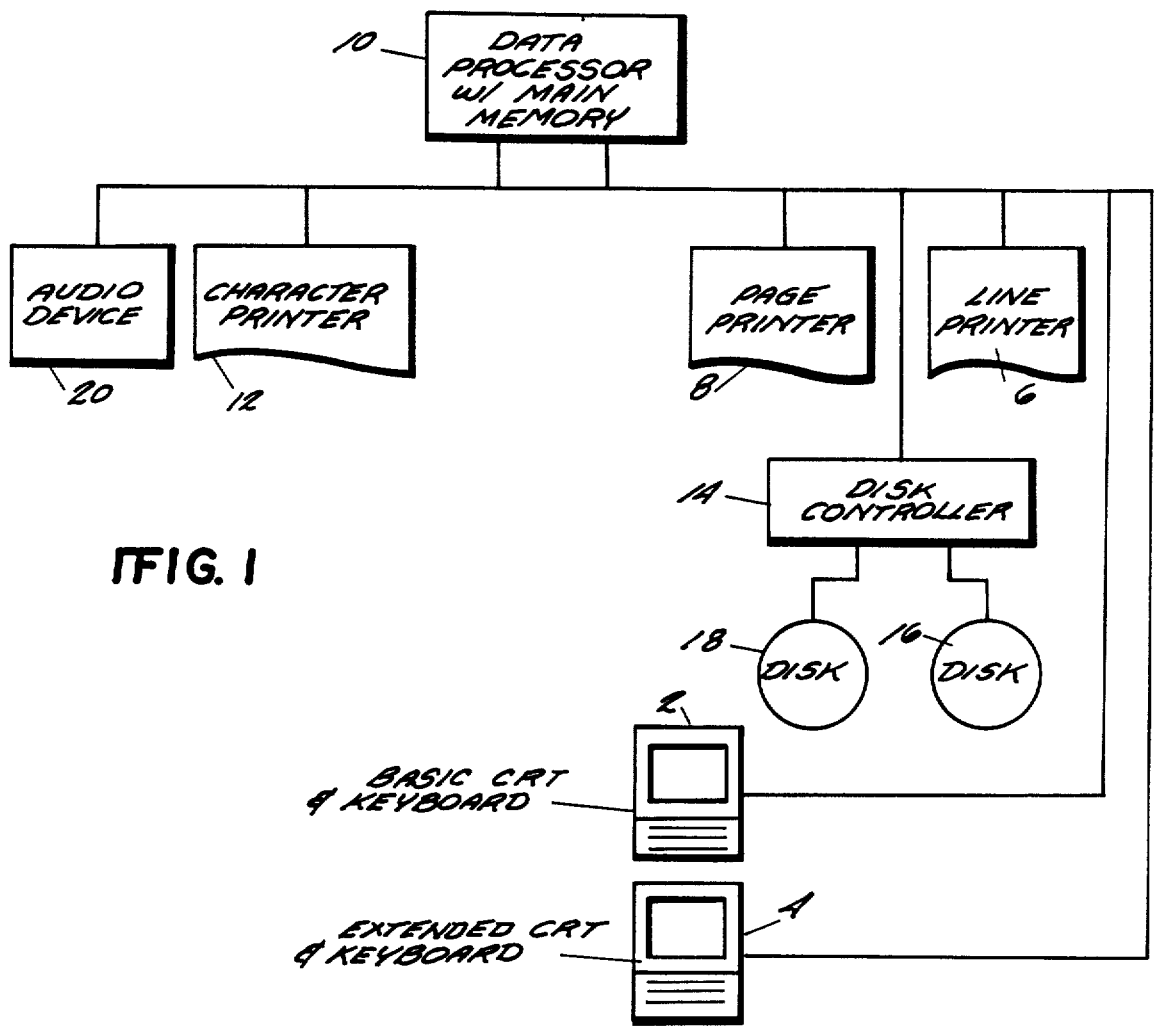
FIG. 1 is an exemplary data processing system in which the present invention may be implemented.

Turning next to the printers shown in FIG. 1, the line printer 6 may, for example, be the IBM 3203, model 5 Line Printer, and the page printer 8 may, for example, be an IBM 4250 Electro Erosion page printer. The printer 8, which produces equivalent results to a laser printer, may alternatively be a laser printer. The system may also include a character printer 12.

The system also includes auxiliary storage devices such as disc storage devices 16, 18 which are controlled by controller 14.

In addition, the system may include an audio device 20, which may, for example, be Digital Equipment DEC TALK. This device typically receives a digital signal from data processor 10 and thereafter accesses its stored vocabulary of words to drive a speech synthesizer to vocalize a desired message.

DOCUMENT COMPOSITION

The nature of the Named Formats and Named Fonts of the present invention is best understood by focusing on the manner in which a document would typically be composed on the system. In order not to obscure the present invention, those aspects of document composition and editing which are shared with prior art word processing systems will not be described in detail, but will be readily understood by those of ordinary skill in the art.

To compose a document a user will typically begin by calling Named Formats and Fonts from the system library or by creating and detailing his own. The system's default attribute will supply "default" Formats and Fonts if none are defined by the user.

The Named Format defines the physical and geometric or topological structure of the document. Each Named Format has one or more fields and each field has associated therewith a Named Font. The Named Font is used to associate additional data presentation characteristics with the Named Format field. It should be recognized, however, that such additional characteristics could have been specified directly in the Named Format. The named Formats and Fonts control how the text in the associated line is to be processed and presented.

In practice, a user may initially define either a Named Font or Named Format. Typically, a user will begin preparation of a document by defining Named Formats which set forth the global geometry of the document, e.g., page width, the left and right margins, tab(s) for paragraph indenting, the manner in which pages are to begin and end, whether the data is to be left and/or right justified, or centered. In addition, in order to override the aforementioned "default" system, the user may define a Named Format and Font which will be controlling, if no format or font is otherwise specified.

To prompt the user to set up all the aspects of the document relating to its overall geometry, the keyboards associated with CRT 2 and 4 may be provided with a DEFINE DOCUMENT key. By depressing this key, the system will prompt the user to define "Global Document" formats. The user may at this point choose to define his own "default" format which the system will revert to if no other is specified. Additionally, the user will typically define special formats to be automatically used for page top and bottom, if desired. To define special formats to be automatically used, the user will press a DISPLAY FORMAT program function key, or otherwise execute a command which will result in the display at the user's CRT of the Named Format such as formats A, Q, D and H shown in FIG. 2.

The user may then decide that, for example, Format A is the basic format defining the geometric layout for the bulk of his document. The user moves the cursor to initially set a specific left and right margin, and paragraph indentation for Format A for the user's CRT.

The user makes this selection by typing, for example, an S (Start), I and E (End) on the ruler associated with Format A. By typing in L (left justified) and R (right justified) instead of S and E, the user can effect left or right justification. In an exemplary embodiment of the present invention, the Format fields of the CRT may be specified quickly by over typing characters on a prototype line. S and L are used to denote the left margin for a column of a particular field. L and S are similar, both define the left hand side of the column of the field, except that L implies the data should be left justified. E and R are similar in that both define the right hand side of the column of the field except that R implies the data should be right justified. I indicates the "Indentation" point when the format is associated with the first line of a paragraph.

The user might then execute a command called "DETAIL FORMAT" to allow a detailed description for Named Format A to be defined as shown in FIG. 3. The user will first turn to field 1 of format A. It is noted that most Formats for textual material will only have one field. However, multiple fields are especially useful when creating parallel columns of numeric data. For field one, the user will have entries to make for each of the systems' output devices, e.g., a basic function CRT, an extended function CRT, a line printer, a graphics, page, or laser printer, etc. As will be apparent to those skilled in the art, although the details of a Named Format or Named Font are specified using menus, commands could have alternatively been utilized to accomplish the same result.

Additionally, the user will have a Font ID field and a "characteristics" to fill in. In regard to the Font ID field, the user may associate a Font named GEORGE with this field to define the normal color type face or other attributes to be associated with data in this field. The "characteristics" field may, for example, be utilized to specify left justified, right justified, hyphenated and word wrapped (i.e., adjustment of the data on entry if it exceeds a pre-defined boundary characteristic) as well as "spell checking", "numeric only", or any of a variety of other data checks and verification criteria. As shown in FIG. 3, these characteristics could be selected by the user by entering, for example, the code "L, R, H, W" and, for example, "SP" for spellcheck.

As shown in FIG. 3, the Named Format may also be used to simultaneously define how the associated text may be displayed on the system output devices. The user may, for example, specify a format field of 1–69 characters for a basic CRT, 1–120 characters for an extended CRT, 1–132 characters for a line printer and a page width of 0.5–8.0 inches for a laser, page, or graphics printer.

The Named Font GEORGE can be used to allow the user to specifically select further data presentation attributes to be normally associated with this field as will be described below. Alternatively, the user may choose not to identify a Font for this field, in which case the system will supply a default Font.

Although only one field is contained in exemplary Format A, it should be recognized that the Format may have additional fields in which similar data may be entered. The user may then define detailed specifications for Formats setting up how columns of numbers are to be displayed, such as shown in Format D (which has 3 fields), or embedded auxiliary (e.g., quoted) material as shown by Format Q in FIG. 2. For multiple field formats such as Format D, the start and end of each field in the format may, for example, be denoted by S and E respectively.

Figure 2:
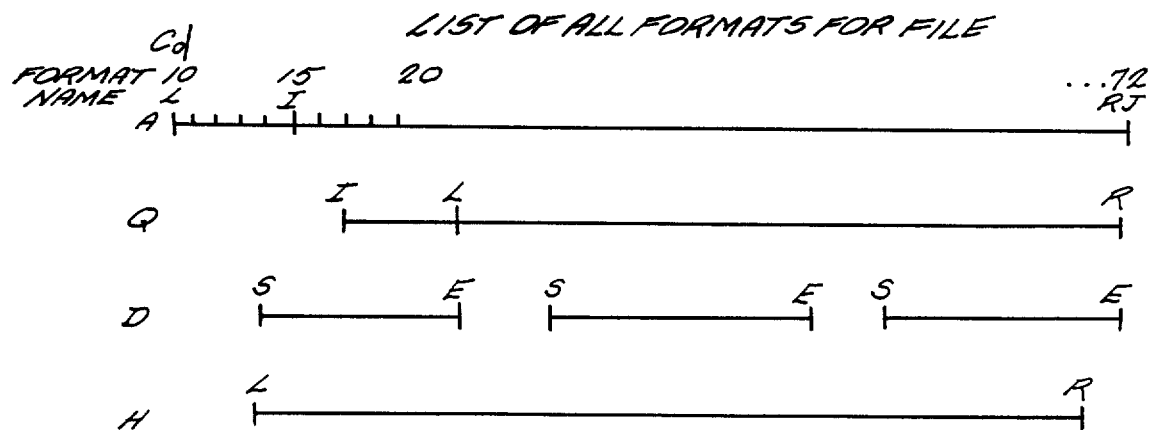
FIG. 2 is an exemplary display screen depicting four Named Formats.

Additionally, the user may define a global format defining the geometry of a page, document or document section header such as Format H shown in FIG. 2. Likewise, a page footer may be defined showing the desired format for ending a page (e.g., by a centered number, etc.) to be automatically used to format the footers of the pages within the document.

After the user has defined the basic document formats, he may optionally change the specifications of any or all the formats by striking a MODIFY FORMAT key or otherwise directing a modify format command. After the document has been stored and is in the process of being edited, if the specification of format A, for example, is changed, then the entire file for the document associated with Format A will be modified according to the revised rules. Thus, if the user changes the left margin setting for Format A, the left margin of all data lines associated with Format A will automatically be changed. Similar changes may likewise be made with respect to the Named Fonts with a similar modifying effect. If the associated charges to a Named Format or Font affect an aspect of CRT display, than the document will be immediately reformatted.

The user may next define the Named Fonts for his document. To define a Font the user will strike a DEFINE FONT key on the keyboard associated with the CRT. An exemplary display resulting from striking such a key is shown in FIG. 4. The user will then key in a name of the Font, which may, for example, be up to eight characters.

Next the user will enter detailed specifications for the Named Font, first with respect to the basic CRT which, by way of example only may be the IBM 3270 shown in FIG. 1. The basic CRT may not have color or extended graphics. The user will select a normal, bright or unspecified intensity level. The user will move the cursor to select, for example, normal intensity and then press enter.

Likewise, one or more attributes for an extended function CRT, e.g., the color blue, bright intensity, normal highlighting and italics may be selected. The user may select boldface type or a particular character set, if multiple character sets are supported by the particular CRT.

Similarly, data presentation attributes may be selected for the line printer and page printer or for other output devices in the data processing system with which Named Fonts have been associated. By way of example only, for a line printer, density, underlining characteristics and a character set may be specified. It is noted that the characteristic of "dark" under type density and underlining is achieved by directing the line printer to overstrike data several times on the same line. In regard to underlining, it is noted that "single" refers to a single (as opposed to multiple) overstrike with the underline character.

With respect to the page printer, a type style may be selected and a particular point-size (if available) and boldface may be entered. Italics characteristics may also be selected. In regard to the type style entry, the user may enter a type style designation such as "Times-Roman-Bold" which is converted by the present system into embedded commands which drive the IB Script system for producing a final form document on a page printer.

It must be emphasized that the FIG. 4 display screen for define Font characteristics is only exemplary. Other display layouts could have been chosen for allowing the user to define Font characteristics. In fact, all of the operations of creating and modifying the definition of Formats and Fonts could have been done using directive commands without the benefit of "menu" displays which are illustrated here. In addition, other output devices could have been listed beside those shown in Figure 4, For example, presentation characteristics for an audio device could have been defined, whereby, for example, a high, medium, or low volume characteristic could be specified for a range of words (defining the portion of the text to be vocalized) encompassed by the Named Font.

FONT HIERARCHY AND OVERLAYING FONTS

Building on the concept of assigning a Named Font to define the attributes of textual data, the present invention allows the user great flexibility in composing and editing a document by assignment of different levels of Named Fonts and allowing the attributes of different levels to be overlayed and commingled. These levels are arranged so that some of the attributes of the Font at the deepest level may be overlaid by attributes at the next deeper level. As long as a deeper level is not "overlaid" by a contradictory specification, then the deeper level is allowed to "show through", and the various characteristics which survive to the highest level define how the text is actually displayed.

For example, if a Font specifying only "italics" (but which does not name a particular type-style) were superimposed on a Font specifying "Garamond Bold", the result would be "Garamond Bold-Italics", wherever those two particular Fonts were defined to intersect and cover the same portion of text. Then, if another Font specifying "UNDERLINE" (but no other characteristics) were further superimposed, the result would be "Garamond Bold-Italics with Underlining".

However, if a Font specifying the "Helvetica" type-style were further super-imposed over part of the above, that type-style would supersede the "Garamond" (wherever the intersection occurred) to yield "Helvetica-Italics with Underlining).

Fonts can also explicitly specify the absence (or negation) of an option—for example "Underline-Off" (See FIG. 4) which would turn off for a specified range any underlining that might have been activated by a Font at a deeper level. Thus specifying the negation of an attribute has a different effect than simply omitting any specification for that attribute.

As discussed above with respect to FIG. 4, a single Font may also specify several characteristics, such as Garamond, Boldface, No underline, Color of blue, Background of Yellow, Flashing, which would supersede similar characteristics at deeper levels (and which could be further overlaid, if desired, by specifications at higher levels).

The method of the present invention allows great flexibility in composing a document. For example, there are at least 14 different Font levels, each of these is specifically assigned a particular meaning (although in the general case, there need be no particular meaning associated with any particular level, and in fact it is within the scope of the present invention to allow a variable, unlimited number of levels of Fonts). It is noted that one of these levels is related to Fonts associated with the Named Formats as discussed above with respect to FIG. 3.

The discussion which follows of the fourteen exemplary font levels is for purposes of illustration only. The operability of the present invention is not dependent upon utilizing any one or all of these levels.

Before discussing an example, demonstrating how these Font levels are used, the characteristics of the exemplary fourteen Font levels, starting with the deepest level, are shown below.

1. System Font level. This Font level is the deepest level and may be overridden by all other levels. The system Font level is not controllable by the user, but rather sets the basic system default Font, if no other Font is specified for a particular portion of the document.

2. User defined Global level. This Font level may be utilized by the user to override the system default Font. The user may select his own default font which will be utilized if no other font is specified for a particular portion of text.

3. The window font level. In this Font Level, the word processing editor of the present invention allows the screen to be broken into windows so that different files or different pieces of the same file can be viewed simultaneously. Each window has a particular Font associated with it during this display mode, thereby allowing for easy discrimination during composition (e.g., one might choose to associate fonts defining different colors with different windows).

4. The file-font level. In this font level, the user may assign a temporary underlying viewing characteristic to each file (this could be color, type-style, etc.) to allow for easy discrimination between different files during composition. This is useful since different files may be viewed simultaneously or at different times during composition.

5. The base font level. An indication of this Font level is preserved in the data file itself, and typically provides any default characteristics the user may wish to assign to large sections of the file. This Font level is independent of the Format and Fonts, but can be overridden, in whole or in part, by them. This level will be the level associated with most of the document text and will typically span multiple lines and paragraphs.

6. The Format Font level. (See FIG. 3) This Font level is derived for each line from the underlying Named Format associated with the fields in that line. The Named Format allows each field to potentially be automatically assigned a different characteristic (via the associated named font). Anything defined in the Format level overrides the base level fonts wherever contradicting details occur.

7. The mod Font level. This Font level is also recorded in the text file, and allows the user to make changes which supersede the format and deeper levels.

8. The footnote Font level. An indication of this font is recorded in the file. Fonts at this level have a "footnote" attribute, which causes them to be converted to footnotes on hardcopy output devices. In revisable form on CRTs the footnoted material is kept contiguous with the rest of the text. Thus, if the author wishes to visually set off footnotes, he might assign a Named Font with, for example, the attributes of yellow, flashing to any footnoted material.

9. The Index Level. Textual material controlled by any Font at the "index" level will be compiled into a documents index or table of contents. For example, in a book about swimming, if the term "lifeguard" were to be associated with the index level, it would automatically be placed in the document's index.

10. The highlight Font level. This level is similar to the MOD-level except that it supersedes it and can be thought of as being used for short highlights (such as italicized words and highlighted phrases), although there is not actually a strict limitation as to length. It also allows a level of highlighting to be applied to footnotes.

11. The embedded-notes font level. Text which is annotated with any Named Font at this level is treated as a construction comment private to the author; this material is only displayed when the document is viewed in its (working) revisable form (in final form such as a hardcopy printer or a final form CRT display, the text associated with the font level is omitted). However any such private material is actually recorded in the revisable form text file for later reference. This font level may be given the display attribute of being displayed in a different color so that user can readily find the note.

12. The thinking Font level. This level is similar to the embedded-notes level, except that the material covered by the font is not stored in the file, and is only designed to temporarily call attention to parts of the document during the current preparation session and relate to notes which are more transient than the (permanent) embedded notes level.

13. The attention Font level. This level is used to temporarily highlight certain aspects of text—such as the occurrence of a word for which the user has requested a search, or to set off a misspelled word if the user wants a spell-checking function, etc. The material covered by this font is not stored in the file. This level gives the user the ability to call up positions of the text which need be brought to the user's attention for a particular purpose, e.g., spell-checking, searching, etc.

The attention font level will be highlighted to bring the underlying data to the user's attention, e.g., by blinking, underlining, etc. The user specifies the name of the Font (which he has defined) to be used in each of the above described different "attention" situations (e.g., misspelled words, object of a search, etc.).

14. The control Font level. This is an internal "working" level used to highlight areas which are under definition by the user—for example while the user is framing (i.e., defining) a range of text to be deleted, or copied, or moved. The text being operated on is highlighted with a particular Font to help the user see exactly what is happening. The user is able to define which particular Named Font is to be displayed at this level for each of the different operations (one for delete, one for move, one for copy, etc.), which may have the attribute of, for example, a special color, or high intensity, reserve-video, etc, associated with each selected Named Font.

EXAMPLE OF FONT USE

Figure 5A:
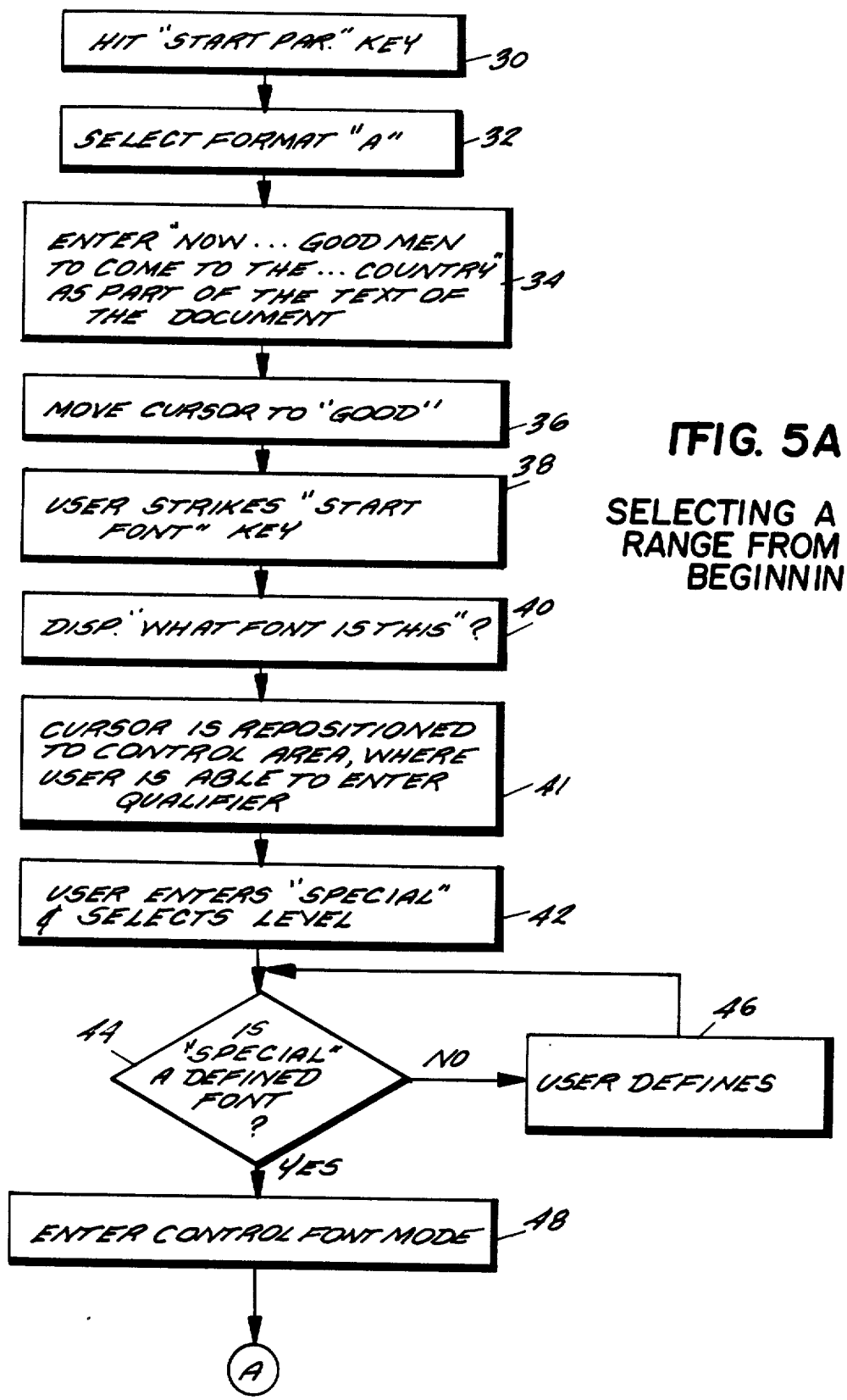
FIGS. 5A, 5B, 6A and 6B are flowcharts showing an exemplary sequence of operations involved in the use of multiple Named Fonts for the same portion of a document.
Figure 5B:
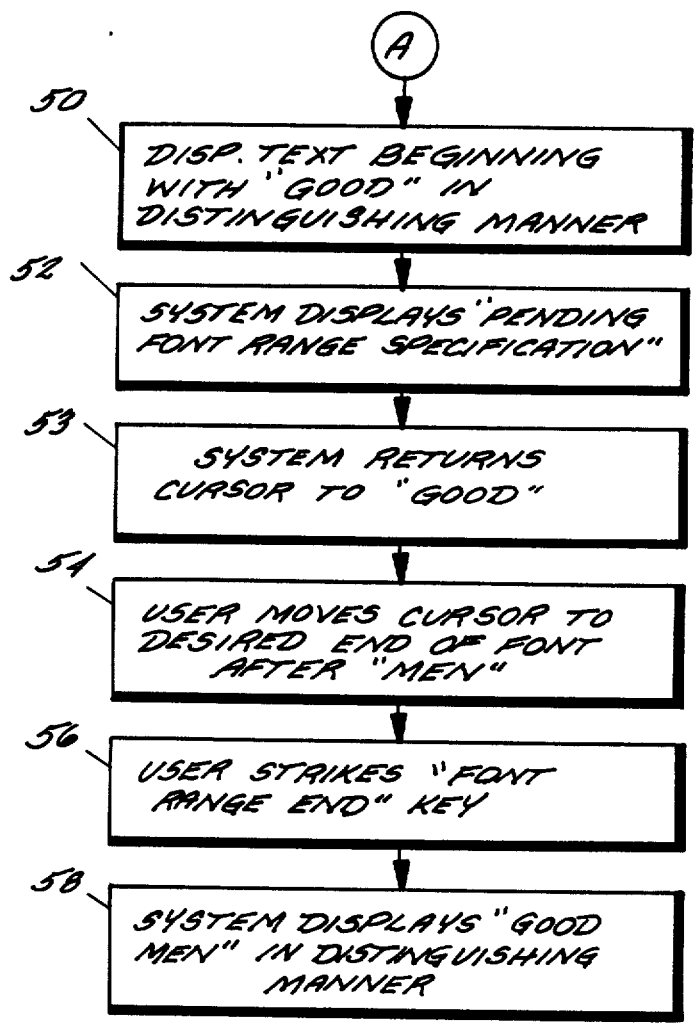
Figure 6A:
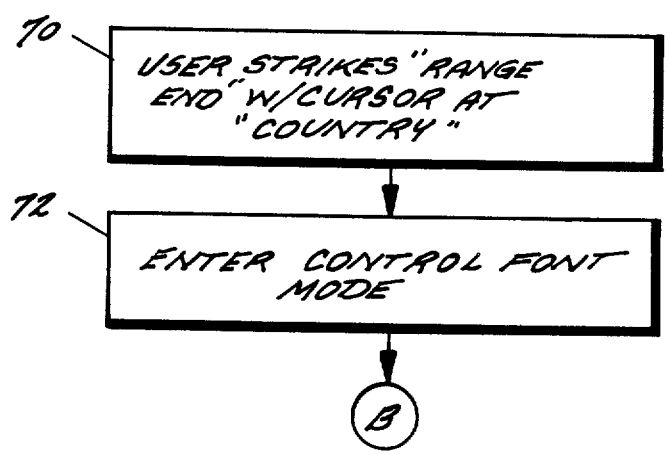
Figure 6B:
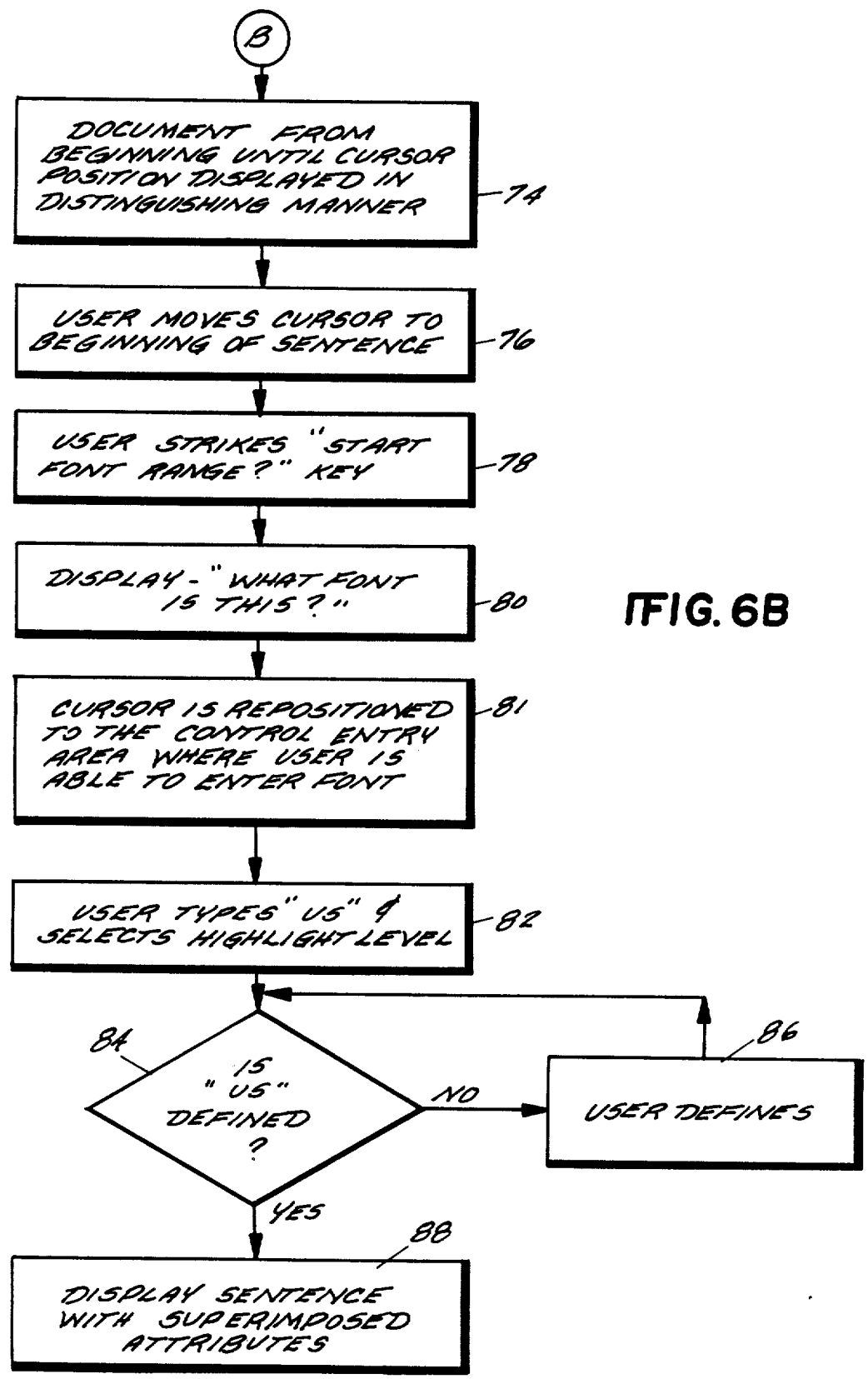

The sequence of operations for utilizing these different levels is exemplified in FIGS. 5 and 6. Initially, as shown in flowchart blocks 30, 32 and 34, the user strikes the start paragraph key, selects Format A and types the sentence "Now is the time for all good men to come to the aid of their country". This goes into the text display area of the CRT screen.

By hitting the next paragraph key again, the user may continue the document preparation and select another format, e.g., Format B for embedded quotes. If the user desires initially to produce a document with "good men" italicized, he moves the cursor to "good" (36) and strikes the program function key or keyboard labeled "START FONT" (38).

The system responds with a "WHAT FONT IS THIS?" prompt (40) and temporarily moves the cursor to a specification entry area (41). The user then responds that the Font he desires (which happens to presently define the attribute italics) is called "SPECIAL". Presuming the user's CRT does not have italicized characters, the font "SPECIAL" may also specify the color "pink" to be displayed for that CRT, whereas the page printers on which the document may ultimately be produced will be controlled to italicize. The user also indicates whether the font is at the BASE, MOD, FOOTNOTE, HIGHLIGHT or NOTES, etc. level (42).

After a Font name has been entered by the user, the system determines whether the font ("SPECIAL") has been defined (44). If the user has not previously defined this Font, he will do so on a screen of the type shown in FIG. 4. Upon the user defining the font "SPECIAL" (46), the system automatically enters the control font mode (48) and temporarily controls the CRT display to distinguish the start of textual data which potentially may be operated on by the Font that is being defined, by displaying the text from "good" through the end of the document in a distinct manner (50), e.g., in the color "pink". The system will typically display "pending font range specification" at this point during such an operation (52). Since the system still needs to be informed where the end of the current range of text is to be, the system moves the cursor back to the point in the text ("Good") where it was before the user pressed the "Start Font" key (53).

Next the user moves the cursor to a desired end of font range such as after "men" and strikes the FONT RANGE END program function key (54). It is emphasized that it is within the scope of the present invention to define the range to be associated with a Named Font by commands, by indicating the range start and end with the CRT cursor or by using a "mouse" or any other equivalent technique. The system then displays the text associated with the newly defined Font in a distinguishing manner in accordance with the Font definition for the CRT (58).

It is important to note here that there are no visible, extraneous, control characters or commands inserted into the text. The nature of the material on the author's CRT is implicitly denoted and set apart by (in this case) the color "pink". This could just as easily have been (or could be changed to) set apart by underscore, or reverse video, etc. However, regardless of the visual cues selected by the author during composition, the Named Font "SPECIAL" will result in italicized material when produced on a page (graphics) printer.

If the user desired to further display "their country" in boldface print, the same process would be repeated and a new font would be defined, e.g., "HENRY", where the attribute of boldface print would be selected. The attribute of boldface print would be overlaid on any existing non-conflicting Font for this passage. Of course, since most CRTs do not have boldface characters available, the author may wish to have such material displayed in some other distinguishing color, or perhaps high intensity.

The flowchart of FIG. 6 further exemplifies the overlaying of fonts in accordance with the present invention. If the cursor were at the end of the sentence "Now is the time . . . country." and the user decided to underline the entire sentence, he could, for example, hit the "FONT RANGE END" key as shown in flowchart block 70. This would place the system into control font mode (72) and the beginning of the document through the point of the cursor would be displayed in a distinguishing color or manner (74).

The user will next move the cursor to the beginning of the sentence (76) and strike the "START RANGE FONT?" key (78). The system will recognize that a font has yet to be selected, will display "WHAT FONT IS THIS?" (80) and will move the cursor to the specification entry area of the screen (81), where the user, desiring to underscore the sentence may, for example, type "US". The user may also select the highlight font level by entering a symbol such as "H" (82). The user then will define a FONT "US" designating the attribute of underscoring (86) or call such an underscoring Named Font from the system library of fonts. It is noted that, in the usual case, the Font is already defined so that the user does not need to designate its characteristics except, at most, the first time it is referenced. The system will then return the cursor from the specification entry area to its previous position in its text.

Presuming that the font "US" only specified the attribute of underscoring, our sentence "Now is . . . country." would be underscored and the previously discussed attributes of "good men" being italicized and "their country" being in boldface would additionally percolate up and remain in effect (88) when the document is produced on a laser-type printer. On the CRT, of course, these Fonts would likely be represented by special colors and display intensities.

The user has thereby specified three user levels of Fonts with respect to the same document portion. Although the number of levels so specifiable may be unlimited, the present invention contemplates the levels listed above which are specifiable by the user for overlapping textual material to be limited to a readily manageable level such as six to ten levels. If two Fonts are specified at the same Font level for the same range, then the most recent specification will override or reset the previous specification (but only to the extent the ranges overlap).

Figure 7:
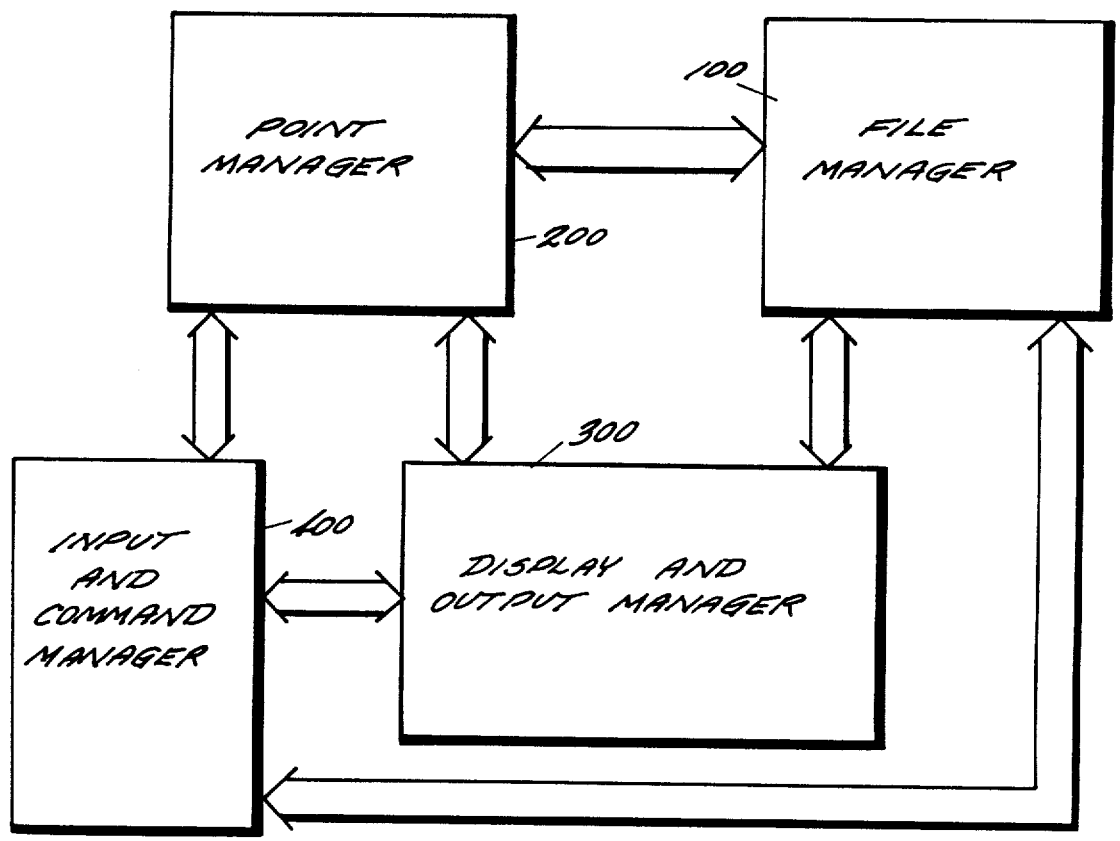
FIG. 7 is an overall block diagram of the subsystems which control the data processing system of the present invention.

FIG. 7 is a block diagram of the software subsystems which control the word processing document composition editor of the present invention. In the description which follows in order not to obscure the present invention, word processing control function details which are conventional and which do not assist in the understanding of the operation of the present invention will not be described in detail. Such conventional details will be readily understood and may readily be implemented by those of ordinary skill in the art. The subsystems shown in FIG. 7 may either be permanently stored in main storage, or may be loaded into main storage from external storage prior to the execution of their respective routines.

The components in FIG. 7 will be described generally first and then in more detail with respect to the figures which follow. Turning first to file manager 100, this subsystem keeps track of the location and reading and writing of data records in the file. The file manager is responsible for the efficient insertion and deletion of records. When records are inserted at a particular portion of the file, the remaining records must be shifted, either physically or logically, to accommodate the new records. The file manager keeps track of external or permanent "points". "Points" associated with a Font denote the document point where the Font begins and the document point where the Font ends. The "permanent" points refer to places in the document where a font has been set by the user and which involves a Font level that is permanently retained in the file. Fonts which have been set at the Base Font level the Mod Font, the Highlight Font, the Index Font, for example, are permanently retained in the file. The start and end range "points" of, for example, a Base level Font are monitored by the file manager.

Figure 8:
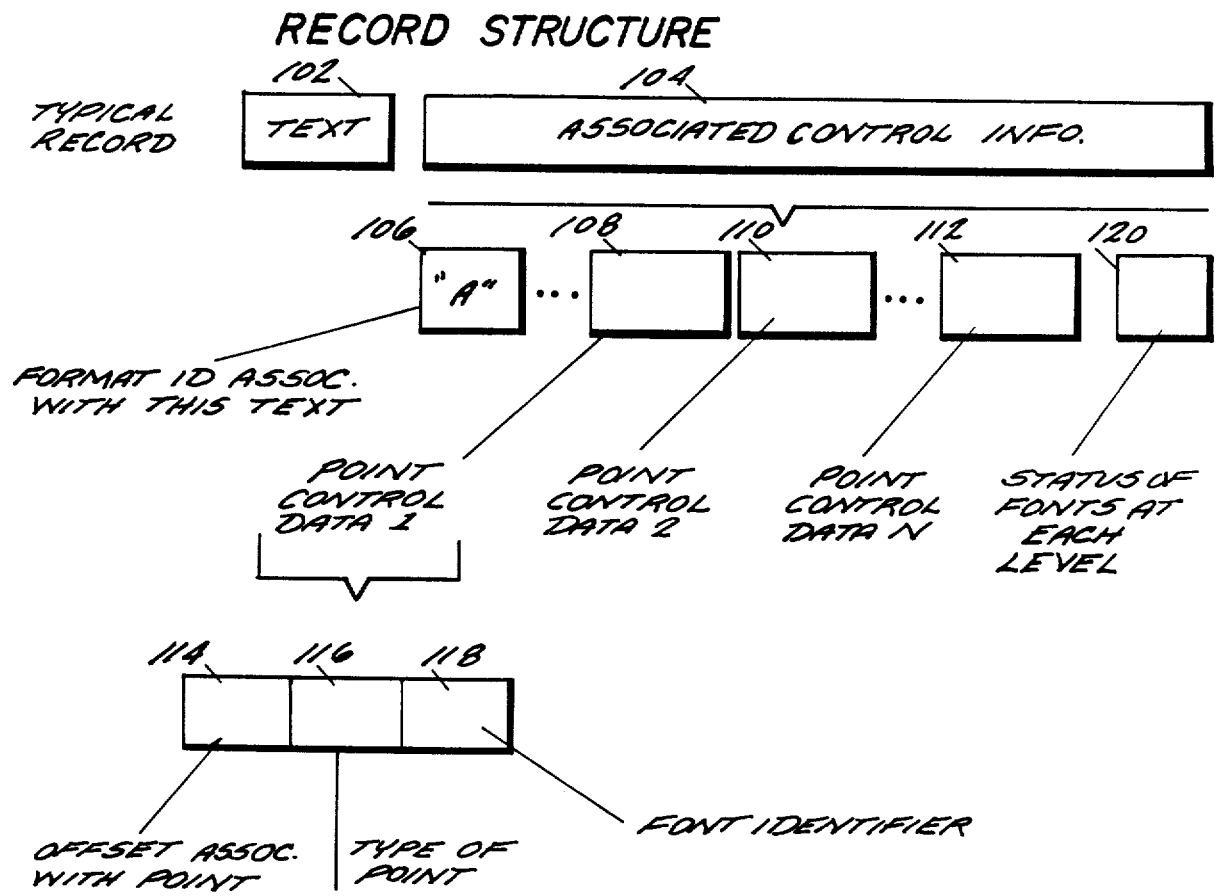
FIG. 8 shows the structure of a typical document record.

The file manager 100 keeps track of records by way of a pointer or address which specifies where each record is stored. Each record has the structure as shown in FIG. 8. The records are configured such that one record portion 102 stores the textual data and another record portion stores control information 104 relating to the "points" associated with the record. The text data is stored essentially in the same manner as it appears on the CRT screen, although this does not necessarily need to be the case.

The control information includes Format identifier 106, which defines the Format associated with the text. The identifier may include an index field, which points to the memory address where the format definition control statement is stored. Additionally, the control information includes point control data fields (108, 110 and 112) for the points associated with the record.

The record control information for any particular point defines the offset 114 (i.e., location relative to the first byte of the record) of the point in the text, the type of the point 116 (e.g. start of Font range, end of Font range), the level of the Font (base level, highlight level, footnote level, etc) and the identifier of the Named Font 118.

In the exemplary implementation, in addition to points which may be defined for a particular record, the control information also contains the names of whatever Fonts may be outstanding i.e., active, at each of the recorded levels (base, mod, highlighted, footnote, index, notes, etc) at the close of the record. This snapshot indicates the status of each Font level 120, whether it is off or on, and if on, what the Font ID is.

It is noted that it is within the scope of the present invention for the records to be structured so that the point defining information is actually embedded in the text as opposed to being stored as offsets from the start of the record or file. The essential aspect is that place marks, although associated with the text, and which define the nature and the range of Fonts associated with the record data, are not displayed to the user during composition.

The point manager 200 in FIG. 7, like the file manager 100, keeps track of points in the file associated with Fonts at predetermined levels. The Font levels for which the point manager is responsible are the control Font, the attention Font, the thinking Font and the system Font levels.

The point manager 200 keeps track of points in the file but the associated Fonts are not stored so as to be permanently associated with the document file, but rather are stored in an auxiliary storage. These Fonts may be thought of as being too transient to be permanently associated with the document file, e.g., the attention and control font levels relate only to the display during the current preparation session.

The point manager 200 keeps track of these more transient fonts with the use of point manager elements which contain much the same information as the offset and type of point information handled by the file manager. As will be explained further in regard to FIG. 11, these point manager elements are stored in a chained or linked fashion in which one point managing element points to the next point managing element in the chain.

Figure 9:
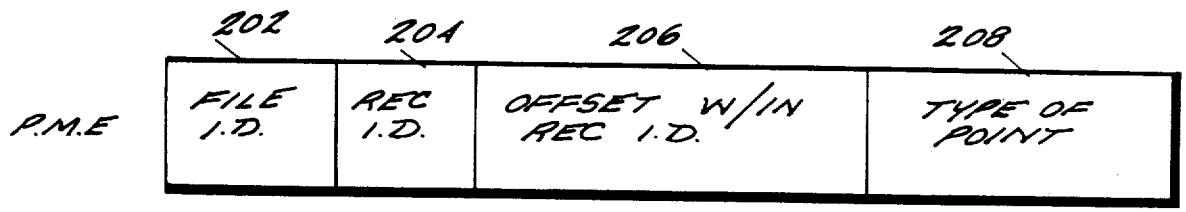
FIG. 9 generally shows the fields in a point manager element.

As shown generally in FIG. 9, a point managing element PME includes at least four fields and defines the file I.D. 202, which identifies the document being prepared, the record I.D. 204, and offset 206 which identifies a record within the file, and the offset within the record, i.e., the byte where the point starts or ends, the type of point information 208 and the identifying the name of the Font (or a pointer to where the Font specification is stored in auxiliary storage). The type of point information may include a wide range of control information concerning the point (e.g., see 110–118 in FIG. 8).

The point manager 200 also keeps track of single points (as opposed to points defining a range). In this fashion, the user can define a "bookmark" point by a designated name and then go back to that point in the text by calling for the designated name. The bookmark label is also stored in the PME.

The file manager 100 and the point manager 200 must interact when the file manager adds or deletes records. As will be readily apparent to those skilled in the art, the insertion or deletion of text and/or records by the file manager 100 may require the point manager 300 to shift the record I.D.'s in a coordinated fashion with the file manager so that the point manager accurately keeps track of text points (offsets and record IDs) as they shift positions in the file.

The system shown in FIG. 7 also includes a display and output manager 300. The display and output manager 300 keeps track of data which is to be displayed on the screen. In addition, this subsystem uses the parallel definitions of Formats and Fonts for the systems other output device and controls their respective output.

With respect to the CRT being used for document composition, the display manager 300 is responsible for insuring that the text is displayed in the manner in which it should be shown (e.g., a distinctive display, such as change of color or a flashing attribute in the control font mode). The display manager also responds to user commands which call for modifying the display of data (e.g., insert, delete, move, copy etc.).

As will be explained in further detail below, the display manager 300 must read the records, and build a font vector defining all the currently active fonts that exist for a given record at each font level (e.g., Default, Base, Format, Highlight, Mod, Footnote, Notes, Attention, Control etc.), beginning at the point where the record starts. The display manager obtains this information from the file manager 100 and/or the point manager 200. The initial font vector is built for each line which is being displayed. As the line is laid out on the screen, the active fonts relating to the next line to be displayed must be merged therewith.

The font vectors may be stored as a list in memory and these font vectors are loaded with information from the point manager 200 and the file manager 100. The point and file managers must be accessed to determine what Fonts were active for the records which are being displayed. Thus, the display manager 300 builds a line on the screen by determining the Fonts at each level which are active at the beginning of the record (by looking, e.g., at the Fonts active at the end of the previous record). Next, the display manager controls the display of each byte of the record and merges the information regarding the starting and stopping of the fonts from the point manager 200, the file manager 100 together with the format information (which defines the beginning and ending of the Format field and is contained in the stored Format specification). By such correlation, the final display for each character of each line is created.

The input and command manager 400 shown in FIG. 6 must read the input data from the CRT keyboard and decode the commands from the program function keys or commands which are otherwise entered. The input manager 400 determines whether an entry will have global effects, i.e., will require a reformatting of other records due to, for example, inserted or copied data. The input manager 400 interacts with the file manager 100 and point manager 200 of such instances so that the stored point information may be correspondingly adjusted. If necessary, the input and command manager 400 will reformat data in lines subsequent to the current lines into which data has been inserted according to each format associated with such subsequent lines until the end of a paragraph is reached. Such shifting requires that the points in the point and file managers be likewise adjusted.

FILE MANAGER

As noted above, the file manager keeps track of data records in the file. The file manager 100 as shown in FIGS. 10 A-C, serves to respond to calls (120) originating from the display manager 300 or the input manager 400 to retrieve the record currently being operated on based upon a specified record I.D. The file manager returns the record to the address indicated by the record I.D. after processing (122). Likewise, the file manager 100 also fetches when requested (124, 128) the successor to the record with the specified I.D.(126) as well as the predecessor to the record with the specified I.D.(130).

Figure 10A:
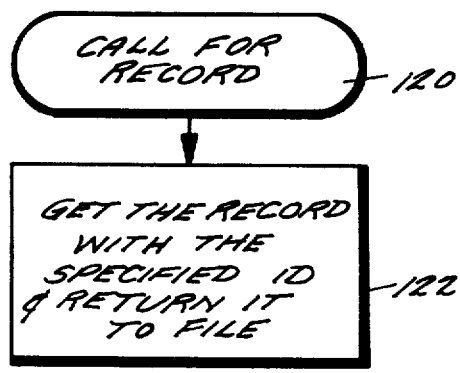
FIGS. 10A, B, C and D are flowcharts showing operations performed by the file manager.
Figure 10B:
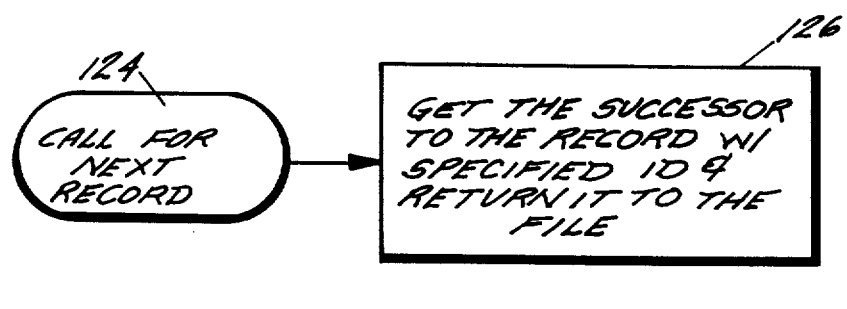
Figure 10C:
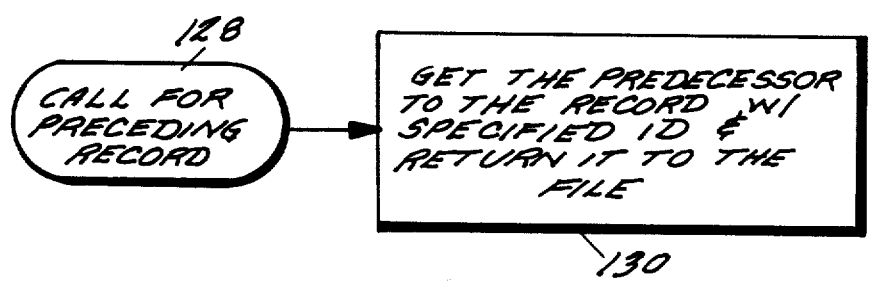
Figure 10D:
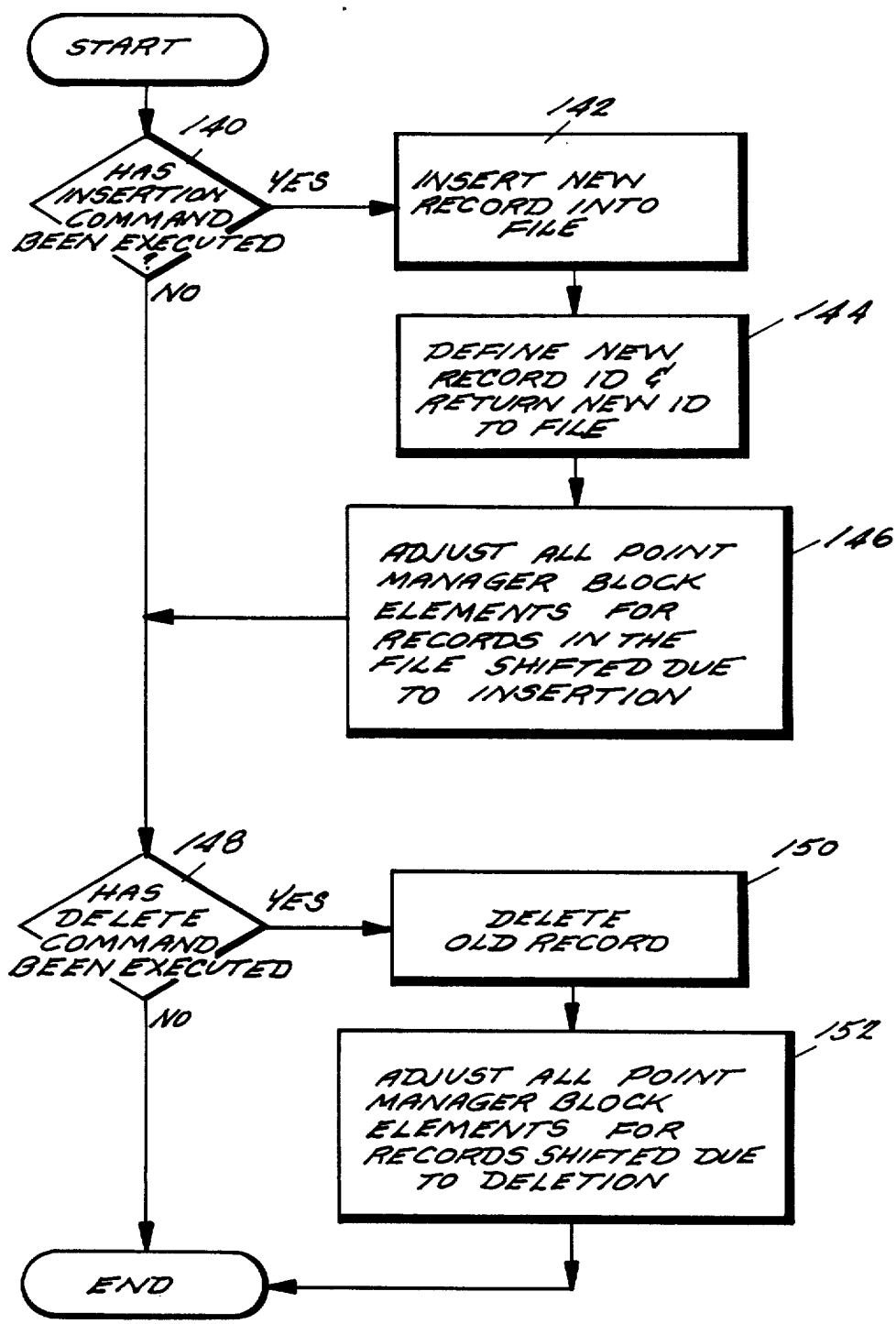

As shown in FIG. 10D, if an insertion command has been executed (140), such that a new record needs to be created, the new record and new record I.D. is inserted into the file after the specified record( 142, 144). Additionally, the file manager adjusts all point manager block elements shown in FIG. 9 to reflect any modified address information due to the insertion. Points are also subject to adjustment even when a small amount of text is inserted which doesn't actually create additional records.

The file manager similarly responds to any decoded deletion command (108) by deleting a range of text from one or more records and by updating all point manager elements for text and records which were shifted due to the delete operation (150, 152). It is noted that once a record is deleted, the point managing elements associated with that record are likewise deleted. It should be noted that moving and copying text is a combination of the delete and insert function.

POINT MANAGER

Figure 11:
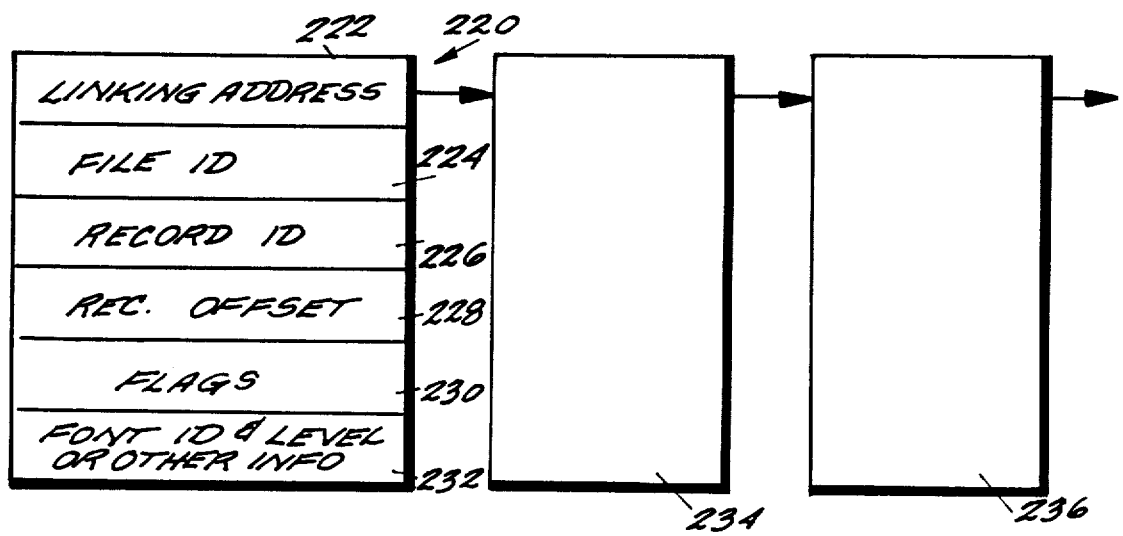
FIG. 11 shows linked point manager element blocks of the point manager.

Turning to further details of the point manager 200, as noted above, this component keeps track of points which are associated with Font levels and other miscellaneous points of interest which are not stored with the file records. The point manager 200 stores point blocks 220, 234, 236 which, as shown in FIG. 11, are chained together.

Each point block (e.g., 220) includes a chain address 222 which links one block to at least one other block. The block 220 further includes a pointer 224 which identifies the location in storage of the document file control block, a record identifying address 226, and a record offset 228 which identifies the point, i.e., the byte relative to the beginning of the record at which the point is located. Flag location 230 indicates the type of point (such as beginning or end indicators). Location 232 identifies the name of the font and the Font level. With respect to block 234, this linked block may define the end of a Named Font range.

Where multiple fonts are involved, a particular point must be linked with a number of different blocks rather than just a single block. Such linked points may be located within a single record or may span records.

The point manager 200 may be called upon by the input and command manager 400 to create a point in response to the depression of a "Create Point" program function key. Thus, when a Create Point key is depressed, a point block element will be created for the document point at which the CRT cursor is situated. This point which may denote the beginning of a Font Range, will be a temporary point while it is in the Control Font Level (see the definition above), i.e., while the user is in the process of specifying what is to be done with the range being defined. Likewise, a point block element is created for the point denoting the ending of the range. After a Font Name is associated with such a range, the Font is fully defined.

It should be remembered that the file manager 100 likewise keeps track of points. The points associated with the file manager, however, are "permanently" associated with the file. Like the point data stored with the file, the point manager 200 also stores Font level information (e.g., control, attention, etc.).

Figure 12:
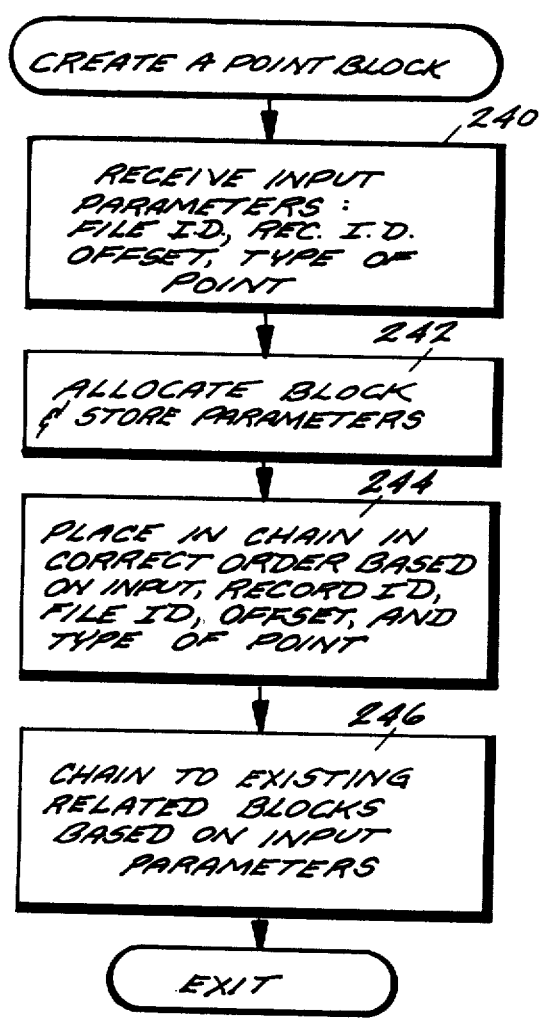
FIG. 12 is a flowchart showing how the point manager creates a point block.

As shown in FIG. 12, the point manager 200 uses file I.D., record I.D., offset within the record and type of point information as the input parameters for creating a point (240). The type of point information includes the range start, range end, Font I.D. and Font level indicia. The point manager 200 allocates a block of storage for the block and loads the above information into the block (242). The block is then positioned in the correct order. As shown in 244, the point manager positions and chains the allocated block to related blocks based on the file I.D., record I.D., offset and the point type information. During the positioning processing, if one point denoting a Font ending occurs at the same spot as another point denoting the beginning of a Font, the end point is recognized before the start point, and is assigned a point block element in the chain ahead of the point denoting the Font beginning.

When a point is deleted, the point manager removes the deleted point form the chain and frees the previously allocated storage. The point manager will typically be called upon to create a point by the input and command manager 400.

DISPLAY MANAGER

The display and output manager 300 controls the display of information according to the points which are provided as input. The first aspect of the display manager control is the movement of information to the proper display area as the document is constructed. The display manager positions the point at a desired position on the display window and builds the display by acquiring records from the file manager. The display manager expands the acquired records and consolidates the Fonts.

The display and output manager 300 additionally includes a subsystem which translates the expanded record format into a format having embedded command codes such that the aforementioned IBM Script Document Composition Facility (DCF) can take such output records and produce a hard copy on auxiliary devices, such as, for example, the IBM 4250 Electro Erosion page printer 8 shown in FIG. 1. Thus, to produce a hard copy document, the display and output manager 300 automatically takes the definitions of all the Named Formats and Named Fonts and creates a file having embedded commands suitable for driving the IBM Script DCF, a process which heretofore was highly labor intensive, having to be done manually.

To consolidate the Fonts and produce a CRT display, initially the display manager acquires a display window alignment specification to determine from what point on the display screen the display should commence, e.g., a display line near the top of the screen. The point manager element corresponding to the point in the record to be displayed is then acquired. This element specifies the record I.D. and the offset information which is used to determine the desired position of the display. This point identifies the record as, for example, being record 100 and may reference a particular word in the record. The referenced word is then taken and displayed on an anchor line on the display, i.e., a user chosen preferred location on the display to begin display on the display window as indicated by the aforementioned display window alignment specification. The display manager then accesses the file manager 100 to retrieve the previous record and the font specification associated with the previous record, goes through all the point manager elements to similarly find all the font specifications which are in effect at the start of the current record.

In this process, the display manager 300 finds the font specifications at each Font level which are logically open at the beginning of the record, i.e., where a Font specification start range has been set in a previous record but has not yet been closed. Then the display manager does an analysis to merge the Font information from the following three sources: (a) the record information itself, (b) the point manager element information, and (c) the format information as defined by the stored format specification.

The display manager sorts this information based on the respective offsets within the record. Next the display manager goes through the record to be displayed on a character by character basis and determines if any change need be made at a particular offset within the record. If the offset information indicates that a change needs to be made to the character in question, then such a change is made based upon the font specification identified by the point. The display manager then starts at the deepest Font level and superimposes or overlays each of the display attributes defined at each level on the characteristics of the aggregate of the preceding levels. In a similar fashion, the display and output manager performs a corresponding output managing process to control the distinctively defined display or hard copy characteristics specified by the Named Formats and Fonts for each of the output devices in the system.

Figure 13:
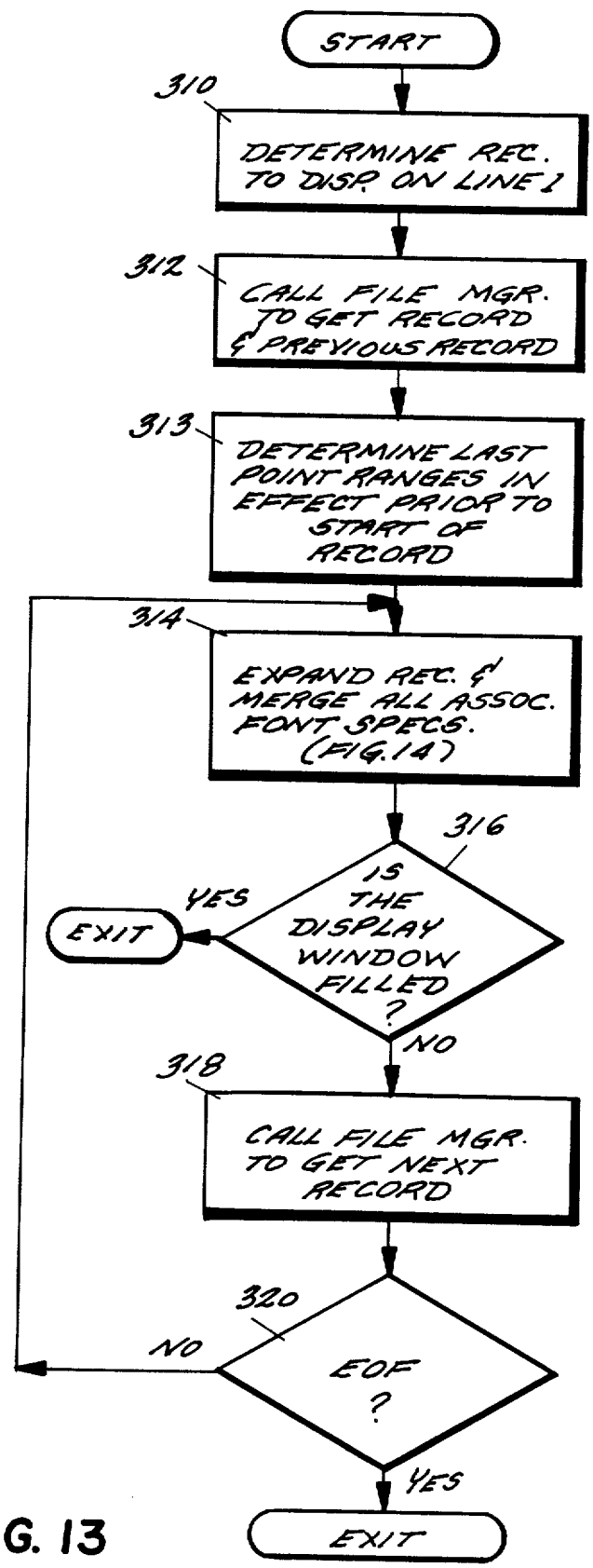
FIGS. 13–15 are flowcharts showing the basic sequence of operations performed by the display and output manager.
Figure 14:
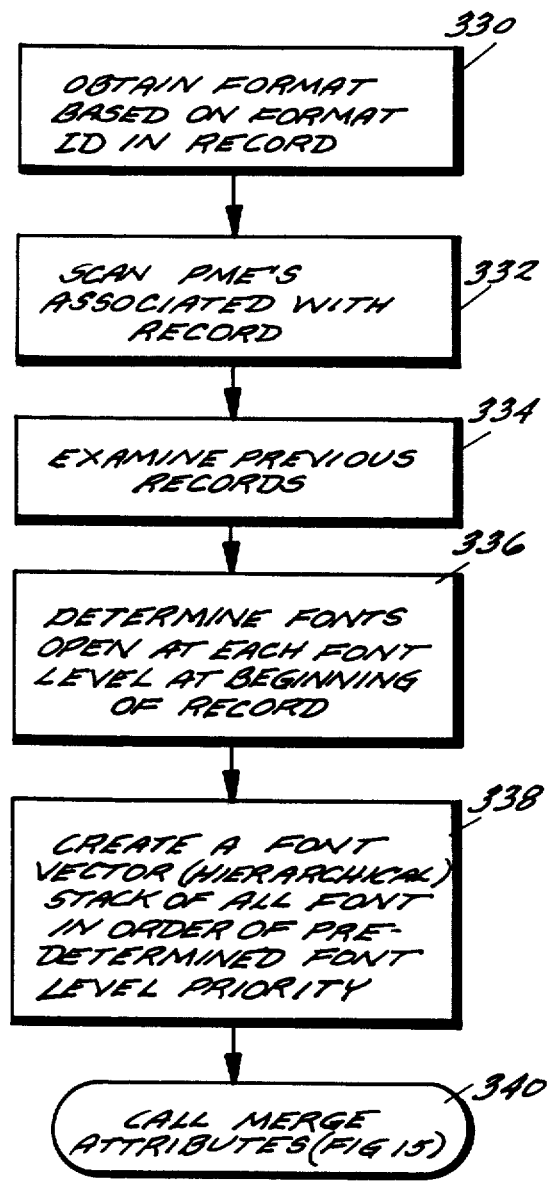
Figure 15:
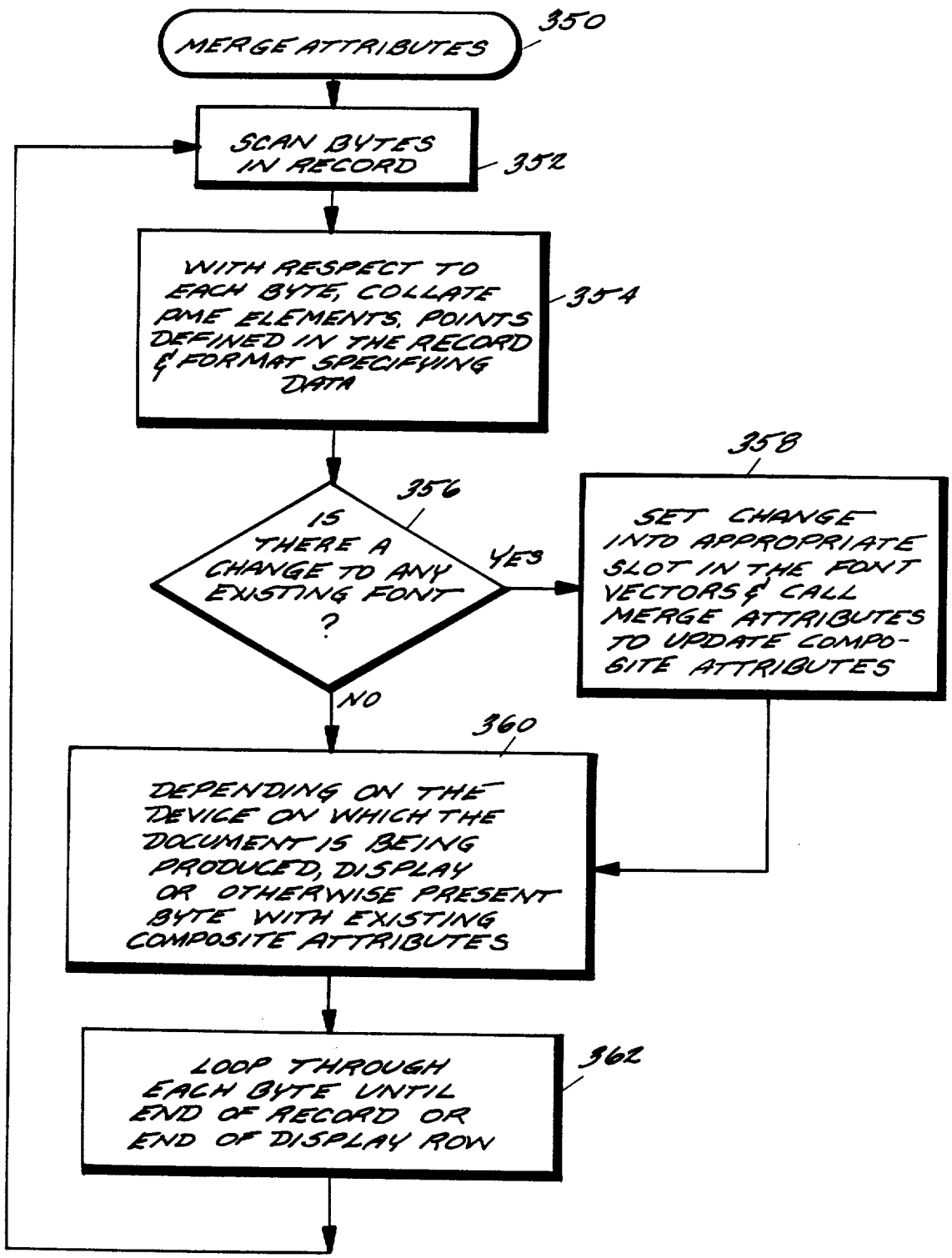

This display and output managing processing performed by the display and output manager 300 is detailed in the flowcharts of FIGS. 13–15. As shown in FIG. 13, the display manager determines the record to display on the first line of the display (310). The first line on the screen on which data may be displayed will be preceded by display lines allocated to a command line, an error line, a header line which indicates the file being operated on and a Format line which displays the active Named Format associated with the data record occupying the window's anchor line. The display manager calls the file manager to retrieve the desired record and the previous record (312) and checks to determine the last point ranges in effect prior to the start of the record (313).

Next as shown in FIG. 13, the record is expanded and all Font specifications associated with the record are merged (314). This process is further detailed in the flowchart of FIG. 14. An exemplary routine which accomplishes the function of expanding the record and merging all associated font specifications is set forth in Appendix "A" as the MAPOLINE routine. Next the display manager checks to determine whether the display window is now filled (316). If so, the display manager exits the routine. If not, the display manager calls the file manager 100 to retrieve the next record (318). The display manager next checks to determine whether the end of the file has been reached (320). If not, it loops back to expand the next record. The display manager exits the routine when the window is full, or the end of the file is reached.

One manner in which records may be expanded by the output display manager is shown in further detail in FIG. 14. It should be noted that the records are expanded so that they may be placed in a format (e.g., as required by the IBM script DCF system) for producing a final form hard copy or display for each output device being relied on for document production. Thus, the display and output manager 300 will reformat record information based on the previously defined Format and Font specifications for each target output device as for example shown with respect to the Named Format specification of FIG. 3 and the Named Font specification of FIG. 4.

As shown in FIG. 14, to expand the record, initially the Format must be obtained based upon a format identifier associated with the record as shown in FIG. 8. Next the display and output manager determines the fonts which are in effect, (i.e., a font range which has been started but not yet ended) at each Font level at the beginning of the record (336). The display and output manager makes this determination based on information obtained by scanning point manager elements associated with previous records obtained from the file manager (332, 334).

The display and output manager, in scanning the point manager elements and the records to find all fonts which have been opened and not closed prior to processing the current record (336), compares the record I.D. of the current record being processed to find a less than or equal record I.D.

Next, as shown in FIG. 14, the display and output manager creates a font vector, i.e., a hierarchical stack of fonts in the order of priority based on the previously discussed Font level hierarchy (338). As previously noted, the lowest priority font level is the system default level and the highest priority level is the control Font level. The GATHFONT listing in Appendix A shows an illustrative routine for gathering Fonts (e.g., the routine gathers attention and control Fonts) that are active to perform the functions shown in blocks 332–338. The GATHFONT routine is called by the aforementioned MAPOLINE routine to perform such functions.

The display and output manager 300 will, after initializing the Font vector stack, loop through the stack vector from the lowest to the highest level to determine whether a Font has been defined at the particular Font levels. If a Font has been defined, then all specified attributes are merged into the vector stack in accordance with a merging of attributes routine (340). An exemplary routine which accomplishes the function of merging Font attributes is set forth in Appendix "A" as the MERGFONT routine.

As shown in FIG. 15, the merge attributes routine is called and record processing is initiated (350). As each byte of the record is scanned (352), a check must be made to see if that position in the record is associated with a change to any font.

This determination is made based on a three way collation of point manager elements, points which are defined with the record and the stored format associated with the record (354). The point manager elements are retrieved from the point manager blocks which are chained together based on record I.D.'s and the offsets within the record which defines the points locations. The points within the record are obtained by accessing the control information associated with each record as shown in FIG. 8.

The display and output manager merges this information together. As indicated in FIG. 15, the display and output manager determines whether there is a defined change to any Font, e.g., an indication that a Font range must end (356). If not, then as shown in FIG. 15, the byte is displayed (or printed depending on the device in which the document is being produced) with the existing composite font (360), e.g., one which defines attributes for the byte to be high intensity and underlined. If there is a change in the Font, then the change is reflected by changing the appropriate slot in the Font vector. Then the merge attribute routine must be called again to recompile all entries in the Font vectors and then the byte will be displayed using the revised composite Font 358. After the data is displayed, the display manager will look at the next byte until the end of the record or until the end of the display is reached.

INPUT MANAGER

Figure 16:
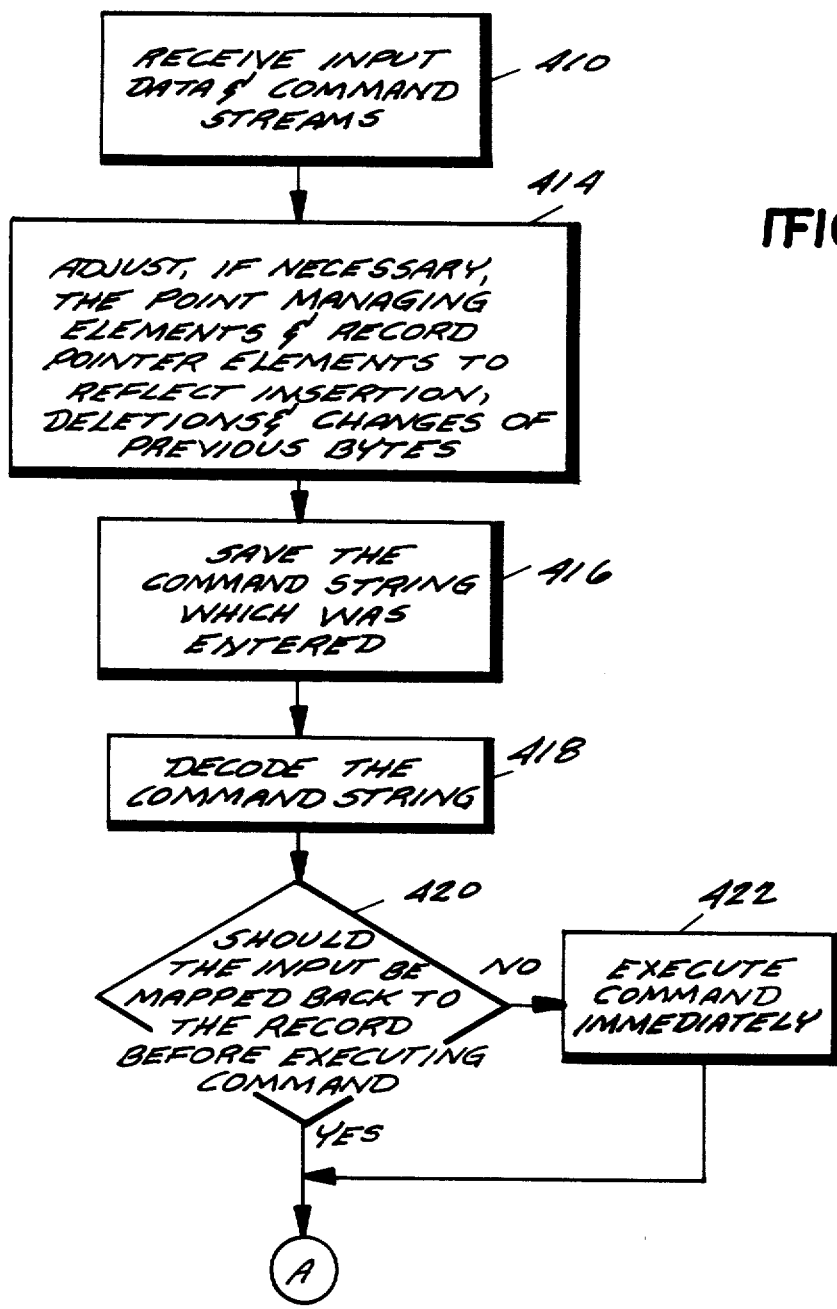

As shown in FIG. 16, the input and command manager 400 operates on an input data stream after the user has pressed "Enter" or used a program function key (410). The input manager merges the input data into the existing text to reflect changes, insertions and deletions. As necessary, the point manager elements and the record pointer elements are adjusted to reflect the insertion or deletion of previous bytes (414).

An entered command string is saved by the input handler and decoded (416 and 418). Next the input manager (400) determines whether the input should be mapped back to the record before executing the command (420). If the answer is no, the command is executed immediately (422). Although the majority of commands will require a remapping of the data, certain commands such as a "TAB" command are executed immediately, it being unnecessary and undesirable to rearrange or rejustify text before the cursor is moved to the tab position.

Figure 17:
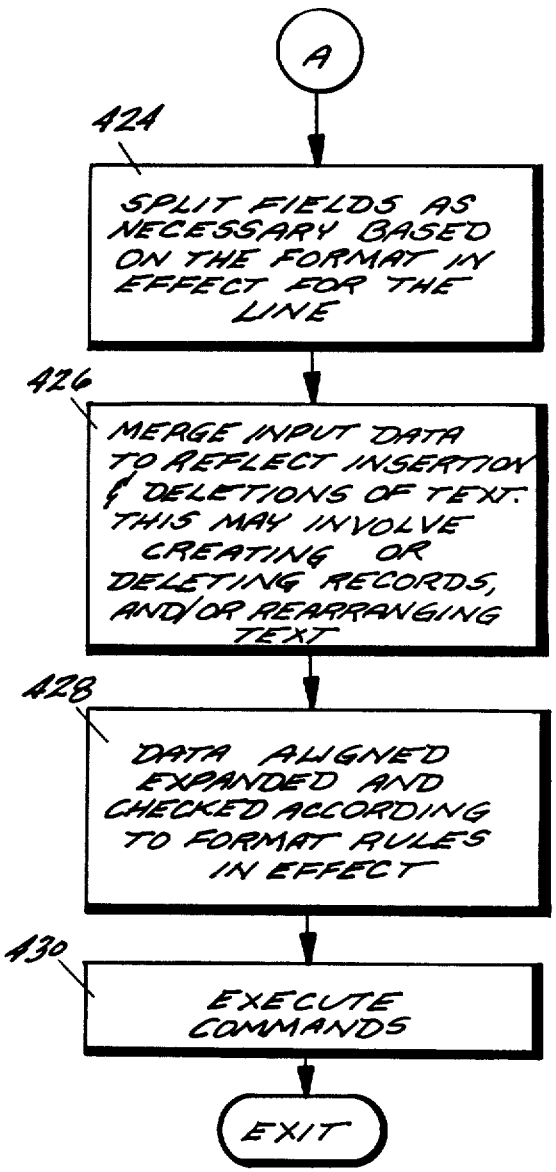
FIGS. 16–17 are flowcharts showing the basic sequence of operations performed by the input and command manager.

Entering further data into the record, may require a certain field to be rearranged. Under such circumstances, as shown in FIG. 17, the input manager splits fields as necessary based on the Format currently in effect for the line (424). Thus, the rules established by the Format in effect for the line are applied to the new characters added to the line.

As shown in FIG. 17, the input manager must adjust all pointers to reflect the movement of data due to the newly entered or deleted data and to the associated splitting or merging or regrouping of fields and records. In order to accomplish this, the input manager adjusts the point manager element pointers for the points which are stored external to the file. Likewise, the points defined in the file are changed to reflect the shifted or moved data. The input manager thus merges input data to reflect insertion and deletion of text. This may involve creating or deleting records and/or rearranging text (426). The data is also aligned, expanded, if necessary to fit the appropriate field, hyphenated, checked and verified according to the Format field rules discussed above (428) (such checking and verifying may, for example, include spell checking).

The input manager then executes any command initiated by the depression of a program function key or a command keyed in and entered by the user (430). The execution of any such command may, of course, also result in data insertion, deletion, rearrangement, etc. The functions initiated by the execution of a command relating to the Named Fonts and Formats have been explained in conjunction with the preceding description of the present invention. Some other commands shown below relate to conventionally performed functions in word processing systems (e.g., scroll commands) and will be apparent to those skilled in the art. The commands typically executed by the input and command manager 400 include, but are not limited to, the following:

Start Range for Font (at a particular level)
End Range for a Font Specification

Start Range for Delete
Start Range for Move
End Range for Move
Start Range for Copy
End Range for Copy
Start Range for Spellcheck
End Range for Spellcheck
Next Paragraph
Scroll Forward
Scroll Backward
Scroll Left
Scroll Right
Jump to a Line
Jump to Top
Jump to Bottom
Jump to a Point Previously Defined
Define Format
Define Font
Change Format Associated with a Line
Change Format Associated with all Lines in a Paragraph
Change Format Associated with all Lines in a Range
Change Font Association
Display All Named Formats
Display All Named Font Definitions
Display Detailed Specification of Format
Update Detailed Specification of Format
Change the Command Associated With Program Function Key
Display the Program Function Key Commands
Highlight Level Select
Base Level Select
Mod Level Select
Note Level Select
Create Point Based on the above detailed description of the invention including the flowcharts relating to the file manager 100, point manager 200, display and output manager 300, and the input and command manager 400, those of ordinary skill in the art will appreciate that specific programs may be routinely written for a given data processing system to implement that which is claimed. By way of example only, the assembly language routines designed to run on an IBM 370 which have been referred to above in the specification are shown in Appendix A below. Data structures which are utilized by the routines in Appendix A are shown in Appendix B.

APPENDIX A

The exemplary MAPOLINE, GATHFONT and MERGFONT routines referred to above are set forth below:

APPENDIX B

The above routines utilize the following data structures: POINTDEF (defines the various types of points that can exists), PMR (position marker element which defines the point manager elements), FASE (Font attribute specification element) and FMTSPEC (Format: specification). These data structures are shown below.

While the present invention has been described in terms of its presently preferred form, it is not intended that the invention be limited only by the described embodiment. It will be apparent to those skilled in the art that many modifications may be made which nevertheless lie within the spirit and intended scope of the invention as defined in the claims which follow.

```
            TITLE 'MAPOLINE - MAP OUTPUT LINE FOR DISPLAY PURPOSES'
***************************************************************************
*                                                                         *
*                         M A P O L I N E                                 *
*              MAP OUTPUT LINE FOR DISPLAY PURPOSES                       *
*                                                                         *
* DESCRIPTION -                                                           *
*       THIS ROUTINE MAPS AN OUTPUT RECORD ONTO INTO AN                   *
*       ITEMAREA VECTOR IN PREPARATION FOR ULTIMATE DISPLAY.              *
*                                                                         *
*       A NEW ITEMAREA VECTOR IS CONSTRUCTED IN A TEMPORARY               *
*       HOLDING AREA).  THE FINAL RESULT IS LATER COMPARED                *
*       WITH THE EXISTING DATA, IF ANY, AND THE FIELDS WHICH              *
*       ARE CHANGED ARE MARKED FOR EVENTUAL 3270 DISPLAY.                 *
*                                                                         *
* INPUT -                                                                 *
*       R1      -> PARAMETER LIST                                         *
*               +00  -> RECORD IMAGE TO BE EXPANDED FOR DISPLAY           *
*               +??  -> RECORD IDENTIFIER (B/R)                           *
*               +08  -> INPUT FONT VECTOR (WILL BE MODIFIED ON EXIT)      *
*               +12  -> WORD WITH ROW COUNT LIMITATION                    *
*               +16  -> WINDAREA (PINNED)                                 *
*               +20  -> FILEDEFN (PINNED)                                 *
*       R12     -> TEWA                                                   *
*                                                                         *
* OUTPUT -                                                                *
*       R15     >=0  => R15 = OFFSET (IN TEWAMAPA) OF LAST ITEMAREA;      *
*                       R0  = NUMBER OF UNDISPLAYED RHS RECORD BYTES.     *
*               =-1  => UNEXPECTED STRUCTURE ERROR.                       *
*               =-2  => INSUFFICIENT STORAGE                              *
*                                                                         *
*       COPYRIGHT 1986, ADDISON FISCHER - ALL RIGHTS RESERVED.            *
***************************************************************************
            SPACE 1
********************** DEFINE PARAMETER LIST ******************************
            PUSHSECT ,
MAPLPARM    DSECT ,                      DEFINE PARAMETER LIST
MAPLRECA    DS    A                      -> RECORD IMAGE TO BE EXPANDED
MAPLRECI    DS    A                      -> RECORD IDENTIFIER (BLOCK/RECORD)
```

```
MAPLFONV  DS      A                      -> INPUT FONT VECTOR
                                            (WILL BE MODIFIED ON EXIT)
MAPLXROW  DS      A                      -> WORD WITH ROW COUNT LIMITATION
MAPLWIND  DS      A                      -> (PINNED) WINDAREA
MAPLFILE  DS      A                      -> (PINNED) FILEDEFN
          SPACE   1
*************** DEFINE IMMEDIATE LOCAL WORKING AREA *****************
MAPLAREA  DSECT ,                        DEFINE IMMEDIATE LOCAL WORK AREA
MAPLCURB  DS      F                      CURRENT OFFSET IN RECORD
MAPLPREV  DS      F                      PREVIOUS OFFSET IN RECORD
MAPLUSED  DS      F                      AMOUNT OF TARGET AREA USED
MAPLLAST  DS      F                      OFFSET OF LAST ITEMAREA IN TEWAMAPA
MAPLTEMP  DS      F                      TEMPORARY WORK WORD
MAPLWSIZ  DS      F                      WORK AREA TO CONTAIN SIZE
MAPLIAMT  DS      F                      SIZE OF INSERTION
          SPACE   1
**** FLAG USED TO CONTROL PROGRAM
MAPLSUDO  DS      CL2                    PSUEDO-NULL FROM MAINAREA
MAPLTARC  DS      CL2                    TARGET IDENTIFIER FROM MAINAREA
          SPACE   1
MAPLTABF  DS      X                      HARDWARE TAB FLAG BYTE FOR MAPFIELD
MAPLHTAB  EQU     X'80'                  => HARDWARE TAB DESIRED (=MAPPHTAB)
MAPLFLGS  DS      X                      FLAG BYTE FOR OUR OWN USAGE
MAPLIEOR  EQU     X'80'                  => INSERTION CAN BLANK TO END-OF-ROW
MAPLFFIF  EQU     X'40'                  => WE ARE ON FINAL FIELD IN FORMAT
          SPACE   1
MAPLFMTA  DS      A                      -> EFFECTIVE (ACTIVE) FORMAT IMAGE
MAPLFMTO  DS      A                      -> ORIGINAL FORMAT IMAGE
MAPLRPDZ  DS      F                      OFFSET BEYOND NORMAL RPD VECTOR
MAPLFMTC  DS      A                      -> CURRENT FORMAT FIELD (0 IF NONE)
                                            (APPEARS IN ACTIVE FORMAT SPEC)
MAPLRESI  DS      F                      AMOUNT OF STORAGE NOT DISPLAYED
MAPLZERL  EQU     *-MAPLAREA              LENGTH TO AUTOMATICALLY ZERO
          SPACE   1
**** WORK BUFFER TO SATISFY MOST RE-CONSTRUCTED FORMATS
MAPLWORK  DS      8D                     IMMEDIATE WORK AREA
          DS      0F
MAPLFMTW  DS      XL128                  SATISFY MOST FORMAT SIZES
MAPLLNGH  EQU     *-MAPLAREA              LENGTH OF LOCAL WORK AREA
          POPSECT ,
          SPACE   1
**** INDICES TO DEFINE THE SOURCE OF THE POINT (PME, RDE OR FMT)
WITHPME   EQU     0                      0
WITHRPD   EQU     1                      1
WITHFMT   EQU     2                      2
WITHMAX   EQU     3                      MAXIMUM NUMBER OF ELEMENTS
          SPACE   1
          USING   TEWA,R12
MAPOLINE  PUSHDOWN BASE=R11,SAVE=YES,TYPE=STACK, LINKAGE                +
                WORK=(MAPLLNGH,MAPLAREA,R9)
          XC      MAPLAREA(MAPLZERL),MAPLAREA  PERFORM AUTOMATIC ZERO
          SPACE   1
          LR      R8,R1                  RETAIN POINTER TO PARM FIELD
          USING   MAPLPARM,R8
          L       R2,MAPLRECA            -> START OF INPUT RECORD
          USING   RECORD,R2
          SPACE   1
* GET SPECIAL WORK VALUES FROM MAINAREA
          L       R14,TEWAMAIN           -> MAINAREA
          USING   MAINAREA,R14
          MVC     MAPLSUDO,MAINSUDO      VALUE OF PSUEDO-NULLS
          MVC     MAPLTARC,MAINTARC      VALUE OF 'TARGET' CHARACTER
          DROP    R14
          SPACE   1
*********************************************************************
*                                                                   *
*           OBTAIN CORRECT UNDERLYING FORMAT-POINT VECTOR            *
*                                                                   *
*    IF THE RECORD VIOLATES THE BASIC FORMAT SPECIFCATION (WHICH     *
*    ONLY HAPPENS IF SOME OF THE FIELDS HAVE BEEN 'STRETCHED'),      *
*    THEN WE MUST CONSTRUCT ADJUSTED FORMAT POINTERS.                *
*                                                                   *
*********************************************************************
          SPACE   1
**** GET ADDRESS OF UNDERLYING FORMAT
          LA      R0,RECORD              -> RECORD FOR WHICH WE WANT THE FMT
          L       R1,MAPLFILE            -> FILEDEFN
          CALL    GETFORMT               GET ADDRESS OF (PINNED) FORMAT BLOCK
          LTR     R7,R15                 ADDRESS OF TRUE FMTSPEC
          BNP     MAPL0800               EXIT IF NOT
          USING   FMTSPEC,R7
          SPACE   1
          ST      R7,MAPLFMTA            SAVE ADDRESS OF EFFECTIVE 'FMTSPEC'
          ST      R0,MAPLFMTO            SAVE ADDR OF POSS ORIGINAL FMT IMAGE
          SPACE   1
```

```
**** SET POINTER TO STANDARD FORMAT POINT VECTOR
        AH      R7,PMTPVOFF         -> START OF POINT VECTOR
        USING   FMTPOINT,R7
        SPACE 1
***********************************************************************
*                                                                     *
*              ACCESS RECORD POINT DEFINITION VECTOR                  *
*                                                                     *
***********************************************************************
        SPACE 1
*    COMPUTE END OF RPDE VECTOR
        LH      R14,RECSIZE         SIZE OF ENTIRE RECORD
        LA      R14,RECORD(R14)     -> BYTE FOLLOWING RECORD
                                    (WHICH FOLLOWS RPD VECTOR).
        ST      R14,MAPLRPDZ        SAVE END OF RPDE LIST
        SPACE 1
**** LOCATE START OF THE RECORDED-POINT VECTOR VECTOR
        LH      R6,RECTEXTZ         TEXT SIZE
        TM      RECFLAGS,RECGRAFX   GRAPHICS EXTENSION?
        BZ      *+6
        AR      R6,R6               ALLOW FOR EXTENSION
        LA      R6,RECTEXT(R6)      -> START OF RECORDED POINT DEFNS
        SPACE 1
        CR      R6,R14              DOES VECTOR EXIST?
        BL      *+8                 JUMP IF SO
        LA      R6,DUMMYRPD         ELSE USE DUMMY 'TERMINATING' RPDE
        USING   RPDE,R6
        SPACE 1
***********************************************************************
*                                                                     *
*              ACCESS POINTER-MARKERS FOR THIS RECORD                 *
*                                                                     *
***********************************************************************
        SPACE 1
**** LOCATE START OF POINTER-MARKERS FOR THIS RECORD
        L       R5,MAPLPILE         -> ASSOCIATED FILE DEFINITION
        USING   FILEDEFN,R5
        CALL    PMMFIND,VL=NO,MF=(E,MAPLWORK),                          +
                (FILESELF,          (RSM) FILE IDENTIFIER               +
                <MAPLRECI>,         -> RECORD IDENTIFIER                +
                =A(0))              START WITH OFFSET = 0
        DROP    R5
        SPACE 1
        LTR     R5,R15              ASSUME WE HAVE A POINTER-MARKER?
        BNZ     *+8                 JUMP IF SO
        LA      R5,DUMMYPME         ELSE INDICATE POINT-MARKER ABSENCE
        USING   PME,R5
        SPACE 1
*****************  INITIALIZE ITEMAREA VECTOR  ************************
        SR      R0,R0               START WITH FIRST OF WORK BUFFER
        L       R1,MAPLWIND         -> ASSOCIATED WINDOW AREA
        CALL    MAPOPRFX            CONSTRUCT PREFIX IN WORK VECTOR
        LTR     R15,R15             INSURE SUCCESSFUL
        BM      MAPLO800
        DROP    R2
        SPACE 1
***********************************************************************
*                                                                     *
*              LOCATE NEXT SIGNIFICANT POINT IN RECORD                *
*                    (AND SOURCE DEFINING IT)                         *
*                                                                     *
***********************************************************************
        SPACE 1
**** CONSTRUCT ITEMS TO BE DISPLAYED
*    R8 -> INPUT PARM FIELD
*    R7 -> FMTPOINT VECTOR (WORKWORK = NUMBER OF ENTRIES THEREIN)
*          (MAY BE EITHER ORIGINAL OR TEMPORARY VECTOR)
*          (-> DUMMY ENTRY WHEN EXHAUSTED)
*    R6 -> RECORDED POINT DEFINITIONS (FROM INPUT RECORD)
*          (-> DUMMY IF NONE, OR EXHAUSTED)
*    R5 -> FIRST PME ASSOCIATED WITH THIS RECORD
*          (-> DUMMY IF NONE, OR EXHAUSTED)
*
*    R4 = 4 * INDEX SPECIFYING SOURCE OF THIS POINT DEFINITION
*             (WITHFMT, WITHRPD OR WITHPME)
*    R3 = 4 * FUNCTION INDEX ASSOCIATED WITH POINT SPECIFICATION
        SPACE 1
**** DETERMINE NEXT SIGNIFICANT POINT IN RECORD
*    COMPUTE R14 = NEXT POINT TO PROCESS
FROMTOP DS      0H
        LA      R4,4*WITHFMT        ASSUME ITEM COMES FROM 'FORMAT'
        SR      R2,R2
        ICM     R2,B'0111',FPNTPOSN POSITION/TYPE INFO
```

```
                CLM     R2,B'0111',RPDEPOSN     NEXT RPDE MORE INTERESTING?
                BNH     *+12                    NO - GO CHECK PME
                SPACE   1
*       NOT READY TO USE FORMAT-POINT YET, TRY RECORDED-POINT-DEFN
                LA      R4,4*WITHRPD            ASSUME WE WILL USE VALUE FROM 'RPDE'
                ICM     R2,B'0111',RPDEPOSN     NEXT RPDE MORE INTERESTING?
                CLM     R2,B'0111',PMEPOSN      IS PME PREFERABLE?
                BH      *+12                    NO - AVOID USING IT YET.
                SPACE   1
*       USE POINT-MANAGER POINT
                LA      R4,4*WITHPME            INDICATE PME VALUE BEING USED
                ICM     R2,B'0111',PMEPOSN
                SPACE   1
*************** NEXT SIGNIFICANT POINT LOCATED ******************
                L       R14,MAPLRECA            -> INPUT RECORD
                USING   RECORD,R14
                CLM     R2,B'0110',RECTEXTZ     BEYOND MAXIMUM RECORD SIZE?
                BNH     *+12                    JUMP IF NOT
                LA      R2,PNTFINIS             ASSUME 'FINISH' FOR TEXT
                SPACE   1
*************** NEXT SIGNIFICANT POINT LOCATED ******************
                L       R14,MAPLRECA            -> INPUT RECORD
                USING   RECORD,R14
                CLM     R2,B'0110',RECTEXTZ     BEYOND MAXIMUM RECORD SIZE?
                BNH     *+12                    JUMP IF NOT
                LA      R2,PNTFINIS             ASSUME 'FINISH' FOR TEXT
                ICM     R2,B'0110',RECTEXTZ     SMALLEST OFFSET FOLLOWING TEXT
                DROP    R14
                SPACE   1
*       SEPARATE OFFSET AND FUNCTION CODE
                LA      R3,X'FF'                MASK TO ISOLATE TYPE-INDEX
                NR      R3,R2                   GET WORKING FUNCTION INDEX
                CL      R3,=Y(POINTMAX)         INVALID FUNCTION CODE?
                ERROR   NL                      YES, THIS IS DATA/LOGIC ERROR       +
                                                (ALTHOUGH CAN BE CREATED BY BAD FILE)
                SLL     R3,2                    *4 FOR FUNCTION OFFSET
                SPACE   1
                SRL     R2,8                    ISOLATE THE OFFSET SPECIFICATION
                ST      R2,MAPLCURR             THIS IS CURRENT FIELD
                B       PROCESS1(R3)            PERFORM TRUNCATION IF NECESSARY
                SPACE   1
****************************************************************
*                                                               *
*               TRUNCATE PREVIOUS FIELD (IF ANY)                 *
*                                                               *
****************************************************************
                SPACE   1
PROCESS1 VECTABLE MAX=POINTMAX,         ROUTINE TO ANALYZE TRUNCATION      +
                (PNTSTART,PROCESS3(R4)),        00 START-OF-RECORD    IGNORE +
                (PNTINAFT,INSERTXX),            01 INSERT-AFTER-PREVIOUS     +
                (PNTFONTE,TRUNCPRV),            02 FONT-RANGE END            +
                (PNTFMTND,FUNCT006),            03 FORMAT-FIELD END          +
                (PNTFMTST,TRUNCPRV),            04 FORMAT-FIELD START        +
                (PNTPARAI,PARAIDNT),            05 PARAGRAPH INDENT          +
                (PNTFONTS,TRUNCPRV),            06 FONT-RANGE START          +
                (PNTTARGT,TRUNCPRV),            07 TARGET (MOVE/COPY,ETC)    +
                (PNTEXACT,TRUNCPRV),            08 PRECISE-POINT MARKER      +
                (PNTINDEF,INSERTXX),            09 ACTIVE INSERT-POINT       +
                (PNTSFTAB,PROCESS3(R4)),        11 SOFTWARE TAB       IGNORE +
                (PNTNULLS,PROCESS3(R4)),        12 START NULLS   TEMP IGNORE +
                (PNTAPPRX,PROCESS3(R4)),        13 APPROXIMATE POINT  IGNORE +
                (PNTFINIS,TRUNCPRV),            14 END OF PROCESSING         +
                (PNTAPPND,AFTRINST)             15 APPEND PSEUDO-NULLS
                TITLE   'MAPCLINE - PARAGRAPH INDENTATION'
****************************************************************
*                                                               *
*               CONDITIONAL HANDLING FOR PARAGRAPH INDENTATION   *
*                                                               *
****************************************************************
                SPACE   1
*       IF THIS IS START-OF-PARAGRAPH RECORD, AND INDENTATION
*       STARTS BEFORE THE NORMAL LHS, THEN USE THIS AS FIELD-START.
*
PARAIDNT DS     0H
                CH      R4,=Y(4*WITHFMT)        IS THIS ACTUALLY 'FORMAT' SPEC?
                BNE     PROCESS3(R4)            NO - TAKEN CARE OF BY NEW FMT ITEM
                SPACE   1
***     DETERMINE INDICATOR OF CURRENT FORMAT FIELD
                SR      R14,R14
                IC      R14,FPNTFLDX            FORMAT FIELD INDEX
                MH      R14,=Y(FFLDLNGH)        OFFSET INTO FIELD VECTOR
                LA      R14,FMTFIELD-FMTSPEC-FFLDLNGH(R14)   OFFSET OF FMTFIELD
                A       R14,MAPLFMTA            GET ABSOLUTE POINTER
                USING   FMTFIELD,R14
                SPACE   1
***     IS THIS FORMAT FIELD ALREADY UNDERWAY?
```

```
            C         R14,MAPLFMTC        FIELD ALREADY STARTED?
            BE        PROCESS3(R4)        YES - SO IGNORE THIS POINT
            SPACE     1
*     RECOGNIZE PARAGRAPH START ONLY IF START-OF-PARAGRAPH
            L         R15,MAPLRECA        -> RECORD
            USING     RECORD,R15
            TM        RECTYPE,RECPARAS    IS THIS PARAGRAPH START?
            BZ        PROCESS3(R4)        NO - SO IGNORE THIS POINT
            B         TRUNCPRV            TREAT THIS LIKE FORMAT-START
            DROP      R15
            DROP      R14
            TITLE     'MAPOLINE - TRUNCATE PREVIOUS FIELD'
***********************************************************************
*                                                                     *
*                     TRUNCATE PREVIOUS FIELD                         *
*                                                                     *
***********************************************************************
            SPACE     1
*     IF LENGTH IS NOT POSITIVE, THEN NOTHING TO TRUNCATE
TRUNCPRV    DS        0H
            L         R0,MAPLCURR         CURRENT OFFSET LESS
            S         R0,MAPLPREV         PREVIOUS OFFSET = SIZE TO DISPLAY
            BZ        PROCESS2(R3)        NIL - NOTHING TO TRUNCATE
            ERROR     M                   ERROR IF LENGTH IS NEGATIVE
            ST        R0,MAPLWSIZ         SIZE TO BE DISPLAYED
            SPACE     1
***   INVOKE MAPFIELD TO TRUNCATE THIS ITEM
            L         R14,MAPLRECA        -> START OF THE RECORD
            USING     RECORD,R14
            SR        R2,R2               ASSUME NO AUXILIARY TEXT
            LA        R15,RECTEXT         -> START OF TEXT
            SPACE     1
            TM        RECFLAGS,RECGRAFX   AUXILIARY GRAPHICS STRING?
            BZ        *+10                JUMP IF NOT
            LH        R2,RECTEXTZ         SIZE OF EACH TEXT SEGMENT
            AR        R2,R15              -> START OF SECONDARY AREA
            DROP      R14
            ST        R15,MAPLTEMP        THIS IS TEMPORARY POINTER
            SPACE     1
***   CUT THE CURRENT FIELD & MOVE TO ITEMAREA BUFFER
            CALL      MAPFIELD,VL=NO,MF=(E,MAPLWORK),                 +
                      (<MAPLFONV>,        USE INPUT FONT VECTOR       +
                      <MAPLTEMP>,         -> PRIMARY DATA             +
                      0(,R2),             AUXILIARY CODE-MODIFIER (IF ANY) +
                      MAPLWSIZ,           WORD WITH LENGTH OF THE FIELD +
                      MAPLCURR,           WORD WITH 'OFFSET' OF THE FIELD +
                      =AL1(0),            INDICATE ORDINARY FIELD     +
                      <MAPLXROW>,         OVERALL ROW DEPTH LIMITATION +
                      <MAPLWIND>,         -> WINDOW                   +
                      MAPLLAST,           -> WORD WITH OFFSET OF LAST ITEMAREA +
                      MAPLTABF)           BYTE WITH X'80' => HARDWARE TAB
            LTR       R15,R15             WHAT IS RESULT OF OPERATION?
            BM        MAPL0800            JUMP IF WE HAVE AN ERROR
            SPACE     1
            MVC       MAPLPREV,MAPLCURR   CURRENT BECOMES PREVIOUS
            NI        MAPLTABF,X'FF'-MAPLHTAB   RESET 'HARDWARE-TAB' FLAG
            LTR       R0,R0               ARE MAXIMUM REQUESTED ROWS FULL?
            BNM       PROCESS2(R3)        NO - JUMP IF POSSIBILITY EXISTS TO +
                                          DISPLAY MORE.
            SPACE     1
*     IF WE HAVE EXACT MATCH, THEN 'LINEDONE' AND 'DATAWRTN' WILL
*     BOTH SHOW THAT NO RESIDUAL RECORDDATA REMAINS.
            B         LINEDONE            ELSE EXIT - DISPLAY IS FULL
            SPACE     1
***********************************************************************
*                                                                     *
*         VECTOR TABLE - AFTER NECESSARY TRUNCATION DONE              *
*                                                                     *
***********************************************************************
            SPACE     1
PROCESS2    VECTABLE  MAX=POINTMAX,       ROUTINE TO ANALYZE TRUNCATION +
                      (PNTINAFT,INSERTXX),  01 INSERT-AFTER-PREVIOUS   +
                      (PNTFONTF,FUNCT002),  02 FONT-RANGE END          +
                      (PNTFMTND,FUNCT006),  03 FORMAT-FIELD END        +
                      (PNTFMTST,FUNCT003),  04 FORMAT-FIELD START      +
                      (PNTPARAI,FUNCT003),  05 FORMAT-FIELD-INDENT     +
                      (PNTFONTS,FUNCT004),  06 FONT-RANGE START        +
                      (PNTTARGT,TARGETXX),  07 TARGET (MOVE/COPY,ETC)  +
                      (PNTEXACT,FUNCT005),  08 PRECISE-POINT MARKER    +
                      (PNTINBEF,INSERTXX),  09 ACTIVE INSERT-POINT     +
                      (PNTFINIS,DATAWRTN),  14 END OF PROCESSING       +
                      (PNTAPPND,AFTRINST)   15 APPEND PSEUDO-NULLS     +
                                          ITEM. USED BY INSERT TO CONTROL +
                                          RETURN FROM 'TRUNCATE'.
```

```
               TITLE 'MAPOLINE - PERFORM INSERTION AT CURRENT POINT'
***************************************************************************
*                                                                         *
*                    PREPARE 'INSERTION' AT CURRENT POINT                 *
*                                                                         *
* NOTE -                                                                  *
*                                                                         *
*      BECAUSE LEADING ROWS MAY BE TRIMMED (IF WE ARE FILLING             *
*      THE SCREEN IN AN UPWARDS DIRECTION) OR CLIPPED (OVERLAID           *
*      BY OTHER WINDOWS), WE DELAY COMPUTING THE 'PREFERRED'              *
*      INSERTION CURSOR POINT UNTIL THINGS ARE MORE FINALIZED.            *
*                                                                         *
* NOTE -                                                                  *
*                                                                         *
*      SIZE OF THE INSERTION AREA VARIES ACCORDING TO                     *
*      FIELD SIZE AND TYPE:                                               *
*                                                                         *
*      1.  GIVEN "N" = INSERT COUNT (ORIGINALLY SPECIFIED ON              *
*          THE INSERT COMMAND, AND NOW CARRIED IN THE PME),               *
*      2.  INSERT.SIZE = MAX (20, N * CURRENT.FIELD.SIZE)                 *
*      3.  IF THIS DOES NOT OVERFLOW THE CURRENT ROW, THEN THIS           *
*          IS EXACTLY THE SIZE.                                           *
*      4.  IF THIS DOES OVERFLOW THE ROW, THEN WE MAY EXTEND THE          *
*          INSERTION RANGE FURTHER TO THE END OF THE CURRENT IF:          *
*          A.  THE FIELD IS WRAPPABLE (LAST FIELD IN THE LINE), AND       *
*          B.  THE INSERTION DOES NOT EXTEND TO LAST ALLOWED ROW.         *
*                                                                         *
***************************************************************************
         SPACE 1
**** IGNORE INSERT IF:
*     . THIS INSERT POINT IS INACTIVE
*     . THE CURRENT ITEM IS PROTECTED
*     . THIS IS NOT THE FINAL FIELD IN THE LINE
*     . FIELD IS MARKED NOT-INSERTABLE
*
INSERTXX DS    0H                   INSERT BLANKS AT CURRENT POINT
         NI    MAPLFLGS,X'FF'-MAPLIEOR   RESET THE INSERTION FLAGS
         LA    R3,4*PNTEXACT        THIS BECOMES PRECISE-POINT
         TM    PMETYPE,PMEACTIV     IS THIS PME ACTIVE?
         BZ    TRUNCPRV             NO - SO SIMPLY USE ATTR TO HOLD POS.
         SPACE 1
**** DETERMINE SIZE OF THE LOGICAL FORMAT FIELD
         L     R15,MAPLFMTA         -> ACTIVE FORMAT HEADER
         USING FMTSPEC,R15
         L     R14,MAPLFMTC         -> ACTIVE FORMAT SPECIFICATION
         LTR   R14,R14              HAVE WE REACHED FIRST FIELD?
                                    (OR THE INDENT POINT THERETO)
         BZ    TRUNCPRV             AVOID INSERTION BEFORE FIELD
         USING FMTFIELD,R14
         CLC   FFLDINDX,FMTFLDCT+L'FMTFLDCT-L'FFLDINDX LAST FIELD?
         BNE   *+8                  JUMP IF NOT
         B     *+8
    MNOTE 1,'WE MAY NOT HAVE THE PRECEEDING COMPARE CORRECT'
         OI    MAPLFLGS,MAPLFFIF    SHOW THIS IS FINAL FIELD IN FORMAT
         SPACE 1
**** DETERMINE SIZE OF THE FIELD
         TM    FFLDATTR,FFLDWRAP    IS FIELD WRAPPABLE?
         BZ    *+8                  JUMP IF NOT
         OI    MAPLFLGS,MAPLFFIF    SHOW THIS IS FINAL FIELD IN FORMAT
         SPACE 1
         MNOTE 2,'FOLLOWING CHECK ONLY FOR VERSION 1 - UNTIL WE SUPPORT+
               FORMAT ''STRETCHING'''
         TM    FFLDATTR,FFLDWRAP    DOES FIELD SUPPORT WORD WRAP?
         BZ    TRUNCPRV             NO - THEREFORE AVOID INSERTION
         SPACE 1
         LH    R0,FFLDEND           OFFSET BEYOND END OF FIELD
         SH    R0,FFLDSTRT          GIVES LENGTH OF FIELD
         ERROR NP                   WHAT HAPPENED HERE??
         DROP  R14
         SPACE 1
**** SET INSERTION COUNT
         LH    R15,PMEINSRT         COUNT OF 'LINES' TO INSERT
         LTR   R15,R15              INSURE POSITIVE
         BP    *+8
         LA    R15,1                NUMBER MUST BE POSITIVE
         SPACE 1
**** COMPUTE SIZE OF INSERTION
         MR    R14,R0               THIS GIVES BYTE COUNT
         CH    R15,=Y(20)           ALWAYS TAKE AT LEAST 20 BYTES
         BNL   *+8
         LA    R15,20               ELSE USE MINIMUM VALUE
         ST    R15,MAPLIAMT         SAVE INSERT BYTE COUNT FOR LATER
         SPACE 1
**** DETERMINE IF WE HAVE UNCLOSED LEFT-CONTIGUOUS DATA
         CLC   MAPLCURR,MAPLPREV    DETERMINE IF CURRENT = PREVIOUS
         BE    STARTINS             YES - NO DATA; INSERT IS NEW FIELD
```

```
        ERROR L                      SHOULD NEVER EVER HAPPEN
        SPACE 1
**** THIS IS INSERTION WITH DATA TO THE LEFT
        LA      R3,4*PNTAPPND        SET FOR RETURN TO 'APPEND' ROUTINE    +
                                     AFTER WE TRUNCATE THIS DATA.
        B       TRUNCPRV             TRUNCATE PREVIOUS DATA
        SPACE 1
***************************************************************************
*                                                                         *
*           RETURN AFTER INSERT TO AUGMENT LEFT-CONTIG DATA                *
*                                                                         *
***************************************************************************
        SPACE 1
* REGISTERS AS ON RETURN FROM 'MAPFIELD':
*    R0  = NUMBER OF VISIBLE BYTES REMAINING IN ROW
*    R1  = NUMBER OF BYTES ABSORBED
*    R15 = NUMBER OF ROWS ENCOMPASSED BY ENTIRE LINE
**** TRY TO AUGMENT PREVIOUS FIELD BY ADDING RIGHT-HAND NULLS.
        SPACE 1
AFTRINST DS     0H
        L       R14,MAPLLAST         OFFSET OF CURRENT FINAL ITEMAREA
        A       R14,TEWAMAPA         -> MOST RECENTLY ADDED ENTRY
        USING   ITEMAREA,R14
        SPACE 1
        SR      R1,R1                PRETEND NO INSERTION AREA YET ADDED
        TM      ITEMTYPE,ITMPROT     IS THIS PROTECTED?
        BZ      FILLOUT              NO - THEREFORE INSERT AT END OF DATA
        DROP    R14
        SPACE 1
***************************************************************************
*                                                                         *
*           INSERTION STARTS/RESUMES AT NEXT AVAILABLE FIELD               *
*                                                                         *
***************************************************************************
        SPACE 1
STARTINS DS     0H
        CALL    MAPFIELD,VL=NO,MF=(E,MAPLWORK),                             +
                (<MAPLFONV>,         -> CALLER'S FONT VECTOR                +
                MAPLSUDO,            -> PSEUDO-BLANK                        +
                0,                   NO AUXILIARY CODE-POINTS               +
                =A(1),               TRY TO INSERT SINGLE BYTE FIELD        +
                MAPLCURR,            CURRENT RECORD OFFSET                  +
                =AL1(ITEMISRT),      SHOW THIS IS 'INSERTED' FIELD          +
                <MAPLXROW>,          MAXIMUM ROWS ALLOWED FOR THIS LINE     +
                <MAPLWIND>,          -> WINDOW                              +
                MAPLLAST,            -> WORD WITH OFFSET OF LAST ITEMAREA   +
                =AL1(0))             NO HARDWARE TAB
        LTR     R15,R15              PERMANENT ERROR?
        BM      MAPLCR00             ERROR IF SO
        LTR     R0,R0                NUMBER OF AVAILABLE COLUMNS IN ROW
        BM      NODATAXX             EXIT IF FINAL ROW IS FINISHED
        SPACE 1
**** IF ZERO BYTES ACTUALLY PROCESSED, THEN WE KNOW
*       THE FIELD IS PROTECTED AND INSERTION IS IMPOSSIBLE.
        LCR     R1,R1                WAS ANYTHING INSERTED?
        BZ      PROCESS3(R4)         INSERTION DISALLOWED, RETURN
        SPACE 1
***************************************************************************
*                                                                         *
*           FILL OUT LATEST ITEM WITH BLANKS/NULLS                         *
*                                                                         *
***************************************************************************
        SPACE 1
*    R0  = NUMBER OF AVAILABLE COLUMNS IN ROW
*    R1  = NEGATIVE OF NUMBER OF BYTES JUST INSERTED
*    R15 = NUMBER OF ROWS ENCOMPASSED BY THIS ENTIRE LINE
**** DETERMINE IF WE SHOULD WE FILL OUT THE ROW TO THE END
FILLOUT DS      0H
        A       R1,MAPLIAMT          DEDUCT NUMBER BLANKS JUST INSERTED
        ST      R1,MAPLIAMT          THIS GIVES COUNT YET-TO-INSERT
        CR      R1,R0                YET-TO-INSERT EXCEED BALANCE IN ROW?
        BNL     USEFCST              YES - SO EXPRESS FULL REQUEST
        SPACE 1
*     ONLY PARTIAL LINE REQUESTED - SHOULD WE FILL IT ALL THE WAY OUT?
        L       R14,MAPLXROW         -> WORD WITH ROW-LIMIT
        CL      R15,0(,R14)          ARE WE CURRENTLY ON LAST ROW?
        BNL     USEFCST              YES - DO NOT BE TOO GENEROUS W/SPACE
        SPACE 1
        TM      MAPLFLGS,MAPLIEOR    SHOULD WE INSERT TO END-OF-ROW?       +
                                     (SET WHEN FMTFIELD EXAMINED)
        BZ      USEFCST              YES - SO USE FULL ROW
        LR      R1,R0                ELSE REQUEST FULL ROW
        SPACE 1
```

```
*************************************************************
*                                                           *
*            INSERT (PSEUDO-) NULLS AS NEEDED               *
*                                                           *
*************************************************************
         SPACE 1
*** REQUEST FULL AMOUNT OF INSERTION (EVEN IF IT EXCEEDS ROW)
*   R1 = NUMBER OF BYTES TO REQUEST TO INSERT INTO THIS ROW
ISREQST  DS    0H
         LR    R2,R1              NUMBER OF BYTES TO INSERT
         CALL  XTNDITEM,VL=NO,MF=(E,MAPLWORK),                 +
               (MAPLSUDO,          USE PSEUDO NULL            +
               (R2),               MAXIMUM SIZE TO EXTEND     +
               MAPLLAST,           WORK BUFFER OFFSET OF LAST ITEMAREA +
               <MAPLWIND>)         -> ASSOCIATED WINDOW
         LTR   R15,R15             SUCCESSFUL?
         BM    MAPL0800            NO - INSUFFICIENT STORAGE
         BZ    PROCESS3 (R4)       EXIT WHEN INSERTION IS COMPLETE
         SPACE 1
         ST    R15,MAPLLAST        SAVE AMOUNT YET TO BE INSERTED
         B     STARTINS            YES, INSERT UNTIL EXHAUSTED
         TITLE 'MAPOLINE - FONT-RANGE START/END'
*************************************************************
*                                                           *
*                    FONT-RANGE START                       *
*                                                           *
*************************************************************
*
*   RPDE - DEFINES BASE, MODIFIER OR HIGHLIGHT FONT
*   PME  - DEFINES CONTROL FONT.
*
FUNCT004 DS    0H
         B     *+4(R4)             LOAD CORRECT FONT VALUE
         VECTABLE MAX=WITHMAX,                                 +
               (WITHPME,F004XPME),                             +
               (WITHRPD,F004XRPD),
         SPACE 1
F004XRPD DS    0H
         LH    R1,RPDMULTI         GET FILE'S FONT INDEX VALUE
         L     R15,MAPLFILE        -> ASSOCIATED FILE
         USING FILEDEFN,R15
         L     R15,FILEFONV        -> FILE'S FONT VECTOR
         DROP  R15
         LH    R0,0(R1,R15)        GET CORRECT FONT INDEX
         B     F002XRPD            THEN DETERMINE LEVEL FOR VALUE
         SPACE 1
*** PROCESS POINT-MANAGER ELEMENT
F004XPME DS    0H
         LH    R0,PMEFONTI         GET FONT INDEX
         B     F002XPME            THEN PROCESS THIS FONT
         SPACE 2
*************************************************************
*                                                           *
*                    FONT-RANGE END                         *
*                                                           *
*************************************************************
*
*   RPDE - DEFINES BASE, SPECIFICATION OR HIGHLIGHT FONT
*   PME  - DEFINES CONTROL FONT.
*
FUNCT002 DS    0H
         SR    R0,R0               WE ARE CLEARING FONT-INDEX VALUE
         B     *+4(R4)             PICK UP SOURCE OF THE POINT
         VECTABLE MAX=WITHMAX,                                 +
               (WITHPME,F002XPME),                             +
               (WITHRPD,F002XRPD),
         SPACE 1
*** HANDLE BASE, MODIFIER OR HIGHLIGHT FONT FROM RPDE
*   R0 = VALUE (OR ZERO) TO BE SET AT SPECIFIED LEVEL
F002XRPD DS    0H
         SR    R14,R14
         IC    R14,RPDLEVEL        EXTERNAL LEVEL CODE (KEPT INDIRECTLY +
                                   TO ALLOW MORE PROGRAM ENHANCEMENTS  +
                                   WITHOUT HAVING TO RE-FORMAT FILES).
         CH    R14,=Y(XOFFTABZ)    INSURE CORRECT INDEX
         ERROR NL                  ERROR IF INCORRECT FILE
         SPACE 1
         IC    R14,XOFFTABL(R14)   GET INTERNAL INDEX VALUE
         B     SETFONTX            THEN SET FONT SPECIFICATION
         SPACE 1
*** THIS IS CONTROL-FONT FROM PME
F002XPME DS    0H
         LA    R14,2*FONTCNTL      ASSUME CONTROL LEVEL
         TM    PMETYPE,PMFCNTRL    IS THIS CONTROL POINT?
```

```
            BNZ     SETFONTX                JUMP IF SO
            LA      R14,2*FONTATTN          ELSE THIS IS ATTENTION LEVEL
            B       SETFONTX
            SPACE   1
**** INSERT ADJUSTED SPECIFICATION INTO FONT VECTOR
SETFONTX    DS      0H
            L       R15,MAPLFONV            -> FONT-VECTOR
            STH     R0,0(R14,R15)           SAVE REVISED FONT VALUE
            B       PROCESS3(R4)
            SPACE   1
**** FOLLOWING TABLE INDEXED BY 'RPDLEVEL' AS INDEX
XOFFTABL    DC      AL1(2*FONTBASE,2*FONTMAIN,2*FONTFORM,2*FONTFOOT)
            DC      AL1(2*FONTXREF,2*FONTHLIT,2*FONTHLT2,2*FONTNOTE)
XOFFTABZ    EQU     *-XOFFTABL              SIZE OF LEVEL REFERENCE TABLE
            TITLE   'MAPOLINE - FORMAT-RANGE START'
***********************************************************************
*                                                                     *
*                       FORMAT-RANGE START                            *
*                                                                     *
***********************************************************************
*
*   IF PRESENT IN RPDE, THEN IT WILL BE ENCOUNTERED TWICE
*    - ONCE IN THE RPDE
*    - AND AGAIN IN THE SPECIALLY MODIFIED FMT VECTOR.
*
*   HOWEVER, DUPLICATE ENCOUNTERS SHOULD NOT BE A PROBLEM, SINCE
*   THEY OCCUR WITH THE SAME INFO AND THE SAME BYTE.
*
FUNCT003    DS      0H
            CH      R4,=Y(4*WITHFMT)        IS THIS ACTUALLY 'FORMAT' SPEC?
            BNE     PROCESS3(R4)            NO - TAKEN CARE OF BY NEW FMT ITEM
            SPACE   1
**** SAVE INDICATOR OF CURRENT FORMAT FIELD
            SR      R14,R14
            IC      R14,FFMTFLDX            FORMAT FIELD INDEX
            MH      R14,=Y(FFLDLNGH)        OFFSET INTO FIELD VECTOR
            LA      R14,FMTFIELD-FMTSPEC-FFLDLNGH(R14)   OFFSET OF FMTFIELD
            A       R14,MAPLFMTA            GET ABSOLUTE POINTER
            ST      R14,MAPLFMTC            SAVE CURRENT FMT FIELD
            USING   FMTFIELD,R14
            SPACE   1
*   ALSO SAVE FONT WHICH STARTS WITH THIS FIELD
            LH      R0,FFLDFONT             GET FONT IDENTIFIER FOR THIS FIELD
            L       R15,MAPLFONV            -> FONT VECTOR
            STH     R0,2*FONTFMT(R15)       SET NEW FORMAT FONT LEVEL
            DROP    R14
*           MVC     NULLFILL,=Y(MAX)        RESET NULL FILLING
            B       PROCESS3(R4)
            TITLE   'MAPOLINE - PROCESS ''TARGET'' POINT'
***********************************************************************
*                                                                     *
*                       PROCESS 'TARGET' POINT                        *
*                                                                     *
***********************************************************************
*
*   USE 'FMT' INFO TO CONSTRUCT PROPER CONTROL-FONT FOR THE TARGET
*   POINT.  IT WILL BE RESTORED AFTER THIS SINGLE POINT.
*
TARGETXX    DS      0H
            L       R14,MAPLFONV            -> FONT VECTOR
            LH      R2,2*FONTCNTL(,R14)     RETAIN CURRENT CONTROL FONT
            LH      R0,PRFFONTI             GET FONT FOR TARGET VALUE
            STH     R0,2*FONTCNTL(,R14)     SET REVISED FONT
            SPACE   1
            CALL    MAPFIELD,VL=NO,MF=(E,MAPLWORK),                        +
                    (<MAPLFONV>,            -> FONT VECTOR                 +
                    MAPLTARC,               -> TARGET DATA CHARACTER       +
                    MAPLTARC+1,             -> AUXILIARY CHARACTER SET INFO+
                    =A(1),                  LENGTH OF THIS FIELD           +
                    =A(0),                  RECORD OFFSET NOT PERTINENT    +
                    =AL1(ITEMPROT+ITEMMARK), SHOW PROTECTED MARKER ITEM    +
                    <MAPLXROW>,             SPAN ROWS IF PERMITTED         +
                    <MAPLWIND>,             -> WINDOW                      +
                    MAPLIAST,               -> WORD WITH OFFSET OF LAST ITEMAPPA +
                    =AL1(0))                NO HARDWARE TAB
            SPACE   1
*** RESTORE PREVIOUS CONTROL VALUE, BEFOR CONTINUING
            L       R14,MAPLFONV            -> FONT VECTOR
            STH     R2,2*FONTCNTL(,R14)     RESTORE PREVIOUS CONTROL FONT
            LTR     R15,R15                 INSURE ALL IS WELL
            BM      MAPL0800                EXIT IF WE HAVE AN ERROR
            LTR     R0,R0                   IS REQUESTED DISPLAY ENTIRELY FULL?
            BNM     PROCESS3(R4)            NO - CONTINUE PROCESSING
            B       NODATAXX                ELSE EXIT IF DATA DISPLAYED BEFORE +
                                            THE RECORD IS DONE.
```

```
         TITLE 'MAPOLINE - PRECISE-POINT DEFINITION'
*********************************************************************
*                                                                   *
*                    PRECISE-POINT DEFINITION                       *
*                                                                   *
*********************************************************************
*
*       THERE ARE PRESENTLY THREE TYPES OF PRECISE-POINTS:
*       1.  HARDWARE TAB
*             - FORMAT SPECIFICATION
*       2.  NAMED-LABEL
*             - RPDE: IGNORED (THE DATA IS ALSO STORED IN THE PME)
*             - PME:  INCLUDES BOTH PERMANENT & TEMPORARY NAMED POINTS
*       3.  INACTIVE (HISTORICAL) INSERT-POINTS
*             - PME:  THESE ARE PREVIOUS INSERT POINTS TO WHICH THE
*                     USER MAY WISH TO AUTOMATICALLY RETURN.
*
*       THE ONLY CASE IN WHICH SPECIAL WORK IS REQUIRED IS FOR A
*       HARDWARE TAB - WE SET A SPECIAL FLAG TO FORCE AN INSERTED
*       ATTRIBUTE BYTE.
*
FUNCT005 DS     0H
         CH     R4,=Y(4*WITHFMT)    FROM FORMAT SPECIFICATION?
         BNE    PROCESS3(R4)        NO - CANNOT BE HARDWARE-TAB
         SPACE  1
         L      R14,MAPLWIND        -> ASSOCIATED WINDOW
         USING  WINDAREA,R14
         TM     WINDFLGS,WINDPROT+WINDQUAL  VIEW PROTECTED OR QUALIFIED?
         BNZ    PROCESS3(R4)        YES - AVOID INSERTING HARDWARE TAB
         DROP   R14
         SPACE  1
**** SET TO INSERT HARDWARE TAB ON NEXT CALL TO 'MAPFIELD'
         OI     MAPLTABF,MAPLHTAB   SHOW HARDWARE TAB PRESENT AT POINT.
         B      PROCESS3(R4)        (NEW FIELD ALREADY STARTED)
         SPACE  1
*********************************************************************
*                                                                   *
*                       FORMAT-FIELD END                            *
*                                                                   *
*********************************************************************
*
*       IF PRESENT IN RPDE, THEN THIS WILL BE ENCOUNTERED TWICE
*       FOR THE SAME SPECIFICATION -
*       - ONCE IN THE RPDE
*       - AND AGAIN IN THE SPECIALLY MODIFIED FMT VECTOR.
*
*       HOWEVER, DUPLICATE ENCOUNTERS ARE NOT BE A PROBLEM, SINCE
*       THEY OCCUR WITH THE SAME INFO AND THE SAME BYTE.
*
*       THIS DOES NOT ACTUALLY CAUSE A NEW FIELD TO BE STARTED, ALTHOUGH
*       IT WILL AUTOMATICALLY START NULL INSERTION (UNLESS THE FOLLOWING
*       CHARACTER IS A REQUEST FOR BLANK FILLING).  THIS FORMAT ATTRIBUTE
*       IS MAINLY APPLICABLE WHEN THE LINE IS BEING FORMATTED.
*
FUNCT006 DS     0H
         B      PROCESS3(R4)
         TITLE 'MAPOLINE - ADVANCE TO NEXT SPECIFICATION'
*********************************************************************
*                                                                   *
*           ADVANCE JUST-PROCESSED SPECIFICATION POINTER            *
*                                                                   *
*********************************************************************
         SPACE  1
PROCESS3 VECTABLE MAX=3,
               (WITHFMT,NEXTFMT),    ADVANCE FMTPOINT ELEMENT       +
               (WITHRPD,NEXTRPD),    ADVANCE TO NEXT RPDE           +
               (WITHPME,NEXTPME)     ADVANCE TO NEXT PME
         SPACE  2
***************** ADVANCE TO NEXT FORMAT POINTER ********************
NEXTFMT  DS     0H
         LA     R7,FPNTLNGH(,R7)    ADVANCE TO NEXT FMT POINTER ELEMENT
         B      FROMTOP
         SPACE  1
***************** ADVANCE TO NEXT RECORDED-POINT ELEMENT ************
NEXTRPD  DS     0H
         LA     R6,RPDELNGH(,R6)    ASSUME THERE IS ANOTHER RPDE
         C      R6,MAPLRPD2         DOES THIS EXCEED RPDE VECTOR?
         BL     FROMTOP             JUMP IF SO
         LA     R6,DUMMYRPD         ELSE USE DUMMY RPD
         B      FROMTOP
         SPACE  1
***************** ADVANCE TO NEXT POINT-MANAGER ELEMENT ************
NEXTPME  DS     0H
         LR     R14,R5              RETAIN ADDRESS OF CURRENT PME
         L      R5,PMENEXT          OFFSET OF NEXT PME
```

```
           LTR     R5,R5                  HAVE WE REACHED THE END?
           BNP     USEDUMMY               JUMP IF SO
           A       R5,TEMAPHYA            -> ACTUAL ASSOCIATED PME
           SPACE   1
**** INSURE NEXT PME IS FOR SAME RECORD
           CLC     PMERECID,PMERECID-PME(R14)   NEXT PME FOR SAME RECORD?
           BNE     USEDUMMY
           CLC     PMEFILE,PMEFILE-PME(R14)     SAME FILE?
           BE      PFOMTOP                YES - THEREFORE POINT FOR SAME RECORD
           SPACE   1
USEDUMMY   DS      0H
           LA      R5,DUMMYPME            USED WHEN ALL OTHER PMES EXHAUSTED
           B       PFOMTOP                PROCESS WITH DUMMY PME
           SPACE   1
*******************************************************************
*                                                                 *
*       DISPLAY GROUP FULL - SOME RIGHT-HAND DATA NOT DISPLAYED   *
*                                                                 *
*******************************************************************
           SPACE   1
NODATAXX   DS      0H                     COME HERE WHEN NO REAL DATA DISPLAYED
           SR      R1,R1                  ROW IS FULL
           SPACE   1
* R1 = NUMBER OF DATA BYTES EFFECTIVELY DISPLAYED IN CURRENT SET
LINEDONE   DS      0H
           A       R1,MAPLCURR            GIVES OFFSET BEYOND DISPLAYED DATA
           L       R14,MAPLRECA           -> RECORD
           USING   RECORD,R14
           LH      R0,RECTXTZ             SIZE OF THE RECORD'S TEXT
           SR      R0,R1                  THIS GIVES NON-DISPLAYED RHS RESIDUE
           ST      R0,MAPLRESI            SAVE RESIDUE
           B       TRIMUPUP               THEN TRIM LHS IF NECESSARY
           DROP    R14
           SPACE   1
*******************************************************************
*                                                                 *
*          ALL DATA DISPLAYED - FILL OUT LAST ROW                 *
*                                                                 *
*******************************************************************
           SPACE   1
**** FILL OUT FINAL ROW WITH BLANKS OR NULLS
DATAWRTN   DS      0H                     ALL DATA IS ACTUALLY WRITTEN
           XC      MAPLRESI,MAPLRESI      RESET THE RESIDUE
           L       R14,MAPLLAST           OFFSET OF LAST ITEMAREA
           A       R14,TEWAMAPA           -> ASSOCIATED AREA
           USING   ITEMAREA,R14
           SPACE   1
           MVI     MAPLTEMP,BLANK         USE BLANK IS ITEM PROTECTED
           TM      ITEMTYPE,ITEMPROT      IS ITEM PROTECTED?
           BNZ     *+8                    JUMP IF SO
           MVI     MAPLTEMP,NULLCHAR      UN-PROTECTED: EXTEND WITH NULLS
           DROP    R14
           SPACE   1
**** INSERT SPECIFIED CHARACTER TO END OF ROW
           CALL    XTNDITEM,VL=NO,MF=(E,MAPLWORK),                          +
                   (MAPLTEMP,                   USE BLANK OR NULL           +
                   =A(X'7FFF'),                 MAXIMUM SIZE TO EXTEND      +
                   MAPLLAST                     WORK BUFFER OFFSET OF LAST ITEMAREA +
                   <MAPLWIND>)                  -> ASSOCIATED WINDOW
           LTR     R15,R15                INSUFFICIENT STORAGE?
           BM      MAPL0800               ERROR IF NO MORE STORAGE
           SPACE   1
**** TRIM LEFT HAND SIDE WHICH MAY FALL TO LEFT OF WINDOW
TRIMUPUP   DS      0H
           L       R0,MAPLLAST            OFFSET OF FINAL ITEMAREA
           L       R1,MAPLWIND            -> ASSOCIATED WINDOW
           CALL    TRIMLHS                TRIM THE LEFT-HAND SIDE
* R15 = OFFSET OF FINAL ITEMAREA
           L       R0,MAPLRESI            LOAD RESIDUE OF UNDISPLAYED RECORD
           SPACE   1
MAPL0800   DS      0H
           POPUP   RETR=(R15,R0)
           SPACE   2
*************** DUMMY RPD USED TO SIGNIFY FORCED END ***************
DUMMYRPD   DC      0A(0),XL(RPDLNGH)'00'
           ORG     RPDOFFST-RPDE+DUMMYRPD
           DC      YL2(X'7FFF')           MAX POSSIBLE OFFSET
           ORG     RPDEPOSN-RPDE+DUMMYRPD
           DC      AL1(PNTFINIS)
           ORG     RPDELNGH+DUMMYRPD
           SPACE   1
*************** DUMMY PME USED TO SIGNIFY FORCED END ***************
DUMMYPME   DC      0A(0),XL(PMELNGH)'00'
           ORG     PMEOFFST-PME+DUMMYPME
           DC      YL2(X'7FFF')           MAX POSSIBLE OFFSET
```

```
*        TITLE 'GATHFONT - GATHER ATTENTION && CONTROL FONTS'
***************************************************************
*                                                              *
*                         G A T H F O N T                      *
*                GATHER ATTENTION & CONTROL FONTS              *
*                                                              *
* DESCRIPTION -                                                *
*       THIS ROUTINE GATHERS ATTENTION & CONTROL FONTS WHICH   *
*       ARE ACTIVE BY THE END OF THE SPECIFIED RECORD (IE.,    *
*       WHICH ARE INPUT TO THE FOLLOWING RECORD).              *
*                                                              *
*       ATTENTION FONTS ARE ACTIVATED FOR REASONS SUCH AS:     *
*           FOUND SEARCH ARGUMENTS;                            *
*           MISSPELLED WORKS (DURING SPELL CHECKING);          *
*           OTHER HIGHLIGHTING WHICH IS NOT RECORDED IN THE DATA. *
*                                                              *
*       THE CONTROL FONT IS USED FOR:                          *
*           DELINEATING DELETE, MOVE, COPY, ETC RANGES.        *
*           DELINEATING INCOMPLETE FONT RANGES, WHEN ACTUAL FONT *
*                     IS NOT YET SPECIFIED.                    *
*           DELINEATING SPELL-CHECK RANGES, ETC, ETC.          *
*                                                              *
* CAUTION -                                                    *
*       THIS ROUTINE CALLS 'DATACOMP', WHICH MAY RELEASE ANY   *
*       CURRENT RECORD FILE IMAGE.                             *
*                                                              *
* INPUT -                                                      *
*       R1      -> PARAMETER LIST                              *
*               +00  -> ASSOCIATED VIEWDEFN                    *
*               +00  -> PREPARED FONT VECTOR                   *
*               +00  -> TARGET RECORD ID                       *
*                                                              *
* OUTPUT -                                                     *
*       R15     =00  => PROCESS SUCCESSFUL                     *
*               =-2  => INSUFFICIENT STORAGE                   *
*               =-3  => READ ERROR ON FILE                     *
*                                                              *
*       COPYRIGHT 1986, ADDISON FISCHER - ALL RIGHTS RESERVED. *
***************************************************************
         SPACE 1
******************* DEFINE PARAMETER LIST **********************
         PUSHSECT ,
GATHPARM DSECT                       DEFINE PARAMETER LIST
GATHVIEW DS    A                     - ASSOCIATED VIEWDEFN
GATHVECT DS    A                     -> PREPARED FONT VECTOR
GATHRECA DS    A                     -> RECORD ID
         SPACE 1
************** DEFINE IMMEDIATE LOCAL WORKING AREA *************
GATHAREA DSECT                       DEFINE IMMEDIATE LOCAL WORK AREA
GATHRECI DS    F                     RECORD IDENTIFIER
GATHWORK DS    3D
GATHLNGH EQU   *-GATHAREA            LENGTH OF LOCAL WORK AREA
         POPSECT ,
         SPACE 1
         USING TEWA,R12
GATHFONT PUSHDOWN BASE=R11,SAVE=YES,TYPE=STACK, LINKAGE            +
               WORK=(GATHLNGH,GATHAREA,R10)
         SPACE 1
         USING GATHPARM,R1
         L     R14,GATHRECA          -> RECORD IDENTIFIER
         MVC   GATHREC1,0(R14)       SAVE RECORD IDENTIFIER
         L     R7,GATHVECT           -> ASSOCIATED FONT VECTOR
         L     R8,GATHVIEW           -> (PINNED) VIEWDEFN
         USING VIEWDEFN,R8
         DROP  R1
         L     R6,TEWAPMXA           -> (PINNED) POINT MARKER INDEX
         USING PMX,R6
         SPACE 1
         SUSING FILEDEFN,(R5),FROM=VIEWFILE
         L     R3,VIEWFILE           RSM FILEDEFN TOKEN
         SPACE 1
         XC    2*FONTATTN(2,R7),2*FONTATTN(R7)   ASSUME ATTENTION AND
         XC    2*FONTCNTL(2,R7),2*FONTCNTL(R7)   CONTROL LEVELS NULL
         SPACE 1
***************************************************************
*                                                              *
*       LOCATE ATTN POINT MOST CLOSELY PRECEDING TARGET RECORD *
*                                                              *
***************************************************************
* LOGIC -
*    VIEWAITH GIVES AN APPROXIMATE POINT AT WHICH TO START THE
*    SEARCH.  BACKUP FROM THIS POINT UNTIL WE FIND THE FIRST
*    POINT NOT AFTER THE TARGET RECORD;  THEN MOVE FORWARD UNTIL
*    WE FIND THE FIRST WHICH POINTS BEYOND THE DESIRED RECORD;
```

THEN USE THE ONE IMMEDIATELY PREVIOUS TO THAT; IN MOST CASES,
EXCEPT WHEN THE VIEW IS RADICALLY CHANGED, THIS OPERATION
WILL ONLY REQUIRE TWO COMPARES.

```
         L       R4,VIEWATTN         RESUME PME ASSOCIATED WITH THIS VIEW
         SPACE 1
LOPBACK  DS      0H
         LTR     R4,R4               ANY KNOWN PME?
         BNP     FROMBEGN            NO - SO START SCAN FROM BEGINNING
         SPACE 1
         C       R3,PMEFILE(R4)      VALIDATE FILE POINTER
         ERROR   NE                  ERROR IF NOT FOR SAME FILE
         SPACE 1
         CALL    DATACOMP,VL=NO,MF=(E,GATHWORK),                                    *
                 (FILEDEFN,            -> FILE DEFINITION                           *
                 PMERECID(R4),         ID ASSOCIATED WITH THIS PME                  *
                 GATHRECI)             INPUT RECORD IDENTIFIER
         LTR     R15,R15             ERROR?
         BNZ     GATH0800            JUMP IF SO
         LTR     R0,R0               CHECK COMPARISON
         BNH     GOFORWRD            WE HAVE PRECEDENT, ADVANCE PME PTR
         SPACE 1
*** CONTINUE BACKING UP THE POINTER
         L       R4,PMEATTN+4(R4)    BACKUP TO POSSIBLE PREVIOUS POINTER
         B       LOOPBACK            CONTINUE PROCESSING
         SPACE 1
******** START SEARCH FROM BEGINNING OF FILE'S ATTN-PME LIST ********
FROMBEGN DS      0H
         L       R4,FILEATTN         -> FIRST ATTN PME
         LTR     R2,R4               DO ANY EXIST?
         BNP     SETNULL             - NO - THERE ARE NO ATTN ELEMENTS
         SPACE 1
*****************************************************************
*                                                                *
*        ADVANCE FORWARD THROUGH PME-ATTN CHAIN UNTIL WE         *
*        FIND FIRST ITEM AT OR BEYOND TARGET RECORD.             *
*                                                                *
*****************************************************************
         SPACE 1
GOFORWRD DS      0H
         LTR     R2,R4               SAVE PREVIOUS OFFSET
         L       R4,PMEATTN(R4)      OFFSET OF NEXT PME
         BNP     USEPREV
         C       R3,PMEFILE(R4)      VALIDATE FILE POINTER
         ERROR   NE                  ERROR IF NOT FOR SAME FILE
         SPACE 1
* COMPARE LOGICAL RELATION THIS PME WITH TARGET RECORD
         CALL    DATACOMP,VL=NO,MF=(E,GATHWORK),                                    *
                 (FILEDEFN,            -> FILE DEFINITION                           *
                 PMERECID(R4),         ID ASSOCIATED WITH THIS PME                  *
                 GATHRECI)             INPUT RECORD IDENTIFIER
         LTR     R15,R15             ERROR?
         BNZ     GATH0800            JUMP IF SO
         LTR     R0,R0               CHECK COMPARISON
         BNH     GOFORWRD            NEED TO CONTINUE FORWARD
         SPACE 1
**** WE HAVE REACHED DECISION POINT
*    R2 -> LATEST PME-ATTN PRECEEDING TARGET RECORD
*
USEPREV  DS      0H
         LA      R14,PME(R2)         -> TARGET PME
         USING   PME,R14
         CLI     PMEFUNCT,PNTFONTE   IS THIS FONT-RANGE END?
         BE      SETNULL             YES - FONT THEREFORE NOT OPEN
         CLI     PMEFUNCT,PNTFONTS   ELSE SHOULD BE FONT-START
         ERROR   NE                  THIS IS INCORRECT TYPE
         MVC     2*FONTATTN(2,R7),PMEFONTI  SAVE ASSOCIATED FONT ID
         DROP    R14
         SPACE 1
*****************************************************************
*                                                                *
*           DETERMINE 'CONTROL' FONT THAT IS IN EFFECT            *
*                                                                *
*****************************************************************
         SPACE 1
**** DETERMINE IF THIS FALLS WITHIN CONTROL RANGE
*    R2 = INDEX OF PME TO USE FOR NEXT SEARCH
SETNULL  DS      0H
         ST      R2,VIEWATTN         SET RESUME POINTER
         L       R15,TEWAMAIN        -> MAINAREA
         USING   MAINAREA,R15
         L       R4,MAINCTLS         IS THERE A CTL-RANGE START?
         DROP    R15
         LTR     R4,R4               DOES EXPLICIT CTL-START EXIST?
         BNP     NOSTART             NO - CHECK FOR CTL END?
```

```
                C     R3,PMEFILE(R4)      IS THIS FOR OUR FILE?
                BNE   NOCONTRL            NO - CONTROL APPLIES TO ANOTHER FILE
                SPACE 1
**** SEE IF WE FALL AHEAD OF CONTROL-RANGE START
                CALL  DATACOMP,VL=NO,MF=(E,GATHWORK),                            +
                      (FILEDEFN,           -> FILE DEFINITION                    +
                      PMERECID(R4),        RANGE-START POINT                     +
                      GATHRECI)            COMPARED TO INPUT RECORD
                LTR   R15,R15             ERROR?
                BNZ   GATH0800            JUMP IF SO
                LTR   R0,R0
                BH    NOCONTRL            CONTROL-RANGE STARTS AFTER RECORD
                SPACE 1
*     WE FALL AFTER CONTROL-RANGE START, ASSUME RANGE COVERS RECORD
                LA    R14,PME(R4)         -> ASSOCIATED PME
                USING PME,R14
                MVC   2*FONTCNTL(2,R7),PMEFONTI  ASSUME CONTROL FONT IN EFFECT
                DROP  R14
                SPACE 1
***********************************************************************
*                                                                     *
*           CHECK FOR PRESENCE OF CONTROL-RANGE END                   *
*                                                                     *
***********************************************************************
                SPACE 1
NOSTART         DS    0H
                L     R15,TEWAMAIN        -> MAINAREA
                USING MAINAREA,R15
                L     R4,MAINCTLE         POSSIBLE CONTROL-END PME OFF
                DROP  R15
                LTR   R4,R4               DOES CONTROL-END EXIST?
                BNP   NOCONTRL            NO - THEREFORE EXIT (CONTROL-FONT   +
                                          MAY OR MAY NOT BE SET DEPENDING ON +
                                          WHETHER CONTROL-RANGE EXISTS).
                C     R3,PMEFILE(R4)      SAME FILE IN WHICH WE WORK?
                BNE   NOCONTRL            NO - EXIT
                SPACE 1
************** CHECK IF WE FALL AFTER CONTROL-RANGE END **************
                XC    2*FONTCNTL(2,R7),2*FONTCNTL(R7)   ASSUME AFTER CTL-END
                SPACE 1
                CALL  DATACOMP,VL=NO,MF=(E,GATHWORK),                            +
                      (FILEDEFN,           -> FILE DEFINITION                    +
                      PMERECID(R4),        RANGE-START POINT                     +
                      GATHRECI)            COMPARED TO INPUT RECORD
                LTR   R15,R15             ERROR?
                BNZ   GATH0800            JUMP IF SO
                LTR   R0,R0
                BNH   NOCONTRL            CONTROL-RANGE ENDS IN OR BEFORE REC
                SPACE 1
*     RECORD STARTS WITHIN CONTROL RANGE, SET PROPER FONT
                LA    R14,PME(R4)         -> ASSOCIATED PME
                USING PME,R14
                MVC   2*FONTCNTL(2,R7),PMEFONTI  SHOW CONTROL FONT IS ACTIVE
                DROP  R14
                SPACE 1
*     CONTROL AND ATTENTION FONTS HAVE BEEN ANALYZED
NOCONTRL        DS    0H
                SR    R15,R15             SHOW ALL WENT WELL
                SPACE 1
GATH0800        DS    0H
                POPUP RETR=R15

TITLE 'MERGFONT - MERGE FONT VECTOR INTO ITEMAREA'
***********************************************************************
*                                                                     *
*                        M E R G F O N T                              *
*                  MERGE FONT VECTOR INTO ITEMAREA                    *
*                                                                     *
* DESCRIPTION -                                                       *
*     THIS ROUTINE MERGES FONTS IN A VECTOR TOGETHER TO               *
*     CREATE A COMPOSITE 'ITEMAREA' SPECIFICATION.                    *
*                                                                     *
* INPUT -                                                             *
*     R0    -> FONT VECTOR                                            *
*     R1    -> ITEMAREA (ATTRIBUTES MUST BE CLEARED                   *
*                        BEFORE CALLING THIS ROUTINE)                 *
*     R12   -> TEWA                                                   *
*                                                                     *
* OUTPUT -                                                            *
*     NO EXCEPTIONAL CONDITIONS.                                      *
*                                                                     *
*     COPYRIGHT 1986, ADDISON FISCHER - ALL RIGHTS RESERVED.          *
***********************************************************************
```

```
         SPACE 1
*************** DEFINE IMMEDIATE LOCAL WORKING AREA *****************
         PUSHSECT
MRGFAREA DSECT ,                        DEFINE IMMEDIATE LOCAL WORK AREA
MRGFBASC DS    XL(L'FAS0ATTR)           BASIC HIGHLIGHT ATTRIBUTES
MRGFCSET DS    CL(L'FAS1CHAR)           NAME OF SPECIAL CHARACTER SET
MRGFITAL DS    XL(L'FAS1ITAL)           ITALICS INDICATOR
MRGFFORE DS    XL(L'FAS1FORE)           FOREGROUND COLOR
MRGFBACK DS    XL(L'FAS1BACK)           BACKGROUND COLOR
MRGFBOLD DS    XL(L'FAS1BOLD)           BOLDFACE INDICATOR
MRGFXHIL DS    XL(L'FAS1HLIT)           EXTENDED HIGHLIGHTS
MRGFOUTL DS    XL(L'FAS1OUTL)           FIELD OUTLINING
MRGFLNGH EQU   *-MRGFAREA               LENGTH OF LOCAL WORK AREA
         POPSECT ,
         SPACE 1
         USING TEWA,R12
MERGFONT PUSHDOWN BASE=R11,SAVE=YES,TYPE=STACK,  LINKAGE              *
               WORK=(MRGFLNGH,MRGFAREA,R10)
         SPACE 1
*********** CONSTRUCT COLLAPSED COMPOSITE OF ALL FONT LEVELS **********
*        (BUILT FROM THE BOTTOM UP).
         SPACE 1
         XC    MRGFAREA(MRGFLNGH),MRGFAREA   INITIALIZE WORK AREA
         LR    R5,R1                    -> ASSOCIATED ITEMAREA
         USING ITEMAREA,R5
         LR    R15,R0                   -> INCOMING FONT VECTOR
         LA    R3,FONTLVLS              PROCESS ALL FONT LEVELS
         SPACE 1
0024387  DS    0H
         LH    R14,0(,R15)              FONT INDEX
         LTR   R0,R14                   FONT SPECIFICATION EXIST AT LEVEL?
         BZ    NEXTLEVL                 JUMP IF NOT
         SPACE 1
         MH    R14,=Y(FASELNGH)         GET OFFSET TO FONT ATTR & SPEC ELEM
         A     R14,TEWAFONV             -> ASSOCIATED (PINNED) FONTS VECTOR
         USING FASE,R14
         SPACE 1
***************** HANDLE SPECIAL SPECIFICATION LEVEL *****************
**       CH    R3,=(FONTLVLS-FONTSPEC)      IS THIS 'SPEC' LEVEL?
**       BNE   NOTSPECX
         SPACE 1
****  CONSIDER SPECIAL FORMS-HANDLING FIELDS
**       TM    FASEFOPT,FASEFCTL        IS THIS SPECIAL FORM-CTL FONT?
**       BZ    *+8                      NO - NOTHING TO SAVE
**       STH   R0,ITEMFORX              SAVE FORMS-FONT INDEX
         SPACE 1
****  CONSIDER FOOTNOTE ATTRIBUTE
**       TM    FASESPCL,FASEFOOT        IS THIS A FOOTNOTE?
*        BZ    *+8
*        OI    ITEM?,ITEMFOOT           SHOW THIS ITEM IS A FOOTNOTE
         SPACE 1
****  APPLY BOTH FINAL & EXTENDED FORM
*        CONSIDER BASIC 3270 HIGHLIGHTING ATTRIBUTE
NOSPECX  DS    0H
         CLI   FAS0ATTR,FASEUNSP        IS THIS UNSPECIFIED?
         BE    *+10                     YES - MAKE NO CHANGE
         MVC   MRGFBASC,FAS0ATTR        SAVE BASIC HIGHLIGHT ATTR
         SPACE 1
****  CONSIDER EXTENDED ATTRIBUTES:
*        SHOULD WE RESET CHARACTER SET SPECIFICATION?
         TM    FAS1CHAR,X'FF'           SPECIFIED?
         BNM   SAMECHAR
         CLI   FAS1CHAR,C'*'
         BE    SAMECHAR
         MVC   MRGFCSET,FAS1CHAR        SET BASIC CHARACTER SET FAMILY NAME
         SPACE 1
*        CONSIDER FONT MODIFIER
SAMECHAR DS    0H
         CLI   FAS1ITAL,FASEUNSP        ITALICS SPECIFIED
         BE    *+10
         MVC   MRGFITAL,FAS1ITAL        CHANGE ITALICS ATTRIBUTE
         SPACE 1
         CLI   FAS1BOLD,FASEUNSP        ITALICS SPECIFIED
         BE    *+10
         MVC   MRGFBOLD,FAS1BOLD        CHANGE BOLD-FACE ATTRIBUTE
         SPACE 1
*        CONSIDER FOREGROUND COLOR
         CLI   FAS1FORE,FASEUNSP        IS FOREGROUND (CHAR) COLOR SPECIFIED?
         BE    *+10
         MVC   MRGFFORE,FAS1FORE        USE BETTER COLOR
         SPACE 1
*        CONSIDER BACKGROUND COLOR
         CLI   FAS1BACK,FASEUNSP        IS BACKGROUND COLOR SPECIFIED?
         BE    *+10
         MVC   MRGFBACK,FAS1BACK        USE BETTER COLOR
```

```
         SPACE 1
*    CONSIDER EXTENDED HIGHLIGHING
         CLI   FAS1HLIT,FASEUNSP   IS EXTENDED HIGHLIGHTING SPECIFIED?
         BE    *+10
         MVC   MRGFXHIL,FAS1HLIT   YES, SET NEW SPECIFCATION
         SPACE 1
*    CONSIDER FIELD OUTLINING
         CLI   FAS1OUTL,FASEUNSP   IS EXTENDED OUTLINING SPECIFIED?
         BE    *+10
         MVC   MRGFOUTL,FAS1OUTL   YES, SET NEW SPECIFCATION
         DROP  R14
         SPACE 1
**** ADVANCE TO NEXT ATTRIBUTE LEVEL
NEXTLEVL DS   0H
         LA    R15,2(,R15)         ADVANCE TO NEXT LEVEL
         BCT   R3,LOOP4387         LOOP UNTIL HIGHEST LEVEL IS DONE
         SPACE 1
***********************************************************************
*                                                                     *
*            CONVERT COMPOSITE FONT TO 'ITEMAREA' FORMAT               *
*                                                                     *
***********************************************************************
         SPACE 1
**** CONVERT TO 3270 COLOR ATTRIBUTE FORMAT
         MVC   ITEMBACK,MRGFBACK   FOREGROUND COLOR SPECIFICATION
         CLI   ITEMBACK,0          SELECTING DEFAULT BACKGROUND COLOR?
         BE    *+8                 JUMP IF SO
         OI    ITEMBACK,X'F0'      ELSE SET ACTUAL 3270 ATTR VALUE.
         SPACE 1
*    HANDLE FOREGROUND (CHARACTER) COLOR ATTRIBUTE
         MVC   ITEMFORE,MRGFFORE   FOREGROUND COLOR SPECIFICATION
         CLI   ITEMFORE,0          SELECTING DEFAULT BACKGROUND COLOR?
         BE    *+8                 JUMP IF SO
         OI    ITEMFORE,X'F0'      ELSE SET ACTUAL 3270 ATTR VALUE.
*    CHECKING IF THE COLORS MATCH IS DONE BY THE 3270 ATTRIBUTE
*    GENERATOR.  IF THEY DO WASH OUT, THE FOREGROUND (CHARACTER)
*    COLOR IS CHANGED TO EITHER BLACK OR WHITE.
         SPACE 1
**** CONVERT CHARACTER SET SPECIFICATION
*  -----  COMBINE CHARACTER SET NAME WITH ITALICS AND BOLDFACE.
         SPACE 1
**** CONSTRUCT FINAL ATTRIBUTE MASK
         MVC   ITEMATTR,MRGFXHIL   GET EXTENDED HIGHLIGHTING
         NI    ITEMATTR,ITEMFLSH+ITEMREVV+ITEMULIN+ITEMBRIT
         CLI   MRGFBASC,FASENORM   SELECTING NORMAL INTENSITY?
         BE    *+8                 JUMP IF SO
         OI    ITEMATTR,ITEMHIGH   INDICATE BASIC HIGH INTENSITY
         SPACE 1
         POPUP ,                   RETURN TO CALLER
         TITLE 'POINTDEF - DEFINE POINT-FUNCTION VALUES'
***********************************************************************
*                         P O I N T D E F                             *
*                   DEFINE POINT-FUNCTION VALUES                       *
*                                                                     *
*        THIS DEFINES THE FUNCTION CODES WHICH CAN BE ASCRIBED         *
*        TO DATA-POINTS WITHIN THE MASTER/WORD SYSTEM.                 *
*                                                                     *
*        COPYRIGHT 1986, ADDISON FISCHER - ALL RIGHTS RESERVED.        *
***********************************************************************
         SPACE 1
PNTSTART EQU   0  START-OF-RECORD       . (INTERNAL HANDLING)
PNTINAFT EQU   1  INSERT-AFTER-PREVIOUS . PME (ONLY)
*
*                 INSERT-AFTER-PREVIOUS DATA USES PREVIOUS
*                 FORMAT BEFORE ANY SPECIFICATIONS ARE CHANGED.
*
*                 THIS IS USED WHEN INSERTION IS REQUESTED WITH
*                 THE CURSOR ON A FORCED ATTRIBUTE BYTE (I.E., AN
*                 ATTRIBUTE BYTE WHICH IS NOT OCCUPYING A BLANK'S
*                 POSITION) WHICH DELIMITS A FONT CHANGE.  IN THIS
*                 CASE, WE NEED THIS DIFFERENT TYPE OF INSERTION
*                 TO DISTINGUISH WHICH FONT THE INSERTION IS TO USE.
*                 USE 'INSERT AFTER' (PREVIOUS BYTE) IF THE CURSOR
*                 IS ON THE ATTRIBUTE; USE 'INSERT BEFORE' (FOLLOWING
*                 BYTE) IF THE CURSOR IS ON THE FOLLOWING BYTE.
*                 IN ALL OTHER CASES, THE AFFILIATION OF A BYTE WITH
*                 ITS FIELDS IS UNIQUE, AND 'INSERT-BEFORE' IS USED.
PNTFONTE EQU   2  FONT-RANGE END        . RPDE - BASE,SPEC,HILITE FONT +
                                        . PME  - CONTROL/ATTN
PNTFMTND EQU   3  FORMAT-FIELD END      . FORMAT                       +
                                        . RPDE (FORMAT IS STRETCHED)
PNTFMTST EQU   4  FORMAT-FIELD START    . FORMAT                       +
                                        . RPDE (FORMAT IS STRETCHED)
```

```
PNTPARAI  EQU     5    PARAGRAPH INDENT       . FORMAT (ONLY)
PNTFONTS  EQU     6    FONT-RANGE START       . RPDE - BASE,SPEC,HILITE FONT    +
                                              . PME  - CONTROL/ATTN
PNTTARGT  EQU     7    TARGET POINT           . PME (ONLY)
PNTEXACT  EQU     8    PRECISE-POINT MARKER   . FORMAT - HARDWARE TAB
*                      . PME   - NAMED LABELS:  -   HISTORICAL & INSERT PTS.
*                      . RPDE  - NAMED LABELS      (IGNORED; PME VERSION USED)
PNTINBEF  EQU     9    INSERT-BEFORE-CURRENT  . PME  (ONLY)
PNTEND    EQU    10    END OF ACTUAL DATA     . ????
PNTSFTAB  EQU    11    SOFTWARE TAB           . FORMAT (ONLY)
PNTNULLS  EQU    12    START-NULLS            . FORMAT (ONLY)
PNTAPPRX  EQU    13    APPROXIMATE-POINT      . PME    (ONLY) (=> PMEGLOBL)
PNTFINIS  EQU    14    END OF PROCESSING      . (INTERNAL HANDLING)
PNTAPPND  EQU    15    APPEND PSEUDO-NULLS    . (INTERNAL HANDLING)             +
                       USED BY INSERT WHEN TRUNCATION IS NECESSARY;             +
                       THIS INDEX RETURNS TO 'APPEND-DATA-ROUTINE'.
POINTMAX  EQU    16                             MAXIMUM NUMBER OF FUNCTIONS DEFINED
          TITLE 'PME - POSITION MARKER ELEMENT'
****************************************************************************
*                                                                          *
*                              P M E                                       *
*                      POSITION MARKER ELEMENT                             *
*                                                                          *
*   THE PME DEFINES POINTS WITHIN A FILE - BOTH TRANSIENT                  *
*   AND PERMANENT.  PMEFUNCT INDICATES THE TYPE OF MARKER,                 *
*   AND IS CLOSELY TIED TO THE SIMILAR FUNCTION VALUE IN THE               *
*   'FMTSPEC' AND 'RPDE'.  THE INDEX IS USED AS A BRANCH                   *
*   INDEX IN 'MAPOUT', ETC.                                                *
*                                                                          *
*   NOTE -                                                                 *
*                                                                          *
*   MULTIPLE MARKERS AT THE SAME POSITION ARE PROCESSED IN                 *
*   ASCENDING ORDER OF POINT-TYPE INDEX, WHICH HAS BEEN                    *
*   CAREFULLY ESTABLISHED.                                                 *
*                                                                          *
*          COPYRIGHT 1986, ADDISON FISCHER - ALL RIGHTS RESERVED.          *
****************************************************************************
          SPACE 1
PME       DSECT
PMENEXT   DS    F                    POSITION MARKER ELEMENT
PMEPREV   DS    F                    OFFSET OF NEXT PME ON SYNONYM CHAIN
*** PRECEEDING TWO ELEMENTS MUST LIE AT FRONT OF ELEMENT
          SPACE 1
PMEATTN   DS    2F                   OFFSET OF NEXT/PREV PME ON ATTN LIST   +
                                     FOR SAME FILE (ORDERED BY REC/OFFSET)
PMEIDENT  DS    0XL15                SEARCH IDENTIFIER
PMEHASH   DS    F                    ASSOCIATED HASH CODE
PMEFILE   DS    F             RSM    -> FILEDEPN (=0 => ELEMENT IS FREE)
PMERECID  DS    F                    FULL RECORD ID ASSOCIATED WITH MARK
PMEPOSN   DS    0XL3                 OFFSET & FUNCTION CODE
PMEOFFST  DS    H                    OFFSET WITHIN RECORD
PMEFUNCT  DS    X                    FUNCTION ASSOCIATED WITH THIS PME      +
                                     (POINTDEF GIVES FUNCTION DEFINITIONS)  +
                         NOTE:       PMEAPPRX SHOULD IMPLY PMEGLOBL.
*** STATUS OF THE POINT-MARKER
PMETYPE   DS    X                    STATUS OF THE PME MARKER
PMEACTIV  EQU   X'80'                ON => THIS PME IS ACTIVE
PMEPERM   EQU   X'40'                ON => THIS IS A PERMANENT MARKER       +
                                          (IE., ALSO RECORDED IN RECORD)
PMEMOVBL  EQU   X'20'                ON => SHOULD BE MOVED/DELETED WITH     +
                                          SURROUNDING DATA. (PMEFLOAT)
PMEGLOBL  EQU   X'10'                ON => POINTS TO GENERAL LOCATION,      +
                                          NOT SPECIFIC DATA: DO NOT MOVE   +
                                          OR DELETE WITH SPECIFIC DATA.
                    POSSIBLE ALT NAMES: PMEANCHR, PMEFIXED, PMESTABL
PMEHISTI  EQU   X'08'                THIS IS INACTIVE INSERT POINTER
PMECNTRL  EQU   X'04'                ON  => CONTROL FONT (FOR RANGE-DEFN)   +
                                     OFF => ATTN FONT (FOR RANGE-DEFN)
PMEFONTI  DS    HL2                  FONT INDEX (FOR CONTROL-RANGE/TARGET)
PMEINSRT  DS    HL2                  INSERTION MARKER: CHARS TO INSERT
PMELABEL  DS    CL8                  LABEL ASSOC WITH THIS POINT MARKER     +
                                     (NON-BLANK => NAMED LABEL)
          DS    0F                   INSURE WORD ALIGNMENT
PMELNGH   EQU   *-PME                LENGTH OF THIS ELEMENT
```

```
         TITLE 'FASE - FONT ATTRIBUTE SPECIFICATION ELEMENT'
*************************************************************************
*                         F A S E                                        *
*              FONT ATTRIBUTE SPECIFICATION ELEMENT                      *
*                                                                        *
*       THIS SPECIFIES THE CHARACTERISTICS OF A FONT WHEN                *
*       USED IN EACH POSSIBLE CONTEXT.                                   *
*                                                                        *
*       THE POSSIBLE CONTEXTS ARE:                                       *
*       1.  BASIC CRT FORM - NO EXTENDED ATTRIBUTES (REVISABLE)          *
*       2.  EXTENDED CRT FORM (REVISABLE)                                *
*       3.  LINE PRINTER FORM (UNREVISABLE)                              *
*       4.  PAGE PRINTER (SCRIPT) FORM (UNREVISABLE BY EDITOR)           *
*                                                                        *
*       COPYRIGHT 1986, ADDISON FISCHER - ALL RIGHTS RESERVED.           *
*************************************************************************
         SPACE 1
FASE     DSECT ,
FASENAME DS    CL8            NAME OF THIS FONT WITHIN EDITOR
FASEINDX DS    Y              FONT INDEX VALUE
         SPACE 1
FASEUNSP EQU   X'FF'  (UNSPEC)   => USE ATTRIBUTE FROM LOWER
                                    FONT LEVEL; USE FASENORM IF NONE
FASENORM EQU   X'00'  (NORMAL)   => USE NORMAL CHARACTERISTIC
         SPACE 1
*************************************************************************
*                                                                        *
*                    SPECIAL (AUDIO) ATTRIBUTES                          *
*                                                                        *
*************************************************************************
FASESPCL DS    X              SPECIAL
FASEAUDI EQU   X'80'            => 'AUDIO' ATTRIBUTE FOR VOICE MAIL.
FASENVIS EQU   X'40'            => NON-VISUAL (IN FINAL FORM)
                                    THIS IS AUDIO ONLY.
*FASEPRIV EQU  X'01'            THIS FONT CONNOTES A 'PRIVATE'
                                    AUTHOR'S NOTE.
         SPACE 1
*************************************************************************
*                                                                        *
*                    ELECTRONIC FORMS CONTROLS                           *
*              (APPLICABLE WHEN DOCUMENT IS 'USED' AS A FORM)            *
*                                                                        *
*************************************************************************
         SPACE 1
*    THIS HAS TO DO WITH CREATING SPECIAL 3270-TYPE 'FORMS', WHICH
*    ARE PRESENTED WITH RESTRICTED-INPUT FIELDS.  THIS HAS NOTHING
*    TO DO WITH PRINTING TO SPECIAL FORMS PAPER.
FASEFORM DS    0XL7           ELECTRONIC-FORMS SPECIFICATIONS
FASEFOPT DS    X              CONTROLLED ('FORMS') INPUT PARAMETERS
FASEFCTL EQU   X'80'            ON => CONTROLLED INPUT
                                OFF => (NORMAL) UNCONTROLLED INPUT
FASEFOOI EQU   X'40'          ENTER-ONCE-ONLY INPUT
FASEFMAN EQU   X'20'          MANDATORY ENTER INPUT
         SPACE 1
*        BASIC DATA EDITING OPTIONS
FASEFNUM EQU   X'04'          NUMERIC INPUT
FASEFLFT EQU   X'02'          LEFT-JUSTIFIED
FASEFRGH EQU   X'01'          RIGHT-JUSTIFIED
         SPACE 1
FASEFXIT DS    CL4            EXIT SUFFIX (BINARY ZEROS => NO EXIT)
FASEFCOD DS    FL2            BINARY CODE FOR THIS FIELD
                                (NUMBER WHICH IS PASSED TO THE EXIT)
         SPACE 1
*************************************************************************
*                                                                        *
*                    REVISABLE (BASIC) CRT FORM                          *
*                                                                        *
*************************************************************************
FASOATTR DS    0XL1           ATTRIBUTES FOR BASIC CRT
FASOINST DS    X              CRT INTENSITY
FASOHIGH EQU   X'40'            HIGH INTENSITY
         SPACE 1
*************************************************************************
*                                                                        *
*                    REVISABLE (EXTENDED) CRT FORM                       *
*                                                                        *
*************************************************************************
         SPACE 1
FAS1ATTR DS    0XL14          ATTRIBUTES FOR EXTENDED CRT
FAS1CHAR DS    CL8            NAME OF BASE CHARACTER SET
         DS    XL2 (INDEX?)   (BLANKS IF NONE, OR DEFAULT)
```

```
 AS1ITAL DS     X                CHARACTER SET MODIFIER
 AS1ITAY EQU    1                ON => USE ITALICS
 AS1BOLD DS     X                BOLDFACE INDICATOR
 AS1BFON EQU    1                ON => USE BOLDFACE
         SPACE  1
 AS1FORE DS     X                COLOR ATTRIBUTE FOR FOREGROUND
 AS1BACK DS     X                COLOR ATTRIBUTE FOR BACKGROUND
 AS1BLUE EQU    1                   BLUE             (X'F1')
 AS1RED  EQU    2                   RED              (X'F2')
 AS1PINK EQU    3                   PINK             (X'F3')
 AS1GREN EQU    4                   GREEN            (X'F4')
 AS1TJRQ EQU    5                   TURQUOISE        (X'F5')
 AS1YELO EQU    6                   YELLOW           (X'F6')
 AS1NEUT EQU    7                   NEUTRAL          (X'F7')
         SPACE  1
*        FIRST 3 (4?) HIGHLIGHTING CHARACTERISTICS ARE MUTUALLY EXCLUSIVE)
 AS1HLIT DS     X                EXTENDED HIGHLIGHTING
 AS1FLAS EQU    1                   BLINKING         (X'F1')
 AS1REVV EQU    2                   REVISE VIDEO     (X'F2')
 AS1ULIN EQU    4                   UNDERSCORE       (X'F4')
 AS1BRIT EQU    8                   INTENSIFY        (X'F8')
         SPACE  1
*        OUTLINING FOR THE FIELD
 AS1OUTL DS     X                OUTLINING
 AS1OUND EQU    X'01'               UNDERLINE
 AS1ORHS EQU    X'02'               RIGHT-HAND-SIZE VERTICAL
 AS1OOVR EQU    X'04'               OVERLINING
 AS1OLHS EQU    X'08'               LEFT-HAND-SIDE VERTICAL
 AS1OALL EQU    X'0F'               PUT BOX AROUND THE FIELD
         SPACE  1
***********************************************************************
*                                                                     *
*                 LINE PRINTER (UNREVISABLE) FORM                     *
*                                                                     *
***********************************************************************
         SPACE  1
 AS2ATTR DS     0XL2             ATTRIBUTES FOR LINE PRINTER
 AS2DENS DS     X                   DARKNESS DENSITY
 AS2DARK EQU    2                   DOUBLE STRIKE
 AS2HEVY EQU    4                   VERY DARK (QUAD STRIKE)
         SPACE  1
 AS2HLIT DS     X                HIGHLIGHTING
 AS2UNDR EQU    1                   UNDERSCORE, SINGLE STRIKE
 AS2US02 EQU    2                   DOUBLE STRIKE UNDERSCORE
 AS2US04 EQU    4                   VERY DARK UNDERSCORE (QUAD STRIKE)
         SPACE  1
***********************************************************************
*                                                                     *
*                 PAGE PRINTER (SCRIPT) FINAL FORM                    *
*                                                                     *
***********************************************************************
         SPACE  1
 AS3ATTR DS     0XL12            ATTRIBUTES FOR PAGE PRINTER (SCRIPT)
 AS3NAME DS     CL8                 NAME OF THE FONT
*                                   (BLANKS => DEFAULT FONT)
 AS3ITAL DS     X                   CHARACTER SET MODIFIER
 AS3ITAY EQU    1                   ON => USE ITALICS
 AS3BOLD DS     X                   BOLDFACE INDICATOR
 AS3BFON EQU    1                   ON => USE BOLDFACE
 AS3HLIT DS     X
 AS3UNDR EQU    1                   UNDERSCORE
         SPACE  1
 AS3PTSZ DS     FL1                 POINT SIZE (RAW NUMBER)
 ASFLNGE EQU    *-FASE              LENGTH OF FONT ATTR SPEC ELEMENT

TITLE 'FMTSPEC - WP/E FORMAT SPECIFICATION'
***********************************************************************
*                         F M T S P E C                               *
*                   WP/E FORMAT SPECIFICATION                         *
*                                                                     *
*        COPYRIGHT 1986, ADDISON FISCHER - ALL RIGHTS RESERVED.       *
***********************************************************************
         SPACE  1
* FORMAT FIELD CODES -
*        S - START FIELD    (NO LEFT JUSTIFY)
*        L - START FIELD        (LEFT JUSTIFY)
*        E - END FIELD      (NO RIGHT JUSTIFY)
*        R - END FIELD         (RIGHT JUSTIFY)
*        T - TAB POINT
*        F - HARDWARE (FIELD) TAB POINT
*        I - PARAGRAPH INDENT/INIT POSITION
*        Z - START OF NULL FILL FOR THIS FIELD
*           (X - START OF BLANK FILL - NOT USEFUL)
*   FUTURE IDEAS(?): N - START OF NUMBERED FIELD
*
```

```
*  FORMAT CONTROL CODES:
*     W - WORD WRAP FINAL FIELD
*     A - AUTO SPILL FINAL FIELD   (=> 'W')
*     H - HYPHENATE FINAL FIELD    (=> 'A' => 'W')
*
*  RULES -
*     1.   FIELDS DO NOT OVERLAP.
*     2.   HYPHENATION, SPILL & WORD WRAP APPLY TO, AND ARE SET IN,
*          ONLY (AT MOST) THE FINAL FIELD OF THE FORMAT.
*     3.   THE PARAGRAPH INDENT ('I') MAY OCCUR EITHER BEFORE OR
*          AFTER THE 'S'/'L' OF THE ASSOCIATED FIELD.  IF ABSENT
*          IT IS CONSIDERED EQUAL TO THE 'S'/'L'.  THIS ITEM ONLY
*          APPLIES TO THE FIRST LINE IF EACH PARAGRAPH.
*     4.   THE I, S/L AND E/R ARE ALSO TREATED AS TAB ('T') FIELDS.
*     5.
*
***********************************************************************
*                                                                      *
*                         FORMAT FOUNDATION                            *
*                                                                      *
***********************************************************************
FMTSPEC   DSECT
FMTSGNT   DC    CL8'FMTSPEC'       SIGNATURE OF THIS BLOCK
FMTNEXT   DS    F              RSM -> NEXT FORMAT BLOCK
FMTPREV   DS    F              RSM -> PREVIOUS FORMAT SPECIFICATION
          SPACE 1
FMTSIZE   DS    H                  LENGTH OF FORMAT LINE
                                   (ALLOWED TO EXCEED FINAL FIELD).
FMTPVOFF  DS    H                  OFFSET TO START OF POINT VECTOR
FMTPNTCT  DS    H                  COUNT OF FORMAT POINTS
                                   (INCLUDES DUMMY 'TERMINATOR' POINT)
FMTPFONT  DS    H                  FONT TO BE USED TO DISPLAY -PREFIX-
FMTFLDCT  DS    H                  COUNT OF FIELD DEFINITIONS
FMTID     DS    CL2                ID OF THIS FORMAT
FMTOVFID  DS    CL2                IDENTIFIER OF OVERFLOW FORMAT
FMTLNGH   EQU   *-FMTSPEC          LENGTH OF FOUNDATION
          SPACE 1
***********************************************************************
*                                                                      *
*                         FIELD SPECIFICATION                          *
*                                                                      *
***********************************************************************
          SPACE 1
FMTFIELD  DS    0H                 START OF FORMAT FIELDS
FFLDFONT  DS    Y                  FONT INDEX FOR THIS FIELD
FFLDID    DS    CL2                ID OF THIS FIELD (NUMERIC?)
FFLDINDX  DS    FL2                SELF-INDEX OF THIS FIELD
FFLDATTR  DS    X                  ATTRIBUTES OF ENTIRE FIELD
                                   (SAME IN LEFT, RIGHT & INDENT MARKER)
FFLDLJUS  EQU   X'80'           L  LEFT JUSTIFY
FFLDRJUS  EQU   X'40'           R  RIGHT JUSTIFY
FFLDCNTR  EQU   X'20'           C  FIELD TO BE CENTERED (OVERRIDES L/R)
FFLDNUMB  EQU   X'10'           N  NUMERIC FIELD
FFLDIMPL  EQU   X'08'              END OF FIELD IMPLICITLY DETERMINED
                                   (IE., NO 'S' OR 'R' IS CODED)
*         FOLLOWING ATTRIBUTES PRESENTLY APPLY TO FINAL FIELD OF LINE:
FFLDHYPH  EQU   X'04'           H  HYPHENATION, AUTO-SPILL, WORD WRAP
FFLDSPIL  EQU   X'02'           A  AUTO-SPILL/WORD WRAP
FFLDWRAP  EQU   X'01'           W  WORD WRAP
FFLDFLGS  DS    X                  RESERVED FLAG BYTE
*                               ?? (FIELD IS 'NOT-EXPANDABLE',
                                   IE., TREAT INSERT AS A NOP).
FFLDSTRT  DS    H                  OFFSET OF START OF FIELD
FFLDINDT  DS    H                  OFFSET OF INDENTATION
FFLDEND   DS    H                  1 + OFFSET OF END OF FIELD
FFLDLNGH  EQU   *-FMTFIELD         LENGTH OF THIS ITEM
          SPACE 1
***********************************************************************
*                                                                      *
*                     FORMAT POINT SPECIFICATIONS                      *
*                                                                      *
*         ALL FORMAT-POINT SPECIFICATIONS ARE STORED IN ASCENDING      *
*         ORDER BY FUNCTION CODE WITHIN POINT OFFSET.  THE CODES       *
*         ARE DEFINED IN 'POINTDEF' AND ARE USED IN CONJUNCTION        *
*         WITH THE 'PME' AND 'RPD'.                                    *
*                                                                      *
*         A DUMMY 'TERMINATOR' POINT IS ALWAYS INCLUDED AT THE         *
*         END.  IT HAS OFFSET = MAX (X'7FFF') AND TYPE = PNTFINIS,     *
*         WHICH SERVES AS SCAN TERMINATOR FOR 'MAPOLINE'.              *
*                                                                      *
***********************************************************************
```

```
           SPACE 1
FMTPOINT   DSECT                            START OF FORMAT-POINT DEFINITION
FPNTPOSN   DS      0XL3                     POSITION AND FUNCTION TYPE
FPNTOFST   DS      HL2                      OFFSET FROM RECORD START;
FPNTPNCT   DS      X                        POINT-MARKER FUNCTION
*                  PNTFMST        S,L       START-FIELD MARKER
*                  PNTFMND        E,P       END-FIELD MARKER
*                  PNTEXACT       *         PRECISE POINT - HARDWARE TAB;
*                                                   (USES FIELD-ATTR)
-                  PNTPARAI       I         PARAGRAPH INIT/INDENTATION POSITION
:                  PNTSFTAB       T         SOFTWARE TAB-MARKER
.                  PNTNULLS       Z/B       START NULL/(BLANK?) FILL
;                  PNTFINIS                 TERMINATOR FOR END OF FORMAT
           SPACE 1
.*** ADDITIONALLY QUALIFY THE TYPE SPECIFICATION
FPNTFLDX   DS      FL1                      INDEX OF ASSOCIATED FIELD
                                            (USED FOR S,L,E,P,I)
FPNTLNGH   EQU     *-FMTPOINT               LENGTH OF THIS ENTRY
```

I claim:

1. In a data processing system for composing documents, said data processing system including means for entering data and commands relating to a document to be composed, data processor means for processing said data and for executing commands, and a plurality of output means for presenting the document, a method for composing a document comprising multiple lines of alphanumeric characters, said document having portions in which there is need for a plurality of distinct, data presentation characteristic defining formats, each format defining a geometric and topological structural arrangement of alphanumeric textural data, said method for composing a document comprising the steps of:

a. associating a first abstract format name with a first format upon entry of said first abstract name via said means for entering;

b. defining by an operator a first set of data presentation characteristics for a first output means for at least a first portion of the document and associating said first set of data presentation characteristics with said first abstract format name during an abstract format name characteristic specification by an operator;

c. defining by an operator a second set of data presentation characteristics, which are independent from said first set of data presentation characteristics for a second output means for at least a first portion of the document, without affecting the data presentation characteristics defined for said first output means, and associating said second set of data presentation characteristics with said first abstract format name during said abstract name characteristic specification;

d. associating with every line in the document an abstract format name which is linked to a data presentation characteristic defining format;

e. using said abstract format name characteristic specification to display the document during composition in a form substantially the same as the final format display; and f. responding to the entry of said first abstract format name during document production by formatting the lines in the document on the first output means to have said first set of data presentation characteristics associated with said first abstract format name and formatting the lines in the document on the second output means to have said second set of data presentation characteristics associated with said first abstract format name.

2. A method according to claim 1 further comprising the steps of:

a. associating a second abstract format name with a second format for defining the data presentation characteristics of at least a second portion of the document;

b. defining at least one data presentation characteristic and associating said characteristic with said second abstract format name;

c. associating the first abstract name with a third portion of the document which is non-contiguous with said first portion; and d. formatting each of the lines of the document to correspond with the characteristics associated with its respective abstract format name.

3. A method according to claim 1 wherein said first format corresponds to the first format used to define the left and right margins and indentations for the main body of textural material and wherein the step of defining a first set of data presentation characteristics includes selecting left and right margins to be associated with said first named format.

4. A method according to claim 2 wherein said second portion of the document includes auxiliary material having quoted material embedded therein and wherein said first abstract format name is associated with a format used to define the left, right and indentation points for paragraphs for the main body of the document and said second abstract format name is associated with a format used to define the left and right margins for the quoted material.

5. A method according to claim 3, wherein said document includes at least one column of alphanumeric data and wherein said second abstract format name is associated with a format used to define the start and end of each of said at least one column of alphanumeric data.

6. A method according to claim 1, further including the steps of:

selecting a plurality of additional formats for defining the data presentation characteristics of respective other portions of the document and associating a plurality of additional distinct abstract form names respectively therewith;

defining at least one data presentation characteristic for each of the additional formats and associating said characteristics with the respective additional distinct abstract format names; and formatting each of the lines in the document to correspond to the characteristics associated with its respective abstract format name.

7. A method according to claim 1, further including the step of assigning a default format name to any line in the document which has not been assigned an abstract format name via the means for entering data.

8. A method according to claim 1, wherein the first abstract format name simultaneously defines the format for at least said first portion of the document on a CRT and a line printer.

9. A method according to claim 1, wherein the first abstract format name simultaneously defines the format for at least said first portion of said document on a first CRT, a second, extended function CRT, a page printer, and a line printer.

10. A method according to claim 1, wherein said data processing system includes a CRT, and wherein the first abstract format name specification includes at least one field which is displayed on said CRT.

11. A method according to claim 10 further including the step of associating a set of data presentation characteristics with each field in the named format.

12. A method according to claim 11, wherein said step of associating includes associating a named font with each field in the named format, wherein said named font specifies the data presentation characteristics of at least one of intensity, color, character set, type style for the associated field of the named format, reverse video, underlining, and flashing.

13. A method according to claim 1 wherein the first abstract format name specification includes at least one field, and further including the steps of associating a set of data presentation characteristics with each field in the named format; associating a distinct set of data presentation characteristics for each of a plurality of output means including the display device on which the document is being composed; and controlling the presentation of data on each of said output means based upon data presentation characteristics defined by the first abstract named format and its associated named font.

14. A method according to claim 1, wherein the data processing system includes a CRT on which the document is composed, said method further including the step of specifying further details for a selected format name, said step of specifying further details including: displaying on the CRT a detailed specification containing data insertion areas for the abstract format name; inserting data presentation specifying data into said areas for at least a plurality of output means including said CRT.

15. A method according to claim 14, wherein said displaying step includes the step of displaying all fields associated with said selected abstract format name and further including the step of associating a further abstract name with said selected format name which establishes further data presentation characteristics for the document portions which are associated with said first format name.

16. A method according to claim 10, further including the step of displaying a detailed representation of said first abstract format name; specifying a code in which further characteristics may be associated with said first abstract name; and associating said further characteristics with all data associated with said first abstract name.

17. A method according to claim 16, wherein said further characteristics include at least one of left justification, right justification, hyphenation, word wrap, and error checking characteristics including spell checking and numeric or data value validation.

18. A method according to claim 1, wherein said data processing system includes an audio device, and further including the step of controlling said audio device in response to audio output indicia associated with said first abstract format name.

19. A method according to claim 1, further including the step of:

modifying said first set of data presentation characteristics associated with said first format name and responding to the entry of the modified first set of data presentation characteristics to automatically reformat all document portions associated with said first name to reflect said modified characteristics, whereby all data associated with a given abstract format name is reformatted after changing any format name characteristic specification and whereby such reformatting changes are made apparent to the document composer on a real-time basis as part of the composition process.

20. In a data processing system for composing documents having multiple lines of alphanumeric data comprising:

means for entering data and commands relating to a document to be composed;

data processor means for processing said data and for executing commands;

memory means for storing data and commands;

a plurality of data presentation output means for presenting the document in a final form;

means for selecting a first format for defining data presentation characteristics for at least a first portion of the document and for associating a first abstract format name with the first format upon entry of said first abstract format name via said means for entering;

means for defining a first set of data presentation characteristics for a first data presentation output means and for associating said first set of characteristics with said first abstract format name;

means for defining a second set of data presentation characteristics, which are independent from said first set of data presentation characteristics, for a second data presentation output means without affecting the data presentation characteristics defined for said first data presentation output means and for associating said second set of data presentation characteristics with said first abstract format name;

means for associating with every line in the document an abstract format name which is linked to a data presentation characteristic defining format;

means responsive to the entry of said first abstract format name for formatting the lines in the document on said first data presentation means to correspond with said first set of data presentation characteristics and for formatting the lines on said second data presentation output means to correspond with said second set of data presentation characteristics; and means for displaying the document during composition in a form substantially the same as the final form display.

21. Apparatus according to claim 20 further comprising means for selecting a second format for defining the of at least a second portion of the document and for associating the second format with a second abstract format name;

means for defining at least one data presentation characteristic and associating said characteristic with said second abstract format name.

means for associating the first abstract name with a third portion of the document which is non-continuous with said first portion; and means for formatting each of the lines of the document to correspond with the characteristics associated with its respective abstract format name.

22. Apparatus according to claim 20, wherein said first format corresponds to the format used to define at least one of the left and right margins and indentation points for the main body of textual material and wherein said means for defining at least one characteristic includes means for selecting at lest left and right margins to be associated with said first named format.

23. Apparatus according to claim 21, wherein said second portion of the document includes auxiliary material having quoted material embedded therein, wherein said first format is used to define the left, right and indentation point for paragraphs for the main body of the document and wherein said second format is used to define the left and right margins for the quoted material.

24. Apparatus according to claim 22 wherein said document includes at least one column of alphanumeric data and wherein said second abstract format name is associated with a format used to define the start and the end of each of said at least one column of alphanumeric data.

25. Apparatus according to claim 20, further including means for selecting a plurality of additional formats for defining the data presentation characteristics of respective other portions of the document and for associating a plurality of additional distinct abstract format names respectively therewith;

means for defining at least one data presentation characteristic for each of the additional formats and for associating said characteristics with the respective additional distinct abstract format names; and means for formatting each of the lines in the document to correspond with the characteristics associated with its respective abstract format name.

26. Apparatus according to claim 20, further including means for assigning a default format name to any line in the document which has not been assigned an abstract format name via the means for entering data.

27. Apparatus according to claim 20, further including a CRT and a printer, and wherein the first abstract format name simultaneously defines at least one data presentation characteristic for at least said first portion of the document for said CRT and said printer.

28. Apparatus according to claim 20, wherein said output means includes a first CRT, a second, extended function CRT, a page printer and a line printer and wherein the first abstract format name simultaneously defines the format for at least said first portion of said document on said basic CRT, said extended function CRT, said page printer, and said line printer.

29. Apparatus according to claim 20, wherein said data processing system includes a CRT, and wherein the first named format includes at least one field which is displayed on said CRT.

30. Apparatus according to claim 29, further including means for associating a set of data presentation characteristics with each field in the named format.

31. Apparatus according to claim 30, wherein said means for associating includes means for associating a named font with each field in the named format, wherein said Named Font specifies the data presentation characteristics of at least one of intensity, color, character set, type style for the associated field of the named format, reverse video, and flashing.

32. Apparatus according to claim 20, wherein the first abstract format name includes at least one field, further including means for associating a set of data presentation characteristics with each field in the named format;

means for associating a set of data presentation characteristics for each of a plurality of output means; and means for controlling the presentation of data on each of said output means based upon the data presentation characteristics defined by the first abstract named format and its associated data presentation characteristics.

33. Apparatus according to claim 20, wherein said data processing system further includes an audio device, wherein said audio device is controlled in response to audio output indicia associated with said first abstract format name.

34. Apparatus according to claim 20, wherein the data processing system includes a CRT, and further including means for specifying further details for a selected abstract format name and for displaying on the CRT a detailed specification containing data insertion areas for the selected format, and means for inserting format specifying data into said areas for at least a plurality of output means including said CRT.

35. Apparatus according to claim 29, and further including means for displaying all fields associated with said selected abstract format name and further including means for associating a further abstract name wit said selected format name which establishes further data presentation characteristics for the document portions which are associated with said first format name.

36. Apparatus according to claim 29, further including means for displaying a detailed representation of said first abstract format name;

means for specifying a code in which further characteristics may be associated with said first abstract name; and means for associating the further characteristics with all data associated with said first abstract name.

37. Apparatus according to claim 36, wherein said further characteristics include at least one of left justification, right justification, hyphenation, word wrap, and error checking characteristics including spell checking and numeric or data value validation.

38. Apparatus according to claim 20, further including:

means for modifying at least one data presentation characteristic associated with said first format name and means for responding to the entry of the modified said at least one characteristic to automatically reformat all document portions associated with said first name to reflect said modified characteristic, whereby all data associated with a given abstract format name is reformatted interactively on the composer's CRT after changing any format name characteristic specification, whereby reformatting changes are made apparent to the document composer on a real-time basis as part of the document composition process.

39. In a data processing system for composing documents, said data processing system including means for entering data and commands relating to a document to be composed, data processor means for processing said data and executing commands, and at least one output means for presenting the document, said at least one output means including a first display device, a method for composing on a display device by a document composer a document comprising multiple lines of alphanumeric characters comprising the steps of:
   a. assigning a first name to represent and be associated with data presentation characteristics for a predetermined portion of said document upon entry of said first name via said means for entering;
   b. selecting by a document composer a first set of data presentation characteristics to be associated with a first field associated with said first name and defining the text character attributes used to produce the text characters appearing in said first field, said first field being associated with one part of said predetermined portion;
   c. selecting by a document composer an independent second set of data presentation characteristics to be associated with a second field associated with said first name and defining the text character attributes used to produce the text characters appearing in said second field, said second field being associated with another part of said predetermined portion; and
   d. responding to the entry of said first name by presenting the data in said one part of said predetermined portion with said first set of characteristics on the composer's display device and presenting the data in said other part of said predetermined portion with said second set of data presentation characteristics on the composer's display device, whereby the document composer may independently define a set of data presentation characteristics to be associated with each of a plurality of fields associated with said first name.

40. A method according to claim 39, wherein said composer's output device is a CRT and said step of selecting a first set of data presentation characteristics includes the steps of displaying on the CRT a detailed specification for said first name containing a plurality of characteristic selection areas, and selecting data presentation characteristics for a plurality of output means including said CRT to be associated with said first name.

41. A method according to claim 40 further including the step of selecting data presentation characteristics for at least one of an additional, extended function, CRT, a line printer, a page printer and an audio presentation device.

42. A method according to claim 40 including the step of selecting the absence of a predetermined data presentation characteristic and for associating such absence with said first name.

43. A method according to claim 40, further including the step of providing a selection of normal or bright, or unspecified intensity for the first CRT and a selection of a plurality of color characteristics, intensity characteristics, and highlight characteristics for an additional CRT.

44. A method according to claim 43 further including the step of providing a selection of character set, italics, and boldface characteristics for at least one of an additional CRT, the line printer, and the page printer.

45. A method according to claim 40, further including the step of providing a selection of type, density and underlining features for the line printer.

46. A method according to claim 40, further including the step of providing a selection of at least one of point-size and type style for at least one of said output means.

47. A method according to claim 40, wherein said data processing system includes an audio output means for vocalizing an output message and wherein said selecting a first set of data presentation characteristics further includes the step of:
   selecting at least one audio output characteristics for controlling the audio output of said audio output device and for selecting which portion of the text is to be vocalized.

48. A method according to claim 39, further including the steps of associating a first predetermined level with said first name and placing all textual data associated with said first name in at least one of a footnote format or in an index when said document is presented on at least one of said output means.

49. A method according to clam 39 further including the step of assigning a hierarchical level to the assigned first name.

50. A method according to claim 49 further including the steps of
   assigning a plurality of additional names to be associated with a respective plurality of sets of data presentation characteristics,
   associating at least one of said plurality of additional names with at least a portion of said range;
   assigning a hierarchical level to said at least one additional name which is higher than the level assigned to the first name;
   presenting both the characteristics associated with said first name and said at least one additional name as long as the characteristics of the first name are not overlaid by a contradictory specifications of the said at least one additional name; and
   superseding the characteristics associated with the lower level by the characteristics associated with the higher level if the characteristics are contradictory.

51. A method according to claim 39, further including the step of:
   controlling the CRT display to display in a distinct manner the document portions which are in the process of being defined.

52. A method according to claim 51, further including the step of:
   defining the beginning and ending of at least one range delineating the document portions for which the first set of characteristics are desired by associating place marks with the document text defining at least the beginning and end of the range without displaying such place marks to the document composer with the text during composition;
   responding to a range start or range end by displaying the document from the range start point through the end of the document or from the range end to the beginning of the document in a differentiating manner.

53. A method according to claim 39, wherein the memory means stores a plurality of files, and further including the step of:
   displaying different files or different portions of the same file on different portions of the display screen simultaneously.

54. A method according to claim 49, further including selecting a predetermined hierarchical level for said first name and causing associated test in response to such a level selection to be treated as a note private to the author which will only be displayed while the document is being revised and which will not be displayed in the final document form.

55. A method according to claim 39 wherein the document is stored in the memory means as at least one record and further including the step of:
   defining the beginning and ending of at least one range delineating the document portions for which the first set of characteristics are desired by associating place marks with the document text defining at least the beginning and end of the range without displaying such place marks to the document composer with the text during composition;
   associating control information with each record relating to the points in which a name associated with a set of data presentation characteristics begins or ends;
   said control information including an offset defining the bytes of the record, relative to the first record byte, that the characteristics begin and end; and an identifier that identifies said name.

56. A method according to claim 55, storing with each record an indication of the names which are currently active at the end of each record.

57. A method according to claim 56, further including assigning a hierarchical level to said first name and to any other assigned names which have been defined, and wherein said step of storing with each record includes organizing by hierarchical level the stored indication of names which are active at the end of the record.

58. A method according to claim 55, further including the step of keeping track of all points in the record which relate to a range for an assigned name representative of a set of data presentation characteristics.

59. A method according to claim 57, further including the step of utilizing a file manager to keep track of points in the record delineating the range of names assigned to any of a first group of hierarchical levels and a point manager to keep track of points in the record delineating the range of names assigned to any of a second group of hierarchical levels.

60. A method according to claim 58, including the steps of storing control information relating to each of the points and linking related points together.

61. A method according to claim 39, storing all the assigned names, their associated data presentation characteristics, and the document portion encompassed by the names;
   merging all data presentation characteristics relating to a predetermined portion of the document; and presenting the data in accordance with a composite set of characteristics.

62. A method according to claim 61, wherein said document is stored as a plurality of records and wherein said merging step includes
   creating a name vector for storing control information defining all the currently active names which are in effect for each of said records; and
   storing the name vectors in queues in said memory.

63. A method according to claim 39, further including the step of:
   modifying said first set of data presentation characteristics associated with said first name and responding to the entry of the modified characteristics to automatically present all document portions associated with said first name to reflect said modified characteristics, whereby all data associated with a given name is presented so as to reflect said modified characteristics after changing only a single name specification and that such changes are displayed interactively in real-time during composition provided such changes relate to the composer's display device characteristics.

64. In a data processing system for composing documents having multiple lines of alphanumeric data, means for entering data and commands relating to a document to be composed by an operator, data processor means for processing said data and executing commands, memory means coupled to said data processor means for storing data and commands, and at least one output means for presenting the document, said at least one output means including a display device, said data processing system comprising:
   a. means for assigning a first name to represent and be associated with a first set of data presentation characteristics upon entry of said first name via said means for entering;
   b. means for selecting a first et of data presentation characteristics to be associated with said first name;
   c. means for displaying on the display device a portion of the text;
   d. means for defining a beginning and ending of at least one range delineating document portions for which the first set of characteristics are desired by associating place marks with the document text which are not displayed with the text to the document composer during composition and which define at least the range beginning and the range ending; and
   e. means responsive to the entry of said first name for interactively presenting the data in the defined range with said first set of characteristics on the operator's display device; and
   f. means for insuring that all other document portions previously associated with said first name ar presented having said first set of data presentation characteristics, and wherein said operator's display device is a CRT and wherein said means for selecting a first set of data presentation characteristics includes means for displaying on the CRT a detailed specification for said first name, said detailed specification containing a plurality of characteristic selection areas, and
   means for independently selecting data presentation characteristics for each of at least a plurality of output means including said CRT such that the data presentation characteristics selected for any one of said output means do not affect the data presentation characteristics selected for another of said output means, to thereby associate data presentation characteristics with said first name.

65. Apparatus according to claim 64, further including an additional CRT, a line printer, a page printer and an audio active device and means for selecting data presentation characteristics for at least one of said additional CRT, said line printer, said page printer and said audio device.

66. Apparatus according to claim 64 further including means for selecting the absence of a predetermined characteristic and for associating such absence with said first name.

67. Apparatus according to claim 65 further including means for selecting normal or bright, or unspecified intensity for the first CRT and a selection of a plurality of color, intensity, highlight, features for the additional CRT.

68. Apparatus according to claim 67 further including means for selecting a character set, italics, and boldface options for at least one of the additional CRT, on the line printer, and the page printer.

69. Apparatus according to claim 65, further including means for selecting at least one of type density, type style, type size and underlining features for the line printer.

70. Apparatus according to claim 64, further including means for associating a first predetermined level with said first name and means for placing textual data associate with said first name in at least one of a footnote format or in an index when said document is presented on at least one of said output means.

71. Apparatus according to claim 64, wherein said data processing system includes an audio output means for vocalizing an output message, and further including means for selecting audio output characteristics for controlling the audio output characteristics of said audio output device.

72. Apparatus according to claim 65, further including means for specifying at least one of point-size and type style for at least one of said output means.

73. Apparatus according to claim 64, further including means for assigning a hierarchical level to the assigned first name.

74. Apparatus according to claim 73, further including means for assigning a plurality of additional names to be associated with a respective plurality of sets of data presentation characteristics;

means for associating at least one of said plurality of additional names with at least a portion of said range;

means for assigning a hierarchical level to said at least one of said additional names, which is higher than the level assigned to the first name;

means for presenting both the characteristics associated with said first name and said at least one additional name as long as the characteristics of the first name are not overlaid by a contradictory specifications of the said at least one additional name; and means for superseding the characteristics associated with the lower level by the characteristics associated with the higher level if the characteristics are contradictory.

75. Apparatus according to claim 64, further including means for controlling the CRT display to display in a distinct manner the document portions which are in the process of being defined.

76. Apparatus according to claim 75, further including means for responding to a range start or range end command for displaying the document from the range start point through the end of the document or from the range end to the beginning of the document in a differentiating manner.

77. Apparatus according to claim 64, wherein the memory means stores at least one file, and further including means for displaying different files or different portions of the same file on different portions of the display screen simultaneously.

78. Apparatus according to claim 73, including means for selecting a predetermined hierarchical level and for causing associated text in response to such a level selector to be treated as a note private to the author which will only be displayed while the document is being revised and which will not be displayed in the final document form.

79. Apparatus according to claim 64, wherein the document is stored in the memory means as a plurality of records and further including means for associating control information with each record relating to the points in which a name associated with a set of data presentation characteristics begins or ends, said control information including an offset defining the bytes of the record relative to the first record byte that the characteristics begin and end, and an identifier that identifies aid name.

80. Apparatus according to claim 79, including means for storing with each record an indication of the manes which are active at the end of each record.

81. Apparatus according to claim 80, further including means assigning a hierarchical level to said first name and to any other assigned names which have been defined, and wherein said means for means for storing with each record includes means for organizing by hierarchical levels the stored indication of names which are active at the end of the record.

82. Apparatus according to claim 79, further including manager means for keeping track of all points in the record which relate to a range for an assigned name representative of a set of data presentation characteristics.

83. Apparatus according to claim 81 further including a file manager means for keeping track of points in the record relating to names assigned to any of a first group of hierarchical levels and a point manager means for keeping track of points in the record relating to names assigned to any of a second group of hierarchical levels.

84. Apparatus according to claim 82, including means for storing control information relating to each of the points and linking related points together.

85. Apparatus according to claim 64, including means for storing all the assigned names, their associated data presentation characteristics, and the document portion encompassed by the names;

display manager means for merging all data presentation characteristics relating to a predetermined portion of the document; said display manager means further including means for presenting the data in accordance with a composite set of characteristics.

86. Apparatus according to claim 64, further including:

means for modifying said first set of data presentation characteristics associated with said first name and means for responding to the entry of the modified characteristics to automatically present all document portions associated with said first name to reflect said modified characteristics, whereby all data associated with a given name is presented so as to reflect said modified characteristics after changing only a single name specification and wherein such changes are displayed interactively in real-time during composition provided such changes relate to the composer's display device characteristics.

87. Apparatus according to claim 85, wherein said document is store as at least one record and wherein said means for merging includes means for creating a name vector for storing control information defining all the currently active names which are in effect for each of said records; and means for storing the name vectors in queues in said memory.

88. Apparatus according to claim 83, including file manager means for keeping track of the location of records relating to the document in the memory means;

input manager means for reading data and commands and decoding commands which are entered by said means for entering said input manager means including means for determining when input data is such as to require reformatting of other data and control information, and means for informing said file manager means and said point manager means of the requirement to reformat other data and control information;

said file manager means and said point manager means including means for reformatting said other data and control information.

* * * * *